United States Patent [19]

Burns et al.

[11] Patent Number: 5,442,147
[45] Date of Patent: Aug. 15, 1995

[54] POSITION-SENSING APPARATUS

[75] Inventors: John Burns; Sheelagh A. Lloyd, both of Bristol, England

[73] Assignee: Hewlett-Packard Company, Palo Alto, Calif.

[21] Appl. No.: 117,200

[22] PCT Filed: Apr. 3, 1992

[86] PCT No.: PCT/GB92/00594
§ 371 Date: Sep. 15, 1993
§ 102(e) Date: Sep. 15, 1993

[87] PCT Pub. No.: WO92/17859
PCT Pub. Date: Oct. 15, 1992

[30] Foreign Application Priority Data

Apr. 3, 1991 [GB] United Kingdom ............... 9106990
Oct. 3, 1991 [GB] United Kingdom ............... 9120982

[51] Int. Cl.⁶ .................... G08C 21/00; G09G 1/00
[52] U.S. Cl. ................................. 178/18; 345/166
[58] Field of Search ............... 178/18, 19; 345/179, 345/180, 166; 382/3, 13

[56] References Cited

U.S. PATENT DOCUMENTS

| | | | |
|---|---|---|---|
| 4,521,773 | 6/1985 | Lyon | 345/166 |
| 4,691,199 | 9/1987 | Shell | 345/166 |
| 4,751,380 | 6/1988 | Victor et al. | 345/166 |
| 4,880,967 | 11/1989 | Kwang-chien | 345/166 |
| 5,051,736 | 9/1991 | Bennett et al. | 345/180 |
| 5,086,197 | 2/1992 | Liou | 345/166 |

FOREIGN PATENT DOCUMENTS 0171284 2/1986 European Pat. Off. .
0206246 12/1986 European Pat. Off. .
0276109 7/1988 European Pat. Off. .

OTHER PUBLICATIONS

Proceedings of the IEEE, "Psudo Random Sequences and Arrays", Dec. 1976, MacWilliams et al, pp. 1715–1730.

*Primary Examiner*—Stephen Chin
*Assistant Examiner*—Kevin Kim

[57] ABSTRACT

Position-sensing apparatus is provided which includes a passive coded surface formed by a pattern element with an arrangement of indicia that together form a two-dimensional windowing pattern; by "windowing pattern" is meant a pattern having the property that any local portion of the pattern of given size in terms of pattern features (a "sub-pattern"), when considered in isolation, is so characterized by its features as to permit the location of the sub-pattern to be determined, for at least one orientation of the sub-pattern relative to said pattern. The apparatus further includes an indicator element movable across the pattern, and a sub-pattern detector with a sensor for sensing the pattern indicia in the locality of the indicator element. The detector is operative to process the output of the sensor to derive sub-pattern data representative of a sub-pattern local to the indicator element in an orientation enabling its position to be uniquely determined. The sub-pattern data is passed to a position-determining unit which uses this data, together with data on the overall pattern, to determine the position of the indicator element relative to the pattern element.

57 Claims, 25 Drawing Sheets

FIG 11A

Bp
PRBS-2 '1' j | (1,1) | (0,1) | (1,1) | (1,1) | -- | (0,1) | — $C_{ij}$

'1' | (1,1) | (0,1) | (1,1) | (1,1) | -- | (0,1)
'0' | (1,0) | (0,0) | (1,0) | (1,0) | -- | (0,0)
'1' | (1,1) | (0,1) | (1,1) | (1,1) | -- | (0,1)
'1' | (1,1) | (0,1) | (1,1) | (1,1) | -- | (0,1)

Ap
i
'1' '0' '1' '1' '0'
→ PRBS-1

FIG 11B

Bp
PRBS-2 '0' | 0 | 0 | 0 | 0 | -- | 0

'1' | 1 | 1 | 1 | 1 | -- | 1
  | 1 | 0 | 1 | 1 | -- | 0
'1' | 1 | 1 | 1 | 1 | -- | 1
  | 1 | 0 | 1 | 1 | -- | 0

Ap
'1' '0' '1' '1' '0'
→ PRBS-1

| ENCODE | ENCODING FUNCTION | | | |
|---|---|---|---|---|
| | $h_0(c)$ | $h_1(c)$ | $v_0(c)$ | $v_0(c)$ |
| C1 (000) | C5 | C3 | C2 | C8 |
| C2 (001) | C6 | C4 | C1 | C7 |
| C3 (010) | C7 | C1 | C4 | C6 |
| C4 (011) | C8 | C2 | C3 | C5 |
| C5 (100) | C1 | C7 | C6 | C4 |
| C6 (101) | C2 | C8 | C5 | C3 |
| C7 (110) | C3 | C5 | C8 | C2 |
| C8 (111) | C4 | C6 | C7 | C1 |

COLOUR (c)

Y - SEQUENCE
X - SEQUENCE → 0 1 1 0 1 0 1

| DECODE | OLD | | | | | | | |
|---|---|---|---|---|---|---|---|---|
| NEW | C1 | C2 | C3 | C4 | C5 | C6 | C7 | C8 |
| C1 | | 0Y | 1X | | 0X | | | 1Y |
| C2 | 0Y | | | 1X | | 0X | 1Y | |
| C3 | 1X | | | 0Y | | 1Y | 0X | |
| C4 | | 1X | 0Y | | 1Y | | | 0X |
| C5 | 0X | | | 1Y | | 0Y | 1X | |
| C6 | | 0X | 1Y | | 0Y | | | 1X |
| C7 | | 1Y | 0X | | 1X | | | 0Y |
| C8 | 1Y | | | 0X | | 1X | 0Y | |

| 87 ENCODE | | B0 ZONE/SQUARE BIT | B1 ZONE ID BIT | B2 X-BIT VALUE | B3 Y-BIT VALUE |
|---|---|---|---|---|---|
| COLOUR-SQUARE COLOURS | C1 | 0 | 0 | 0 | 0 |
| | C2 | 0 | 0 | 0 | 1 |
| | C3 | 0 | 0 | 1 | 0 |
| | C4 | 0 | 0 | 1 | 1 |
| SEPARATOR ZONE COLOURS | C5 | 1 | 0 | 0 | 0 |
| | C6 | 1 | 1 | 0 | 0 |

POSITION-SENSING APPARATUS

TECHNICAL FIELD

The present invention relates to position-sensing apparatus and in particular, but not exclusively, to apparatus for sensing the position of an indicator element over a two-dimensional patterned surface by detecting pattern features of the surface.

BACKGROUND ART

It is known to detect linear position by providing a linear pattern that encodes a pseudo-random binary sequence (PRBS, also known as an "m-sequence") and then using the window property of such a sequence to effect position detection by detecting a window-length subsequence of the pattern. An example of such a system is described in the article "New Pseudorandom/-Natural Code Conversion Method" by E. M. Petriu appearing in Electronic Letters 27th Oct. 1988 Vol.24 No.22.

By "window property" is meant the property that for a PRBS of length $(2^k-1)$, where k is an integer, any subsequence of length k will be unique and therefore uniquely locatable in the sequence; this and other properties of PRBSs are described, for example, in the article "Pseudo-Random Sequences and Arrays" by F. Jessie MacWilliams and Neil J. A. Sloane appearing in the Proceedings of the IEEE, Vol.64, No.12 December 1976.

The prior-art systems utilising the window-property of a PRBS for position sensing are essentially limited to linear position-sensing, although the path followed by the PRBS pattern may, of course, be other than rectilinear (for example, circular or serpentine).

It is an object of the present invention to provide position-sensing apparatus for sensing position over a two-dimensional surface.

DISCLOSURE OF THE INVENTION

According to one aspect of the present invention, there is provided position-sensing apparatus comprising:
  a pattern element with an arrangement of indicia that together present a two-dimensional pattern having features that make said pattern a windowing pattern in that any local portion of the pattern of given extent in terms of its features (herein a "sub-pattern"), when considered in isolation, is so characterised by said features as to permit the location of the sub-pattern to be determined, for at least one orientation of the sub-pattern relative to said pattern;
  sub-pattern detector means including sensor means for sensing said indicia such that for any one position of the indicator element, the sensing means is operative to sense a portion of said pattern which lies in the locality of said indicator element and is smaller in extent than a said sub-pattern, the detector means being operative to process the output of the sensor means such that as the indicator element is moved over the pattern, the detector means is operative to derive sub-pattern data representative of a whole sub-pattern local to said indicator element in a said at least one orientation of the sub-pattern relative to said pattern; and
  position-determining means including a memory holding pattern data representative of said windowing pattern, the position determining means being responsive to the sub-pattern data derived by said detector means to determine, by reference to said pattern data, the position of said indicator element relative to said pattern element.

Preferably, in said position-sensing apparatus:
(a) said features of the pattern discernibly form a regular arrangement for which when any given sub-pattern of said pattern is considered in isolation from the pattern, that sub-pattern may be in any of M possible orientations relative to the pattern where M is a positive integer greater than zero;
(b) said windowing pattern is such that any given sub-pattern can be correctly located in the pattern for N of said M possible orientations where N is a positive integer in the range $0 < N \leq M$; and
(c) said sub-pattern detector means is responsive to the said regular arrangement of features to identify a said sub-pattern in the locality of said indicator element, and to provide sub-pattern data to said position-determining means which is representative of the said sub-pattern in one of said N of said M possible orientations relative to the pattern in which it can be correctly located.

Advantageously, said features are discernibly arranged in rows and columns extending parallel to respective first and second coordinate axes with each feature being presented in a notional cell that has line contact with a plurality of neighbouring such cells. A rectangular pattern of cells is preferred for which each said cell has line contact with four neighbouring cells, M has a value 4, and N has one of the values 1,2 and 4.

Said features may serve to encode at least part of a two-dimensional windowing array having rows and columns of elements notionally extending parallel to said first and second coordinate axes respectively. One suitable form of array is a pseudo-random binary array. Another suitable form of array can be formed from first and second binary sequences of length m and n respectively, where m and n are positive integers greater than zero, by forming a first column of the array from said first sequence, and forming each subsequent (i)th column, where "i" is an integer in the range from 2 to $2^{n+1}$, by considering the value of the (i−1)th element of the second sequence, and
  if the (i−1)th element has a first binary value, forming the said (i)th column from said first sequence unshifted relative to the (i−1)th column,
  if the (i−1)th element has a second binary value, forming the said (i)th column from said first sequence circularly shifted by one position relative to the (i−1)th column.

A further form of array can be formed by combining together two windowing sequences that extend parallel to respective ones of said first and second coordinate axes, each element of said array representing a particular combination of values of corresponding elements of said sequences.

Where the features serve to encode an array, the value of each element of said army is preferably encoded as a corresponding feature value.

Preferably, the pattern features serve to encode a first windowing sequence of elements notionally extending parallel to said first coordinate axis and a second windowing sequence of elements notionally extending parallel to said second coordinate axis. In this case, said sequences may be selected from the group of sequences comprising:

(a) de Bruijn sequences;
(b) pseudo-random binary sequences;
(c) orientable binary sequences each having the property that if a window-length subsequence appears in the sequence, then its reversal does not; and
(d) complement-orientable binary sequences each having the property that if a window-length subsequence appears in the sequence, then the reverse of the bitwise complement of the subsequence does not.

Advantageoulsy, where two sequences are encoded, each element of each said sequence is encoded as a corresponding change in feature value when moving between neighbouring cells in a direction parallel to the direction of extent of the corresponding said sequence. In one implementation, the encoding of said element values is such as to ensure that each said feature is distinguished by its value from at least one specific neighbour with which it has line contact; in fact, said encoding may be such as to distinguish each feature by value from all its neighbours with which it makes line contact. Indeed, the encoding of said element values may also ensure that each said feature is also distinguished by its value from its neighbours with which it has point contact. Alternatively, each said feature may be separated from at least one neighbouring feature with which it has line contact by a corresponding separator zone that is detectable as such by said sub-pattern detector means.

Preferably, said sensor means is movable with said indicator element and is operative to sense a portion of said pattern corresponding to a single said feature, said apparatus including spatial-information means for providing said sub-pattern detector means with spatial information regarding the relative disposition of adjacent element-value encoding features, and said sub-pattern detector means being operative to use said spatial information to build up said sub-pattern data relating to a whole sub-pattern as the sensor means is moved over the pattern. Advantageously, said spatial-information means comprises features of said pattern sensible by said sensor means as it is moved between said element-value encoding features; in particular, said spatial-information can be encoded into the values represented by said element-value encoding features. In certain implementations, the spatial information provided to said sub-pattern detector means may only be partial and in such cases the detector means can be made operative to assume an unchanging direction of movement of said sensor means across said pattern unless and until, following initial position determination, an inconsistency is determined between said pattern data and sub-pattern data.

Generally, the relative orientation of the sensor means to said arrangement of indicia, about an axis orthogonal to said arrangement, will be variable. Preferably, therefore, said apparatus includes orientation-information means for providing said sub-pattern detector means with orientation information about said relative orientation, the sub-pattern detector means utilizing this information in deriving said sub-pattern data representative of a sub-pattern orientated in a said at least one orientation. Advantageously, said orientation-information means comprises features of said pattern sensible by said sensor means as it is moved between said element-value encoding features; in particular, said orientation information may be encoded into the values represented by said element-value encoding features.

Preferably, following an initial determination of the location of said indicator element, any incremental change in the pattern portion sensed by said sensing means, is used by said position-determining means to provide an updated location based on the incremental change in location of the indicator element indicated by said change in the sensed pattern portion. In case where said pattern is an encoding of two windowing sequences of elements notionally extending along respective first and second coordinate axes, said position-determining means is advantageously operative to update the location of said indicator element along said first and second coordinate axes separately, based on any incremental change in location along the corresponding coordinate axis indicated by a change in the element or elements of the corresponding sequence represented by said sensed pattern portion; said position-determining means in incrementing the location of said indicator element along at least one said coordinate axis, assuming an unchanged direction of movement therealong unless and until the said element or elements of the sequence extending along said one coordinate axis that are represented by said sensed pattern portion, differ from that predicted from the stored pattern data relating to that sequence having regard to the current location in the sequence as previously determined by said position-determining means, said position-determining means upon detecting a difference between the sensed and predicted sequence elements, being further operative to enter a recovery process to recover its location along said one coordinate axis, said recovery process involving deriving at least one candidate location for the indicator element on the basis that the direction of movement of the indicator element has been reversed, and directly or indirectly comparing the element or elements sensed along the track of the indicator element with those predicted to lie along the indicator-element track in reaching the or each said candidate location whereby to test the validity of the or each such location.

Preferably, said indicator element is a hand-holdable stylus carrying said sensor means.

In one embodiment, the pattern element is a planar member carrying said indicia, both the planar member and said indicia being transparent to visible light whereby to permit viewing of items through the pattern element. In another embodiment, the pattern element is a planar member carrying said indicia, said indicia being transparent to visible light and said stylus being a marking stylus capable of depositing a marking substance on a surface of said planar member at which said indicia can be sensed by said sensor means, said working substance being optically visible but permitting the sensing of said indicia therethrough. In a still further embodiment, the pattern element is a planar member carrying said indicia, said apparatus further comprising a markable sheet positioned over said planar member, said sheet being at least partially opaque and permitting said indicia to be sensed therethrough by said sensor means, and said stylus being a marking stylus capable of depositing a marking substance on said sheet which substance is optically discernible against said sheet but permits the sensing of said indicia therethrough.

It will be appreciated that the present invention also separately encompasses pattern elements per se for use in position-sensing apparatus, the pattern elements having the characteristics described above in relation to the apparatus as a whole.

BRIEF DESCRIPTION OF THE DRAWINGS

FIG. 11A—illustrates one possible way of combining the values of two orthogonal pseudo random binary sequences into a rectangular array of values;

FIG. 11B—illustrates a second possible way of combining the values of two orthogonal pseudo random binary sequences into a rectangular array of values;

BEST MODE FOR CARRYING OUT THE INVENTION

General Form of Position-sensing Apparatus

Figure 1:
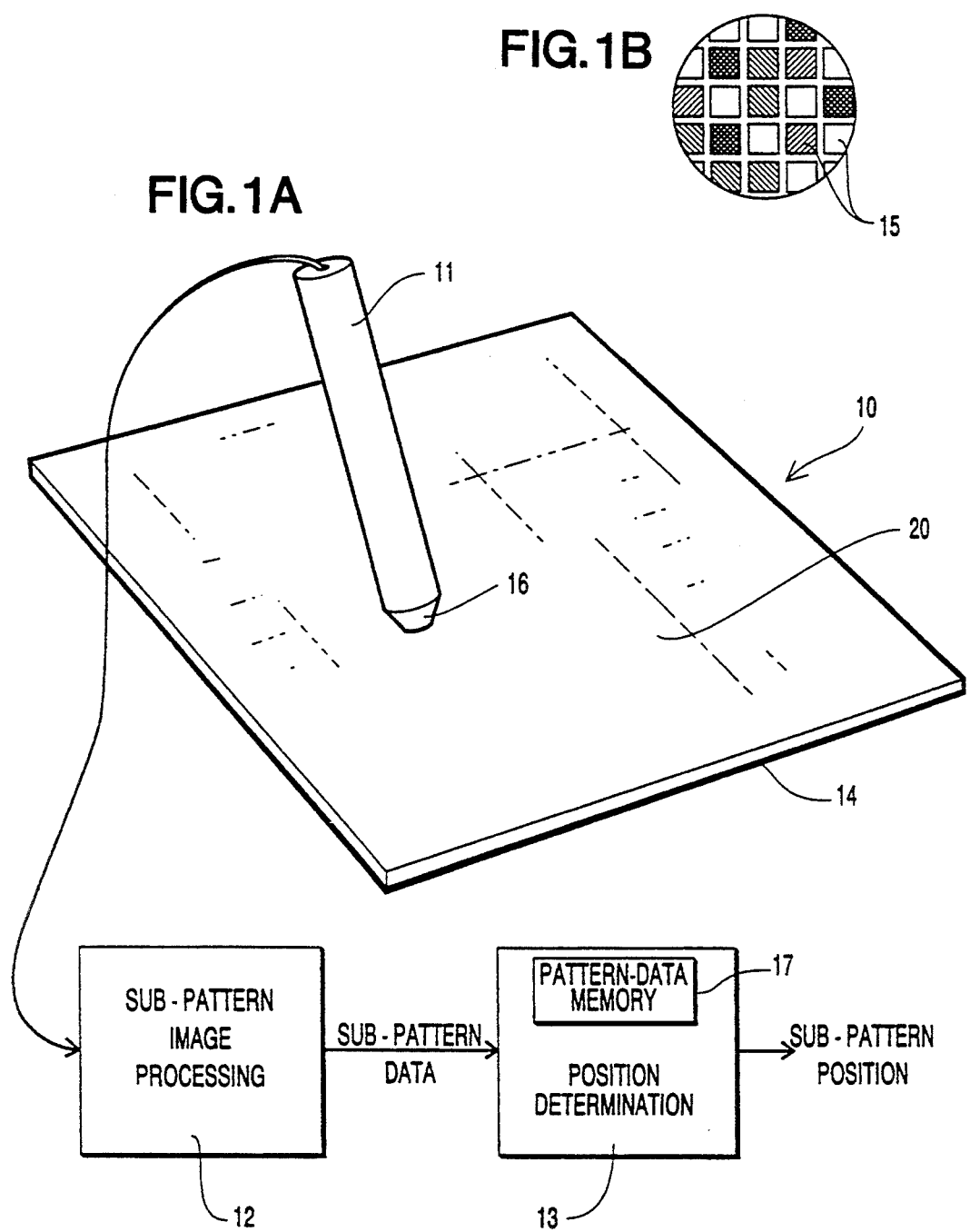
FIG. 1A—is a general perspective view of the position-sensing apparatus embodying the invention.
FIG. 1B—shows an enlarged portion of a pattern element of the FIG. 1 position-sensing apparatus.

As shown in FIG. 1, the position-sensing apparatus comprises a pattern element 10 marked with a two-dimensional pattern 20, a sensing stylus 11 for sensing a sub-pattern of the pattern 20, a sub-pattern image processing unit 12 fed with the output of the stylus 11, and a position-determining unit 13 connected to the output of the unit 12 and operative to provide an output signal indicative of the position of the stylus over the pattern 20.

The pattern element 10 takes the form of a planar support member 14 carrying on one surface an arrangement of indicia 15 (see inset in FIG. 1 which is an enlarged view of a portion of the surface of the member 14); the indicia 15 together present the pattern 20.

In the FIG. 1 embodiment, the pattern 20 is made up of a rectangular arrangement of indicia 15, the indicia being in the form of printed markings sensible by their optical/infra-red reflective characterisitcs. However, it is to be understood that the indicia may be arranged in a variety of other configurations and may be sensible by any suitable characteristic including by their surface roughness, magnetic parameters, electrical parameters, optical/infra-red transmissivity etc.

The pattern 20 is a windowing pattern in the sense that any local portion of the pattern of given extent in terms of its pattern features, when considered in isolation, is so characterised by its features as to permit the location of that pattern portion to be determined in the pattern, at least for a known orientation of the pattern portion relative to the pattern as a whole. A pattern portion of such an extent as to permit its location to be determined is referred to herein as a "sub-pattern".

In its broadest conception, the windowing pattern 20 may be constituted, for example, by a picture of an irregular subject (such as a portrait or landscape) since a sub-area of such a picture, provided it is of sufficient extent, will be uniquely locatable within the picture. However, the primary focus of the present invention is on patterns with a regular arrangement of features that encode underlying mathematical arrays or sequences with known properties. Of particular interest are windowing patterns with rectangular arrangements of features (that is, features running in rows and columns parallel to respective coordinate axes—note that although these axes may or may not be normal to each other, the term "rectangular pattern" is used herein to cover both situations). The rectangular patterns described hereinafter are encodings either of two dimensional windowing arrays or of pairs of orthogonal windowing sequences; in the former case, a sub-pattern takes the form of a rectangular area of the pattern, whereas in the latter case, a sub-pattern takes the form of two orthogonal linear segments of the pattern.

The sensing stylus 11 serves the dual function of an indicator element for pointing to a particular location on the pattern 20, and a sensor for sensing the indicia 15 in the locality of the stylus in order to detect a sub-pattern at the location pointed to by the stylus 11. In the present embodiment, the stylus is intended to be hand-held and is movable freely over the pattern without any constraint being placed on its orientation about an axis perpendicular to the pattern. However, other embodiments are possible where the stylus is mounted, for example, on a X-Y carriage and has a fixed orientation relative to the pattern; furthermore, the two functions of the sensing stylus 11 need not be performed by the same physical unit.

The stylus 11 includes a sensing head 16 of a form suitable to detect the indicia physical property used to provide the pattern features; in the present embodiment the sensing head 16 is an optical sensor. Processing of the output of the sensing head is effected by the sub-pattern image processing unit 12.

Given that the objective is to detect a complete sub-pattern in the locality of the stylus 11, three main approaches are possible to pattern sensing. The first approach is to sense an area of the pattern 20 sufficiently large as to include a whole sub-pattern at one time (the resolution of the sensing head 16 being adequate to resolve the characteristic features of the pattern). The sub-pattern image so sensed is processed by the sub-pattern image processing unit 12 to extract data on the salient features of the pattern and derive the sub-pattern data characterisic of the sub-pattern in the locality of the stylus 11.

The second approach is to sense a pattern area smaller than a sub-pattern, but containing a number of pattern features, and then to scan the sensing head 16 across the pattern 20 to sense a sufficient part of the adjacent portion of the pattern to be able to build up a full sub-pattern. In this case, the process of building up a complete sub-pattern is facilitated by the fact that the direction of scanning of the sensing head 16 can be readily ascertained by examining successive sensed images so that features sensed at different times can be correctly inter-related. The process of pattern-feature extraction and the building up of a sub pattern (or, more generally, data representative of a sub-pattern), is effected by the sub-pattern image processing unit 12.

The third approach to pattern sensing is to sense only a single pattern feature at a time and then to scan the sensing head 16 across the pattern to permit the full sub-pattern to be built up in the sub-pattern image-processing unit 12 (this approach is termed "single pixel" sensing herein). In this case, the problem of correctly inter-relating successively scanned pattern features is more difficult as information on the direction of scanning is required. One solution to this problem is to make such information implicitly available from the sensed pattern, either in a homogenous manner or by the use of explicit movement-direction indicia (both approaches will be more fully explained below). An alternative solution is to provide external scan-direction sensing means providing an input to the unit 12; however, the extra cost involved in this solution makes it undesirable. Another solution is to assume that the sensing head 16 is being scanned in a straight line across the pattern so that successively sensed features can be readily inter-related. Sub-pattern data is then assembled by the unit 12 and passed to the position-determining means 13; as successive positions are determined it will readily become apparent when the assumption about straight line movement is incorrect and the corresponding false position readings can be discarded.

Whatever sensing method is used, the sub-pattern image-processing unit 12 is operative to output sub-pattern data to the position-determining unit 13. This latter unit then determines the location of the sub-pattern within the overall pattern 20 by reference to pattern data, representative of the pattern 20, held in a pattern data memory 17. The unit 13 may effect this location determination in a variety of different ways, for example, by pattern matching techniques, by use of an index accessed by the sub-pattern locations, or by calculation in cases where the pattern is an encoding of mathematically processible sequences or arrays. It will be appreciated from the foregoing that the pattern data held in memory 17, whilst representative of the pattern, need not be a direct representation but can be an indirect representation such as a series of index entries or a mathematical definition of the pattern. The pattern data need only represent the windowing pattern in a manner sufficient to permit absolute pattern position to be established from data characteristic of a sub-pattern.

Having described the general arrangement and operation of the FIG. 1 position-sensing apparatus, a more detailed consideration will now be given to the form, construction and sensing of rectangular windowing patterns.

Rectangular Windowing Patterns

Figure 2:
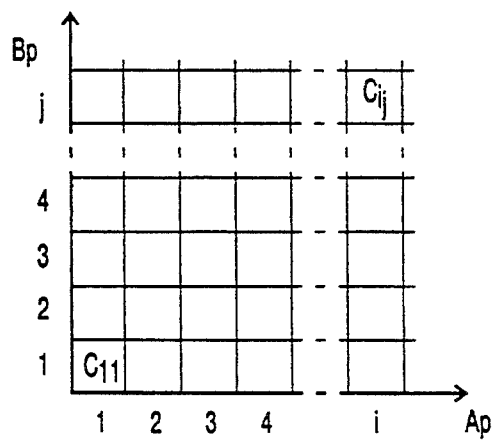
FIG. 2—is diagram illustrating a rectangular arrangement of pattern cells.

As illustrated in FIG. 2, the rectangular windowing patterns to be described hereinafter are based upon a rectangular arrangement of pattern features in correspondence with cells C disposed in rows and columns respectively parallel to pattern coordinate axes $A_p$ and $B_p$. For ease of description hereinafter the axis $A_p$ is referred to as the horizontal axis and movement parallel to it as horizontal movement; similarly, the axis $B_p$ is referred to as the vertical axis and movement parallel to it as vertical movement. A cell at column coordinate "i" on the horizontal axis $A_p$ and row coordinate "j" on the vertical axis $B_p$ is designated $C_{ij}$. Each cell is assigned one of a number of possible different values and these cell values constitute pattern features which are physically represented by indicia 15 appropriate for the sensing method to be employed. Thus, for example, the values assigned to the cells may be represented in the final pattern by respective colours.

The cell values are used to encode an underlying two-dimensional windowing array or pair of windowing sequences that impart a windowing property to the pattern 20; in fact, sub-pattern position determination will generally be effected by recovering windowing sub-arrays or sub-sequences from the sensed sub-pattern. The nature of the encoding used will be more fully described hereinafter but for now it may be noted that two main forms of encoding are used, namely absolute encoding in which the cell value directly represents the value of the underlying array or sequence, and transitional encoding in which the change in value in moving between cells represents the value of underlying sequences. Depending on the encoding scheme used, certain other information may also be derivable from the cell value pattern, as will become clear below.

An important issue in sensing a sub-pattern and determining the position of the sub-pattern in the overall pattern (whether or not rectangular) is that of relative orientation of the sensed sub-pattern to the pattern 20. This issue is considered below, with reference to FIGS. 3 and 4, in relation to rectangular patterns.

Figure 3:
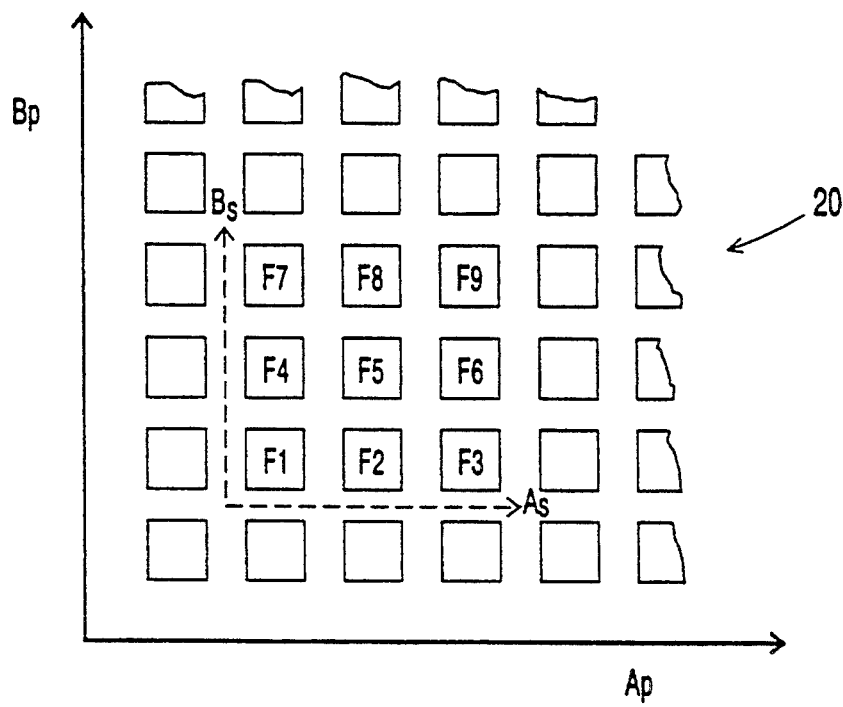
FIG. 3—is a diagram illustrating the disposition of one possible sub-pattern within an overall rectangular array of patterns features.
Figure 4A:
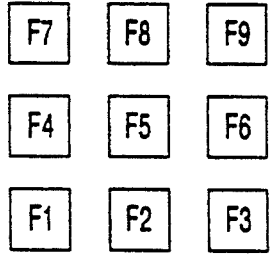
FIG. 4A—illustrates a first orientation of the FIG. 3 sub-pattern.
Figure 4B:
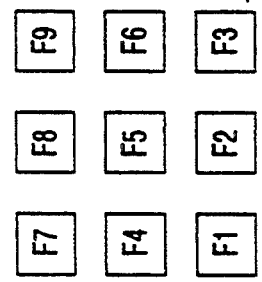
FIG. 4B—illustrates a second orientation of the FIG. 3 sub-pattern.
Figure 4C:
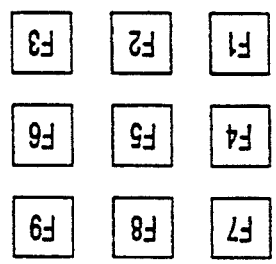
FIG. 4C illustrates a third orientation of the FIG. 3 sub-pattern.
Figure 4D:
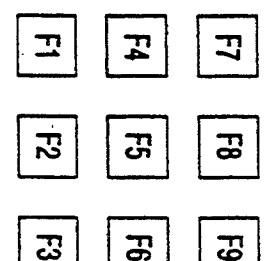
FIG. 4D—illustrates a fourth orientation of the FIG. 3 sub-pattern.

FIG. 3 shows a pattern 20 made up of a rectangular array of pattern features F (each illustrated feature F corresponds to a cell $C_{ij}$ of FIG. 2, it not of course being necessary for the feature to occupy the whole cell area, though as will become clear below, this is generally desirable where for single-pixel sensing is employed). The pattern features run in rows parallel to the vertical axis $A_p$ and in columns parallel to the vertical axis $B_p$. If a sub-pattern of the FIG. 3 pattern is composed of an arrangement of 3 by 3 features, then one of the many possible sub-patterns identifiable in the pattern is that constituted by features F1 to F9. This sub-pattern has three rows, composed of features (F1, F2, F3), (F4, F5, F6) and (F7, F8, F9) respectively, that run parallel to a first coordinate axis As of the sub-pattern, and three columns, composed of features (F1, F4, F7), (F2, F5, F8) and (F3, F6, F9) respectively, that run parallel to a second coordinate axis $B_s$ of the sub-pattern. When the sub-pattern is considered in situ in the pattern 20 as shown in FIG. 2, then the coordinate axes $B_p$ and $B_s$ are parallel; the sub-pattern is in its normal orientation relative to the pattern in which its combination of pattern features is unique within the pattern for the given pattern orientation.

However, in the general case the sub-pattern sensed by the sensing head 16 will not have any particular orientation—it will just be a sub-pattern image. Of course, it will be possible to discern the rectangular nature of the sub-pattern. However, this will not permit a resolution to be made between the four possible orientations, at 90° intervals, in which the rectangular sub-pattern could equally lie. FIGS. 4A, 4B, 4C and 4D illustrate for the sub-pattern of FIG. 3, these four possible orientations starting with 0° relative orientation between the axes $A_p$ and $A_s$ in FIG. 4A and progressing at 90° intervals to a 270° relative orientation in FIG. 4D.

This ambiguity of orientation of the sensed sub-pattern can lead to incorrect location determination as the pattern may contain more than one instance of a sub-pattern if all orientations are considered.

Windowing patterns for which a sub-pattern can only be correctly located if the sub-pattern is considered in the same orientation as the pattern, are herein termed "1-orientable" patterns. In fact, windowing patterns exist in which a sub-pattern can be correctly located in the pattern regardless of its relative orientation; such patterns are herein termed "4-orientable" patterns. Intermediate 1-orientable and 4-orientable patterns, there are patterns which can be correctly located in the pattern for two of the four possible relative orientations; these patterns are herein called "2-orientable" patterns.

For the rectangular windowing patterns considered herein, whether a pattern is 1,2 or 4-orientable depends on whether the underlying array/sequences represented by the pattern are themselves 1,2, or 4-orientable.

For a 4-orientable pattern, the potential problem of incorrectly locating a pattern due to an unknown orientation of the sub-pattern relative to the pattern, clearly does not exist. However, this problem does exist for 2-orientable and 1-orientable patterns and in these cases, it is necessary to obtain sub-pattern orientation information to enable the sub-pattern to be appropriately oriented before its location is determined.

One way of obtaining the required orientation information would be to provide a separate orientation sensor for sensing the orientation of the sensing heads about an axis perpendicular to the pattern 20; however, such an approach is costly. Another possibility would be to ensure that the sub-pattern is always sensed in a fixed orientation relative to the pattern by aging for the sensing head to be non-rotatable about an axis perpendicular to the pattern 20; again, this approach is not preferred due to the practical limitations of such an arrangement. The preferred approach to orientation sensing is to encode orientation information into the pattern either as part of the basic array/sequence encoding or by providing special orientation indicia integrated into the pattern 20 and sensible by the sensing head 16. This orientation information is then sensed by the unit 12 and used to derive sub-pattern data that represents the sub-pattern in an orientation in which it can be uniquely located in the pattern by the unit 13.

Windowing Arrays and Sequences

Having considered the general form of rectangular windowing patterns, suitable windowing arrays and sequences upon which such patterns can be based, will now be discussed. Although the arrays and sequences discussed below are all binary (that is, the constituent elements of the arrays and sequences can only be one of two possible values), this is merely preferred for ease of implementation and ternary and higher order arrays and sequences can also be used as the basis for windowing patterns.

Two Dimensional Arrays—Two dimensional arrays of elements can be constructed which have a windowing property in relation to sub-arrays of given extent. Thus, a 1-orientable array (from which a 1-orientable pattern can be constructed) can be formed by writing a PRBS diagonally within a two-dimensional array structure. Such arrays are disclosed in the article by MacWilliams and Sloane referred to above and, as noted in that article, these arrays exhibit a windowing property.

Another type of binary array that can be used to construct 1-orientable, 2-orientable or 4-orientable patterns is disclosed in Appendix A. This type of array is constructed from first and second binary sequences of length m and n respectively, where "m" and "n" are integers, by forming a first column of the array from said first sequence, and forming each subsequent (i)th column, where "i" is an integer in the range from 2 to $2^{n+1}$, by considering the value of the (i−1)th element of the second sequence, and

- if the (i−1)th element has a first binary value, forming the said (i)th column from said first sequence unshifted relative to the (i−1)th column,
- if the (i−1)th element has a second binary value, forming the said (i)th column from said first sequence circularly shifted by one position relative to the (i−1)th column.

Where the binary sequences are PRBS's, then the resultant arrays will be 1-orientable; where one or both binary sequences are reversible orientable binary sequences (see below), the resultant array will be 2 or 4-orientable.

Orthogonal Sequences—By using two binary sequences, each possessing the windowing property, it is possible to construct rectangular windowing patterns. Generally, one sequence is used to determine pattern changes when moving parallel to one pattern axis, whilst other sequence controls pattern changes when moving parallel to the other pattern axis. As a result, positioning along each pattern axis can be determined by reference to corresponding sequence. Such patterns may be 1-orientable, or 2-orientable (but generally not 4-orientable as it is necessary to distinguish between the two sequences before effecting position determination). For a pattern to be 2-orientable orientable both binary sequences must not only be windowing but at least after encoding, must not give rise to the same windowing sub-sequence when read in both directions.

Four types of usable sequences can be identified:

Type 1—deBruijn sequeunces;

Type 2—Pseudo-random sequences;

Type 3—Orientable sequences (that is, sequences for which each window sub-sequence of length m occurs only once, and its reverse does not);

Type 4—Complement-orientable sequences (that is, sequences for which each window sub-sequence of length m occurs only once and its complement reversed does not).

All four types are windowing, the first two types producing 1-orientable patterns and the second two types, 2-orientable patterns. The suitability of each type of sequence depends on the encoding employed and the sensing method used.

The first two types of sequences have been well-studied in the literature whilst the second two types do not seem to have received attention before. It is of course relatively straightforward to perform computer searches to find orientable and complement-orientable binary sequences, but it is very time-consuming for even moderate window lengths; it would be useful, therefore to be able to construct these sequences algorithmically and Appendix B considers how this may be done.

Pattern Construction—General Considerations

Figure 5:
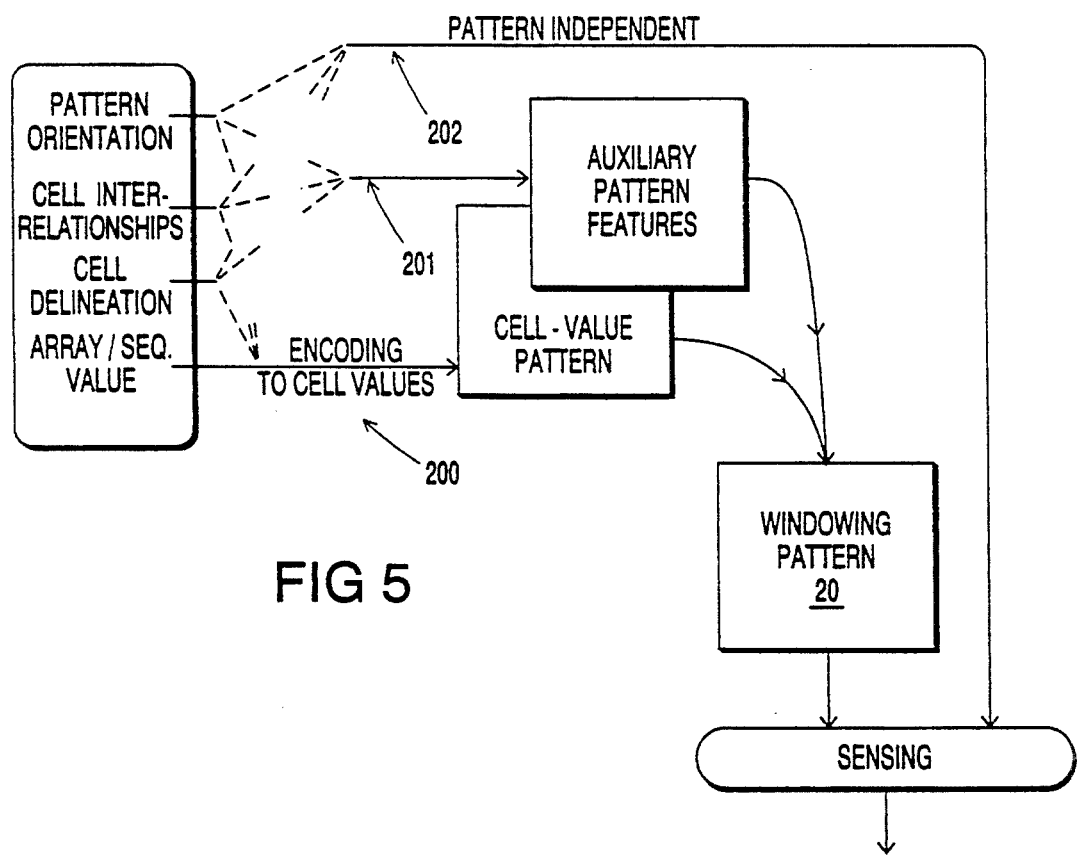
FIG. 5—is a diagram illustrating how various pattern features are encoded for sensing.

Precisely what information needs to be recoverably contained in the pattern 20 to enable sub-pattern sensing and position determination depends on the nature of the underlying array/sequences, the encoding method used, and on the sensing method employed. However, in general terms information is required as to:

array/sequence element value
cell delineation
cell inter-relationship in forming a pattern
pattern orientation As depicted in FIG. 5, information on these items can be provided in three basic ways, namely inherently in the cell values that encode the underlying array/sequence (see line 200); as explicit auxiliary pattern features combined with the encoding represented by the cell values (see line 201), and independently of the pattern (see line 202).

The interrupted dashed connections between the information items of pattern orientation, cell inter-relationship and cell delineation on the one hand and the three methods 200, 201,202 of providing this information on the other, is intended to indicate the variety of combinations possible. Each of the above-listed information items is discussed below.

For convenience, hereinafter the value of each cell will be taken to be represented in the pattern 20 as a colour unique to each possible value, it being appreciated that the teaching given below generally applies to any other form of physical presentation of cell value.

Array/Sequence Value Encoding—There are two main encoding techniques, one being to allot each cell $C_{ij}$ a colour representing the absolute value of a corresponding element of the array to be encoded, and the other being to encode a sequence element value as a change in colour between two cells when moving in a direction aligned with the pattern axis associated with the sequence. A more detailed consideration of transitional encoding is given further on.

Cell Delineation—It is important to be able to detect transition from one cell to another, that is, to be able to detect cell boundaries. Cell boundary information can be encoded with cell values (method 200 of FIG. 5) by use of an encoding scheme which ensures that neighbouring cells do not have the same colour (even if, in the case of absolute value encoding, the same element value of the underlying array or sequence is being encoded). In the simplest case, each cell can be considered as having four neighbours, two horizontally and two vertically (diagonal transitions being either prevented or otherwise detected, or the apparatus being designed to tolerate errors that may result from such transitions).

Figure 6:
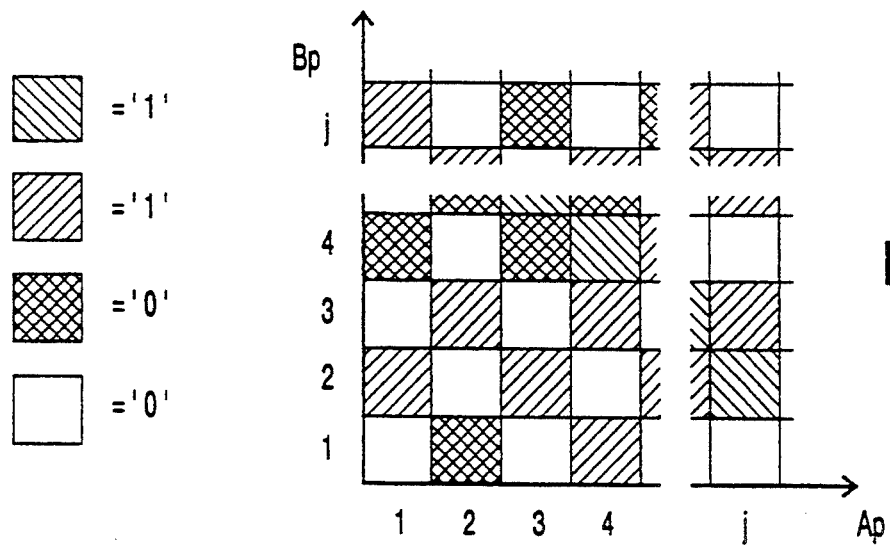
FIG. 6—is a diagram illustrating absolute-value encoding of a binary array using four colours.

FIG. 6 illustrates the absolute-value encoding of a binary arrays using four colours, two each to represent each binary value "1" and "0". If transitions to diagonal neighbours are also be be reliably detected, then the encoding scheme must additionally ensure that these diagonal neighbours will always be differently coloured to the cell under consideration.

Figure 7:
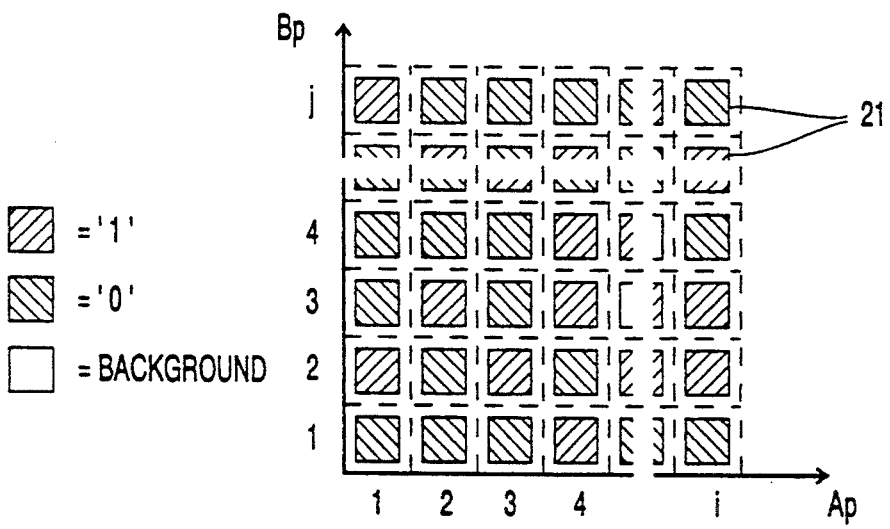
FIG. 7—is a diagram illustrating absolute-value encoding of the FIG. 6 binary array using three colours.

Cell boundary information can also be encoded by providing auxiliary pattern features (method 201 of FIG. 5) and, in particular, by providing separator zones between the value-defining area of each cell. FIG. 7 illustrates the absolute-value encoding of the same binary array as encoded in FIG. 6 using three colours—a first, background colour represented by blank spaces in the Figure, a second colour corresponding to a first binary value (for example "0") and represented by hatching in a first direction in FIG. 7, and a third colour corresponding to the second binary value (for example "1") and represented by hatching in a second direction in FIG. 7. The value of each cell $C_{ij}$ is represented by a square 21 of the corresponding second or third colour, this square of colour (an indicia) being smaller than the pattern cell size and being centrally positioned in its cell to leave a border all around, in the first colour, that provides separator zones between the colour squares 21 so that neighbouring squares can be the same colour without causing problems. With the relative dimensioning of separator zones and colour squares shown in FIG. 7, there is some risk that a single-pixel sensing head 16 could travel at least part way across the pattern along the background and therefore fall to detect correctly the value-representing colour squares 21. However, provided the separator zones are kept relatively narrow, the chances of this happening to a significant extent are small. With the FIG. 6 pattern there is, of course, no risk of the sensing head missing the value representing cell areas.

Cell boundary information can also be provided by a combination of encoding with cell value (as in FIG. 6) and the use of separator zones (as in FIG. 7). For example, transitions in the horizontal direction could be rendered detectable by ensuring a change in cell colour whilst transitions could be marked by separator zones.

The use of pattern-independent means to delimit cell boundaries is also possible, for example, by providing means that register movement of the sensing head 16 by vertical and horizontal distances corresponding to the vertical and horizontal pitch of the cells. Such arrangements are not preferred.

Cell Inter-Relationship Information—It is, of course, necessary to be able to positionally relate a sensed cell to previously sensed cells in order to ascertain the relative locations of array/sequence elements decoded from the sensed pattern thereby to accurately construct a windowing sub-array or sub-sequences. Where the sensing head 16 senses more than one cell at a time, the inter-relationship of the sensed cells can be readily derived from the sensed image, the cell inter-relationship information being directly conveyed. However, where a single-pixel sensing head is used, the cell inter-relationship information must be conveyed by one (or more) of the three general methods 200, 201, 202 of FIG. 5, or else an assumption must be made regarding sensing head movement (for example, that it is moving in a straight line) and the resultant decoded array/sequence then checked for consistency with this assumption. In fact, for single-pixel sensing an acceptable solution may lie in providing some inter-relationship information and also making some assumptions as to direction of movement.

Encoding of full cell inter-relationship information along with cell value information (method 200) requires that each neighbour cell of any given cell all present different colours from that cell and the other neighbours cells, regardless of the underlying element values being encoded. Even if only horizontal and vertical transitions are considered (and not diagonal transitions), a mimimum of nine colours are required; when diagonal transitions are taken into account, at least seventeen colours are needed which is not preferred due to the demands placed on the sensing head 16 and associated colour detection circuitry.

Figure 8:
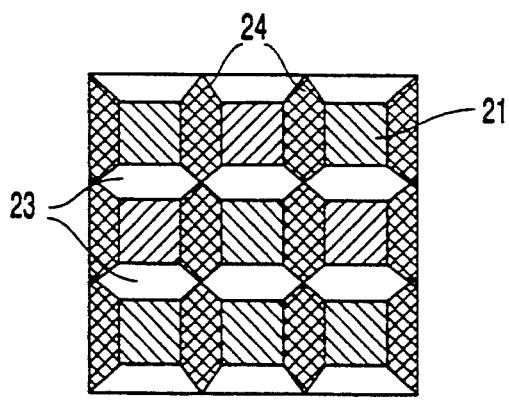
FIG. 8—illustrates part of a pattern in which the value of each cell is represented by an appropriate coloured square and separator zones are used to delimit each cell.
Figure 9:
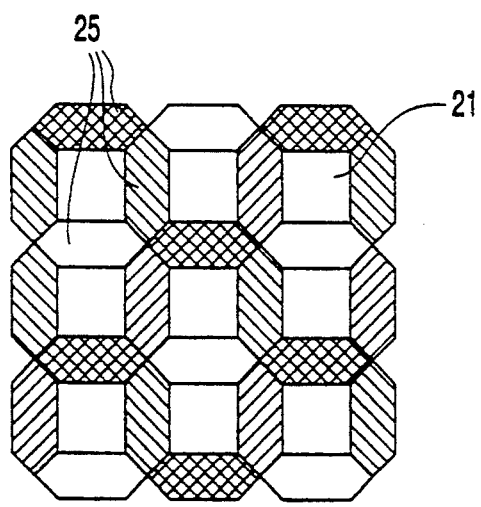
FIG. 9—shows a pattern similar to FIG. 8 but in which the separator zones are each coloured in one of four possible separator zone colours distinct from colours used for the squares.

Cell inter-relationship information can be incorporated in auxiliary pattern elements (method 201 of FIG. 5), a preferred way of doing this being to colour code separator zones provided to delineate cell boundaries. Thus, FIG. 8 illustrates part of a pattern in which the value of each cell is represented by an appropriate coloured square 21 and separator zones 23 and 24 are used to delimit each cell. The separator zones 23 delimit each cell in a vertical direction and the separator zones 24 delimit each cell in a horizontal direction. The zones 23 are of a different colour to the zones 24 and both zone colours are different from the colours used for the colour squares 21. Such an arrangement gives horizontal and vertical relationship information during transition from one cell to another but does not indicate whether the new cell lies above/below (for vertical movement) or to the right/left (for horizontal movement). For the FIG. 8 pattern, it is therefore necessary to make an assumption in respect of this direction information. FIG. 9 shows a pattern similar to FIG. 8 but for which it is unnecessary to make any assumptions as to direction. In FIG. 11, colour squares 21 are again used to encode array/sequence element values although in this case, the colouring of the square 21 is not shown for ease of illustration. The colour squares 21 are separated from each other by separate zones 25 each coloured in one of four possible separator zone colours distinct from the colours used for the squares 21. The separator zones separating adjacent squares 21 in rows running parallel to the horizontal axis $A_p$ are alternatively coloured in two of the four possible separator zone colours whilst the zones 25 separately adjacent square 21 in columns running parallel to the vertical axis $B_p$ are alternatively coloured in the other two of the four possible separator zone colours. Whenever a single pixel sensing head 16 transits from one colour square 21 to another, it will cross a zone 25 the colour of which uniquely indicates the direction of movement of the sensing head 16. Furthermore, since diagonal transitions will generally involve crossing the ends of two separator zones, one of each type, the inter-relationship of starting and finishing cells in a diagonal transition can also be determined.

The provision of cell inter-relationship information by means independent of the pattern itself (method 202 of FIG. 5) is, of course, feasible (for example by sensing direction of movement of the sensing head 16 over the pattern) but will generally not be preferred.

Pattern Orientation Information—Depending on the orientation characteristics of the underlying array/sequences, differing amounts of orientation information need to be provided. Thus, for patterns based on 4-orientable arrays, no orientation information is needed whilst for patterns constructed from orientable or complement-orientable sequences, it is generally only necessary to identify which sequence runs in the horizontal direction and which runs in the vertical direction.

Figures 10A, 10B:
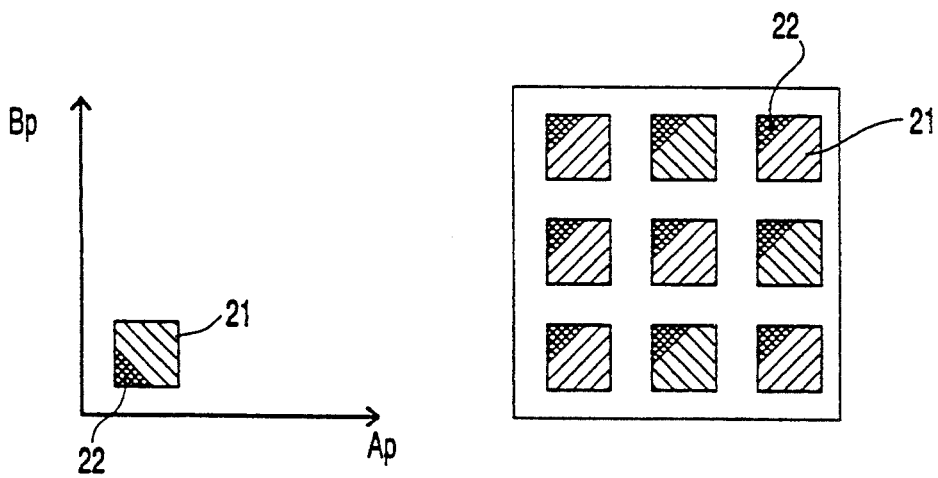
FIG. 10A—illustrates one cell of a pattern, the cell being marked with a orientation indicator.
FIG. 10B—shows a sub-pattern made up of cells carrying orientation indicators.

As with the other types of information, pattern orientation information can be made available in accordance with any one (or more) of the methods 200, 201, 202 of FIG. 5. However, it may be noted that orientation information is closely related to cell inter-relation information and can generally be provided jointly with the latter. For example, for the FIG. 8 pattern the separator zones 23, 24 already identify vertical and horizontal transitions respectively, and this is all the orientation information required for 2-orientable pattern (in fact, the separator zones 23, 24 need only have identified different transition directions to give the desired cell inter-relationship information—the association of separator zones 23 with vertical transitions and zones 24 with horizontal transitions actually provides the additional orientation information).

Where cell inter-relationship information is not specifically provided (for example, because it is apparent upon inspection as with a sensing head 16 that senses more than one cell at a time), then of course the orientation information cannot be incorporated with the cell inter-relationship information and specific means must be used to carry the orientation information. FIG. 10 illustrates one such way of providing orientation information (by method 201 of FIG. 5). More particularly, FIG. 10A illustrates how a colour square 21 such as is used in FIG. 7,8 and 9 to encode array/sequence element value information, can be marked in its corner directed towards the origin of axes $A_p$ and $B_p$, with an orientation indicia 22 of a different colour to the colours used for the colour square 21. If all the colour squares of a pattern were marked in this way, then upon a sub-pattern being sensed, it is a relatively easy matter to determine the orientation of the sub-pattern. Thus, for example, the sub-pattern shown in FIG. 10B (which corresponds to the first three rows and columns of the FIG. 7 pattern with orientation indicia added) can be seen to be rotated through 270° relative to the pattern orientation of FIG. 10A. Orientation indicia 22 of the FIG. 10 form are, of course, only applicable to cases where the sensing head 16 provides sufficient resolution to discern the relationship between at least one such indicia and its associated colour square 21.

Example Encodings

Having discussed the types of information requiring to be provided for pattern recovery and given examples of how each information type might be encoded, several complete encoding schemes are next considered for recoverably encoding both arrays and sequences. All the encoding schemes considered below encode the required information within the pattern 20 (that is, by use of methods 200, 201 of FIG. 5); provision of information independently of the pattern 20 is generally not preferred as is would require a supplementary sensing system.

Encoding of Arrays—Two dimensional arrays are preferably encoded by absolute value encoding of their element values. For example, for a 2-orientable array, an encoding scheme such as used for the FIG. 8 pattern is suitable. In the FIG. 8 pattern, array element values are encoded by an appropriate one of two colours for the colour squares 21; cell delineation is provided by the separator zones 23,24; cell inter-relationship information (vertical, horizontal and diagonal relationships) for single-pixel sensing is provided by differently colouring the zones 23 and 24; and orientation information is provided by knowing which zone colour is associated with vertical transitions and which with horizontal transitions.

Encoding of Sequences using Absolute-Value Encoding—For patterns based on pairs of orthogonal sequences, one extending horizontally and the other vertically, the sequences must first be combined into a two-dimensional array for absolute-value encoding to be readily applicable. FIG. 11 illustrates two possible ways of deriving a suitable array from two orthogonal sequences (in the illustrated examples, the sequences are two PRBSs referred to as PRBS-1 and PRBS-2).

In FIG. 11A, PRBS-1 has been written out parallel to the horizontal axis $A_p$ and PRBS-2 has been written out parallel to the vertical axis $B_p$. Within each cell $C_{ij}$ has been written the ordered pair of element values from PRBS-1 and PRBS-2, corresponding to that cell. There are four possible such ordered pairs, these being (0,0), (0,1), (1,0) and (1,1). By assigning a value to each different ordered pair, it is possible to assign one of four possible values to each cell. It is this cell value that is subsequently translated into a corresponding pattern feature.

In FIG. 11B the two PRBS's have again been written out along the axes $A_p$ and $B_p$ respectively. However, this time the elements of PRBS-2 have been written at a spacing of two rows between adjacent elements, starting at the second row. Each odd numbered row of the cell array (the first row being numbered row one) is filled with a copy of PRBS-1. Each even row is filled with the corresponding element value from PRBS-2. The value of each cell is thus either one or zero as each cell is only associated with an element from one of the two PRBSs.

Figure 12:
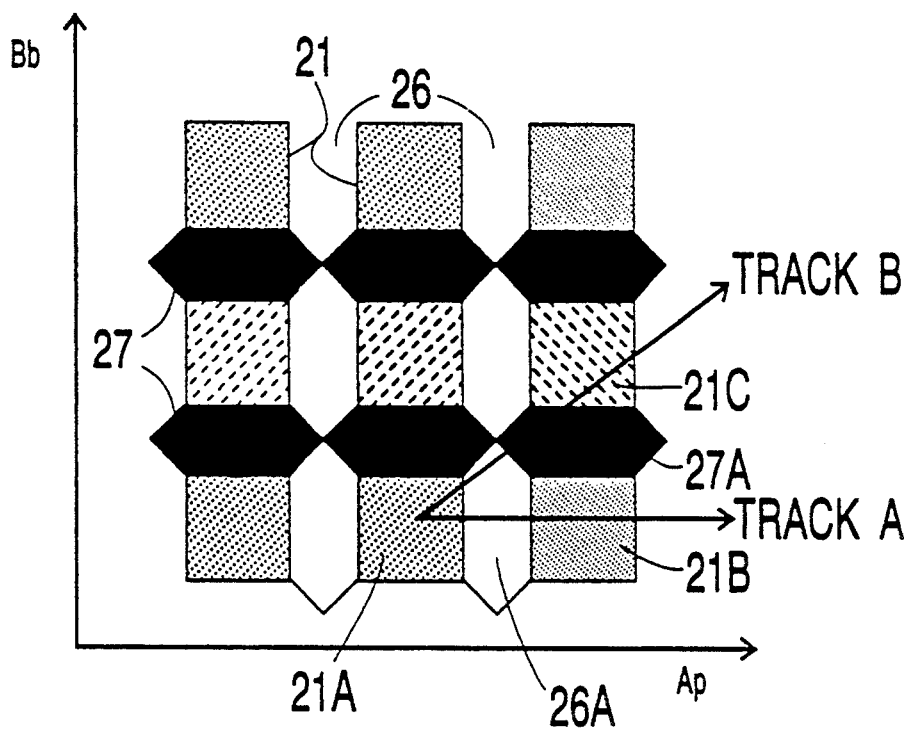
FIG. 12—illustrates pan of a pattern produced by the FIG. 11A combing scheme.

FIG. 12 illustrates a pattern produced by an absolute value encoding of an array formed by combining two orientable (reversible) binary sequences in the manner illustrated in FIG. 11A (it will be appreciated that the array and resultant pattern are 2-orientable). The pattern cells can take on four possible values and accordingly four colours are used for encoding array element values. Cell boundary information, cell inter-relationship information and pattern orientation information are all provided by white and black separator zones 26, 27 in the same manner as the zone 23, 24 of the FIG. 8 pattern (as the pattern is 2-orientable, it is only necessary to be able to distinguish between horizontal and vertical orientations). In all, six colours are used in the FIG. 12 pattern. With regard to cell inter-relationship information, although it is possible to distinguish between horizontal, vertical and diagonal transitions, with a single-pixel sensing head 16 it is not possible to ascertain the direction of a detected transition. However, it is practical to proceed on the basis that the direction of movement of the sensing head remains unchanged; this assumption will only be incorrect in the case of direction reversal and such an event can be quickly detected due to the resultant mismatches with the expected pattern. Where a sensing head with a multi-cell field of view is used, then all necessary movement direction information can be derived from the sensed image.

Figure 13:
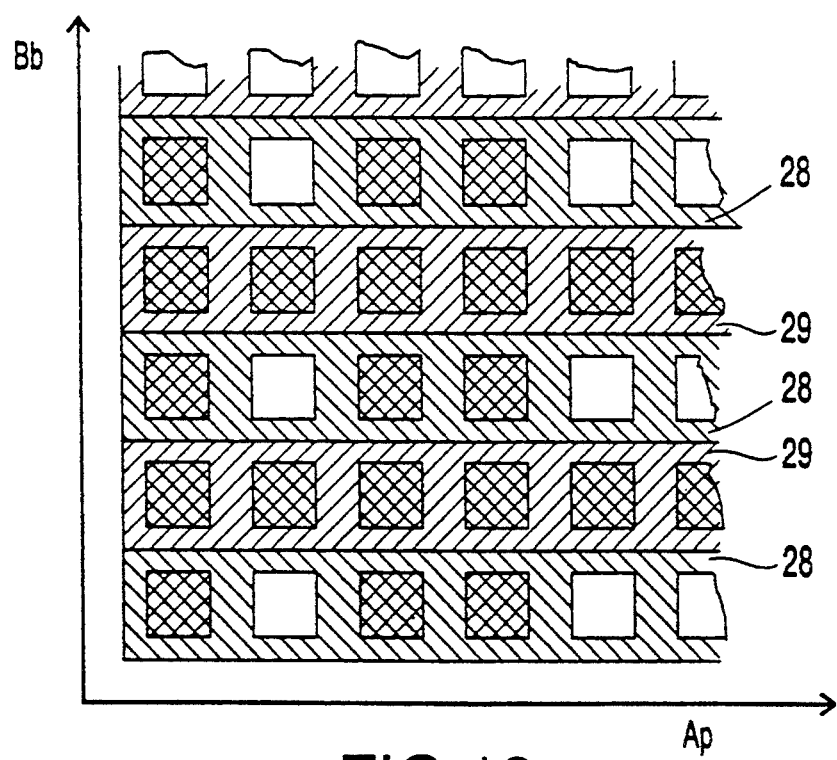
FIG. 13—illustrates part of a pattern produced using the FIG. 11B combining scheme.

FIG. 13, like FIG. 12 illustrates a pattern produced by an absolute value encoding of an array based on two orientable (reversible) binary sequences; however, in this case the sequences have been combined into an array in the manner illustrated in FIG. 11B whereby each cell has only two possible values (in fact, FIG. 13 is an encoding of the sequences shown in FIG. 11B). In the FIG. 13 example, the cell boundary issue is tackled by the use of colours squares 21 on a differently coloured background (reference FIG. 7); as a result, only two colours are needed to represent cell value, one for each possible binary value. The background is represented by two further colours with the cells in odd pattern rows having a first background colour 28 and cells in even pattern rows having a second background colour 29. As a result, the colour squares 21 appear against a striped background that provides both some limited cell inter-relationship information, as well as orientation information sufficient to indicate which row relates to which of the two underlying reversible sequences.

In the FIG. 11B arrangement for combining the $A_p$-axis sequence and the $B_p$-axis sequence into an array, each alternate row contains cells representing the same element of the $B_p$-axis sequence; similarly, each alternate row of the FIG. 13 pattern contains colour squares 21 representing the same element of the $B_p$-axis sequence. As a result, it is possible to modify the FIG. 13 pattern by running together the colour squares 21 in the same $B_p$-axis sequence row. Indeed, at the cost of using one extra colour, each row being used to represent an element value of the $B_p$ axis sequence, can do so by being fully coloured with one of two unique colours depending on the binary value of the value of the element being represented (these colours would be different to the ones used to represent the elements values for the $A_p$-axis sequence). Colour squares 21 would then no longer be used to represent the $B_p$ axis seqeunce. Furthermore, the colour squares 21 used to represent the $A_p$-axis sequence can now be extended parallel to the $B_p$-axis to the edge of the adjacent rows because these rows can be guaranteed to be of a different colour to the $A_p$-axis sequence squares 21; the background zones separating the $A_p$-axis sequence squares 21 in the direction parallel to the axis $A_p$ would, however, be retained to ensure discrimination between adjacent cells. Thus, in this modified form of the FIG. 13 pattern, the cell boundary detection issue is dealt with by the FIG. 6 technique when moving along $A_p$-axis sequence rows and by the FIG. 7 technique when moving between rows.

Encoding of Sequences using Transitional Encoding—Where a pattern 20 is directly based on two underlying orthogonal windowing sequences, one (herein the horizontal sequence) for position determination along the horizontal pattern axis $A_p$ and the other (the vertical sequence) for position determination along the vertical pattern axis $B_p$, then it is convenient to use a transitional encoding scheme to encode sequence values. More particularly, changes in cell value during horizontal cell-to-cell transitions in the pattern are used to encode element values of the horizontal sequence, whilst changes in cell value during vertical cell-to-cell transitions are used to encode element values of the vertical sequence. As transitional encoding schemes appear of practical significance, a general review of such schemes is given below after which three example encodings are considered. The review covers both schemes with and without separator zones; where separator zones (or, for brevity, just "separators") are provided, then any colour coding of the separators to convey cell inter-relationship or pattern orientation information is done on an absolute value basis, not a transitional basis.

Schemes that do not employ separators are referred to as 'no separator' schemes. Schemes in which only horizontal, or only vertical, transitions are marked by separators are referred to as 'one separator' schemes. Schemes in which both horizontal and vertical transitions are marked by respectively coloured separators, are referred to as 'two separator' schemes (schemes in which a single colour of separator is used to mark both vertical and horizontal transitions are not considered).

In the following discussion, a first binary windowing sequence (the X-sequence) is to be encoded running parallel to the horizontal pattern axis $A_p$ and a second binary windowing sequence the (Y-sequence) it to be encoded running parallel to the vertical pattern axis $B_p$.

Suppose that the transitions in the horizontal direction (positive direction of axis $A_p$) are given by the functions $h_0$ and $h_1$, and in the vertical direction (positive direction of axis $B_p$ by functions $v_0$ and $v_1$ where the suffixes "0" and "1" refer to the value of the X or Y sequence element to be encoded. This means that if the current cell is coloured with colour c, then the next cell in a horizontal direction is coloured with colour $h_0(c)$ or $h_1(c)$ according to the value of the corresponding sequence element. The conditions on these functions are that the resultant pattern must encode element value information, must delineate the pattern cells (by colour change between neighbouring cells if no separator is present), and must permit adequate cell inter-relationship and pattern orientation information to be recovered; with regard to the cell inter-relationship and pattern orientation information, the minimum amount of information that must be recoverable shall be taken to be that enabling horizontal and vertical movements to be distinguished and identified. A further condition is that the encoding must be well defined (that is, whatever path is taken across the pattern, application of the encoding functions produce a consistent coding for any given destination cell).

These conditions alone lead to some conclusions about the minimum number of colours necessary for certain types of encoding scheme. Thus, for the coding to be well defined:

$$h_i(v_j(c)) = v_j(h_i(c)) \text{ for all colours x and } i,j \in \{0,1\},$$

for otherwise there would be a conflict when determining the colour of the cell diagonally adjacent to a cell coloured c. Furthermore, for decoding to be possible, it must be possible to distinguish between $h_0(c)$ and $h_1(c)$ and between $v_0(c)$ and $v_1(c)$; In other words:

$h_0(c) \neq h_1(c)$ for all colours c and
$v_0(c) \neq v_1(c)$ for all colours c.

If there are no separators, there must be no adjacent cells coloured with the same colour (here "adjacent" is taken as vertically or horizontally adjacent, not diagonally) and horizontal movement must be distinguishable from vertical movement by cell colour so that:

$c, h_0(c), h_1(c), v_0(c), v_i(c)$ must all be different for each colour c.

If there is just one set of separators then:
$c, h_0(c), h_1(c)$ must all be different for each colour c; or
$c, v_0(c), v_1(c)$ must all be different for each colour c.

Where two sets of separators are provided, adjacent cells can, of course, be the same colour.

On the basis of the foregoing:
If there are no separators, then at least 5 colours are needed.
If there is just one set of separators, then at least 4 colours are needed.

If there are two sets of separators, then at least 4 colours are needed.

The above discussion only considered horizontal and vertical transitions. Where diagonal transitions are allowed, when such a move is made, there are two bits of information to be determined one for each of the sequences X-sequence, Y-sequence, and referred to below as the X-bit and the Y-bit respectively. There are several levels of information possible depending on the encoding scheme used. Thus, it might only be possible to tell that a diagonal move has been made, or it might also be possible to tell that the X-bit and Y-bit are equal (or unequal), or even what the values of both the X-bit and Y-bit are; another possibility is that it is possible to ascertain either the information that the X-bit and Y-bit are equal, or the value of both bits.

In terms of the functions $h_i$ and $v_j$ the colours in the following set may occur a diagonal move away from a cell coloured c:

$$\{(h_0(v_0(c)), h_0(v_1(c)), h_1(v_0(c)), h_1(v_1(c))\}.$$

Note that this set has at least two elements, because $h_0(v_j(c)) \neq h_1(v_j(c))$ and $h_i(v_0(c)) \neq h_i(v_1(c))$. The size of this set determines the amount of information that can be obtained once it is known that a diagonal move has taken place. An encoding scheme will be said to be r-diagonal (where r=2,3,4) if the size of this set if equal to r) the problem of detecting diagonal moves is different depending on the number of separators. If there are two sets of separators, then diagonal moves are automatically detected by the separators. At the other extreme, if there are no separators, then the diagonal values must not be the same as any horizontal or vertical ones: in other words, the following condition must be satisfied for each where c:

$$\{c, h_0(c), h_1(c), v_0(c), v_1(c)\} \cap \{h_0(v_0(c)), h_0(v_1(c)), h_1(v_0(c)), h_1(v_1(c))\} = 0$$

If there is one set of separators, say separating cells in a vertical direction, then crossing a separator indicates either a vertical or a diagonal move has occurred. For one separator scheme, therefore, the following condition must be satisfied for each colour c:

$$\{v_0(c), v_1(c)\} \cap \{h_0(v_0(c)), h_0(v_1(c)), h_1(v_0(c)), h_1(v_1(c))\} = 0$$

The above-stated additional conditions resulting from a consideration of diagonal transitions means that:
  If there are no separators, then the following numbers of colours are required: 8 for a 2-diagonal encoding; 8 for a 3-diagonal encoding; and 9 for a 4-diagonal encoding.
  If there is just one set of separators, then the following numbers of colours are required: 5 for a 2-diagonal encoding; 6 for a 3-diagonal encoding; and 7 for a 4-diagonal encoding.
  If there are two sets of separators, then the following numbers of colours are required: 4 for a 2-diagonal encoding; 5 for a 3-diagonal encoding; and 6 for a 4-diagonal encoding.

Where diagonal transitions are permitted, schemes providing 4-diagonal properties are preferred as they facilitate recovery of X-bit and Y-bit information.

The foregoing conditions placed on the encoding functions do not guarantee that full cell inter-relationship or pattern orientation information will be recoverable. Whilst it is usually adequate to make the assumption that the direction of movement remains unchanged until an inconsistency is detected, this still leaves a deficiency of orientation information for 1-orientable sequences (deBruijn sequences and PRBSs). Furthermore, for both orientable and complement-orientable sequences, further conditions must be placed on the encoding functions in order to present the 2-orientable property. These further requirements of the four types of sequences are considered below:

Considering for example the horizontal dimension in which the X-sequence is encoded, then the only possible transitions from a given cell of colour c are $h_0(c)$, $h_1(c)$, $h_0^{-1}(c), h_1^{-1}(c)$ where the superscript "−1" indicates a reverse transition. The further conditions to be placed on the encoding function are then:
  de Bruijn sequences —in order to give full orientation information $h_0(c), h_1(c), h_0^{-1}(c), h_1^{-1}(c)$ are all different
  PRBS—in order to give full orientation information: $h_0(c) = h_0^{-1}(c); h_1(c) \neq h_1^{-1}(c)$ (in this case, any window sequence will contain a "1" and the encoding of this "1" gives direction information on reading)
  Orientable Sequences—in order to present the 2-orientable property: $h_0(c) = h_0^{-1}(c); h_1(c) = h_1^{-1}(c)$
  Complement Orientable—in order to present the 2-orientable property: $h_0 = h_1^{-1}(c)$ It may be noted that the above conditions placed on the encoding of the de Bruijn sequences does provide full cell inter-relationship and pattern orientation information so that no assumptions are needed regarding the movement direction; schemes satisfying the stated conditions do, however, require a substantial number of colours.

Figures 14A, 14B, 14C:
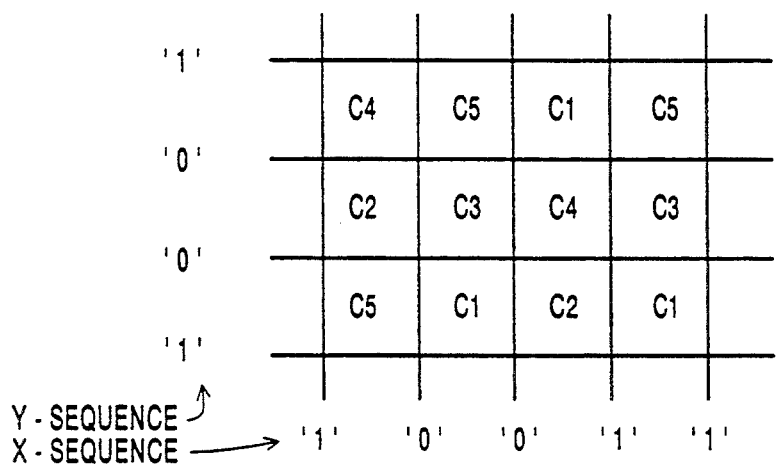
FIG. 14A—is an encoding table showing a first encoding scheme for transitionally encoded patterns.
FIG. 14B—is a diagram illustrating part of a pattern produced by application of the FIG. 14A encoding scheme.
FIG. 14C—is a de-coding table for the FIG. 14B pattern.

Having considered the conditions generally required to be fulfilled by the encoding function, two types of such functions are described followed by examples. More particularly, the following two types of functions have been found of use:
  "Addition modulo N":
   $h_0(c) = c + a$ (mod N), $h_1(c) = c − a$ (mod N),
   $v_0(c) = c + b$ (mod N), $v_1(c) = c − b$ (mod N),
   where $a, b \neq 0$
  "Bitwise Exclusive-OR":
   $h_0(c) = c.XOR.a$; $h_1(c) = c.XOR.b$
   $v_0(c) = c.XOR.d$; $v_1(c) = c.XOR.e$
   where $a, b, d, e \neq 0$,
   $a \neq b$ and $d \neq e$
First Example
  FIG. 14.
  No separators, Five colour encoding
  $h_0(c) = c + 1$ (mod 5); $h_1(c) = c − 1$ (mod 5),
  $v_0(c) = c + 2$ (mod 5); $v_1(c) = c − 2$ (mod 5)
  No diagonal properties
  Suitable for compliment-orientable sequences This encoding scheme produces the simplest pattern in the sense that it uses only five colours and has no separators. However, because it has no diagonal properties, the scheme is only suitable for situations where diagonal transitions do not occur or occur ony infrequently. FIG. 14A gives the encoding table for the scheme, each horizontal row giving the result of applying each of the encoding functions to one particular colour (the five possible colours are referenced C1 to C5). FIG. 14B illustrates a portion of a pattern generated by applying the encoding scheme to encode the X- and Y-sequence sections shown in that Figure. FIG.

14C is a decoding table which given the old and new cell colours, decodes a transition into an X-bit or Y-bit, the bit values shown in the table being followed by X or Y to indicate the sequences to which they belong.

Second Example

FIG. 15.

Figures 15A, 15B, 15C:
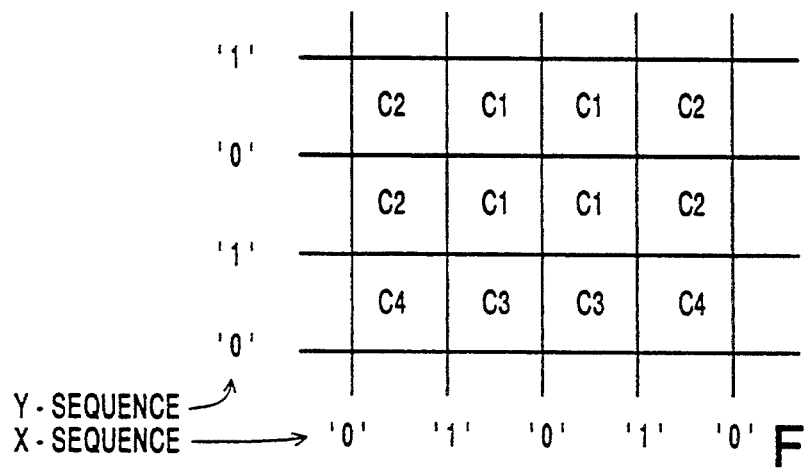
FIG. 15A—is an encoding table showing a second encoding scheme for transitionally encoding a pattern.
FIG. 15B—is a diagram of part of a pattern produced using the FIG. 15A encoding scheme.
FIG. 15C—is a decoding table for the FIG. 15B pattern.

Two separators, six colour encoding $h_0(c)=c$; $h_1(c)=c.XOR.1$ $v_0(c)=c$; $v_1(c)=c.XOR.2$ Four diagonal properties Suitable for orientable sequences This encoding scheme realises the minimum number of colours for a 4-diagonal coding and when used to encode two orientable sequences, produces a pattern of significant practical utility (even though full cell inter-relationship is not provided, requiring the assumption to be made that the direction of movement remains constant until otherwise proven). Of the six colours, two are used for the separators (one for the separators crossed when moving vertically and the other for separators crossed when moving horizontally); the remaining four colours are used to carry sequence element value information. FIG. 15A shows an encoding table for the scheme, the four colours, used for carrying the element value information being referenced C1, C2, C3, C4 with respective binary values of 00,01,10,11. FIG. 15B represents a pattern portion derived from using the encoding scheme to encode the portions of the X-and Y-sequences shown in that Figure (it will be appreciated what in FIG. 15B the separators have not been depicted—the actual form of the pattern being similar to that shown in FIG. 12 with the colours C1 to C4 being the colours of the colour squares 21). FIG. 15C shows a decoding table for deriving X- and Y-bit values from colour transitions read from a pattern encoded according to the scheme. The decoding table is divided into three sections "Horizontal", "Vertical" and "Diagonal", the section relevant to a particular transition being dependent on the direction of movement of the sensing head as determined by the colour of the separator (or separators) crossed in the course of the transition. A diagonal transition does of course produce both an X-bit and a Y-bit value whilst horizontal and vertical transactions only produce an X-bit and Y-bit respectively.

Third Example

FIG. 16.

Figures 16A, 16B, 16C:
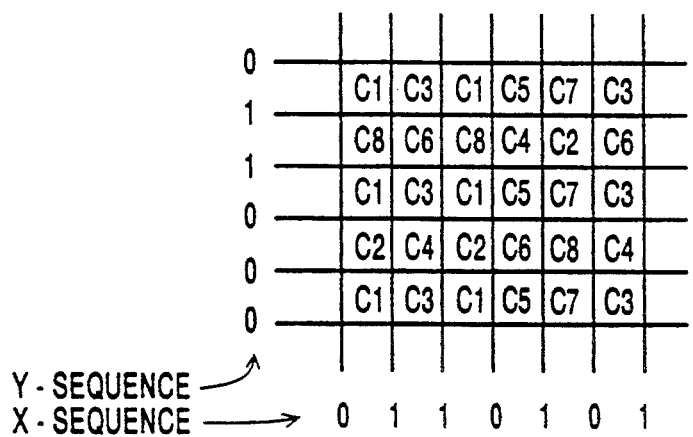
FIG. 16A—is an encoding table for a third encoding scheme for transitionally encoding a pattern.
FIG. 16B—is a diagram of part of a pattern produced using the FIG. 16A encoding scheme.
FIG. 16C—is a decoding table for the FIG. 16B pattern.

No separators, 8 colour encoding $h_0(c)=c.XOR.4$; $h_1(c)=c.XOR.2$ $v_0(c)=c.XOR.1$; $v_1(c)=c.XOR.7$ Two diagonal properties Suitable for orientable sequences In this encoding scheme, eight colours C1 to C8 are used with respective binary values of (000) to (111). FIG. 16A shows an encoding table for the scheme. FIG. 16B represents a portion of a pattern encoded according to the scheme, and FIG. 16C shows a partial decoding table (untilled boxes in the table indicate diagonal transitions, but as the encoding scheme has only two diagonal properties, X-bit and Y-bit values are not immediately derivable).

Further Examples

Although the use of sequences that are neither orientable nor complement-orientable, is not preferred, for completeness suitable encoding functions for de Bruijn sequences and PRBSs are:

de Bruijn: $h_0(c)=c+1 \pmod 5$, $h_1(c)=c+2 \pmod 5$,

PRBS $v_0(c)=c \pmod 3$, $v_1(c)=c+1 \pmod 3$.

These functions only apply, of course, to one dimension and merely serve to illustrate the availability of functions satisfying the conditions previously given for obtaining full cell inter-relationship information for a particular sequence.

Pattern Sensing and Position Determination

The general functioning of the sensor 11, sub-pattern image processing unit 12 and position determining unit 13 have already been described.

For the patterns described above, the sub-pattern data passed from the sub-pattern image processing unit 12 to the position-determining unit 13, will generally be in the form of binary data representing the sub-array/-sub-sequences underlying the sensed sub-pattern in an orientation in which the location of the sub-array/sub-sequences can be uniquely determined within the pattern.

As indicated above, position determination can be effected by a matching process, by use of an index relating sub-pattern data to pattern position or by calculation. Position determination by calculation provides a good compromise between speed and cost, especially for large arrays and sequences. Where the windowing pattern is based on a combination of two PRBSs, then the location of each window-length subsequence sensed can be determined within its respective PRBS by using a computing machine to implement the method disclosed in Appendix C. Where the windowing pattern is based on a pseudo-random array, then position determination can be carried out by using a computing machine to implement the method disclosed in Appendix D.

As previously noted, following initial determination of the location of the stylus 11, the position determination unit 13 can be arranged to change its mode of operation to one in which any change in the pattern sensed by the stylus is used to provide an updated location based on the incremental change in location indicated by the change in sensed pattern. Operation in this mode depends on the apparatus being able to assess correctly the direction of movement of the stylus; alternatively, the apparatus may operate by assuming an unchanging direction of movement until a mismatch between a sensed pattern element and that predicted by the stored pattern indicates otherwise, the apparatus thereafter effecting a position recovery operation. In order to avoid an error in the detection of an incremental change giving rise to a progressively increasing position error as subsequent position changes are accumulated, an absolute position determination may be effected at appropriate intervals. Of course, whenever the stylus 11 is lifted off the pattern and replaced in a different position, an absolute position determination should be effected. Stylus lift-off can be readily detected by an appropriate sensor or simply by recognizing a loss of pattern image by the sensing head 16.

Example Implementation

A more detailed description will now be given, with reference to FIGS. 17 to 30, of a processor-based embodiment of the position-sensing apparatus which employs a single-pixel sensing head 16 to detect pattern features of a two separator six-colour pattern 20 that encodes two orientable binary sequences, and which utilizes incremental position updating following initial absolute-position determination. With certain differences (to be described) in the low-level processing effected by the FIG. 17 apparatus, the apparatus can be used both with a pattern of the FIG. 12 form in which sequence values are encoded in absolute terms, and with a pattern of the FIG. 15 form in which sequence values are encoded by transitions.

In the following description of the FIG. 17 apparatus, the two orientable binary sequences encoded in the pattern will be referred to as the X-sequence (providing position information in the horizontal co-ordination direction $A_p$) and the Y-sequence (providing position information in the vertical co-ordinate direction $B_p$).

Figure 17:
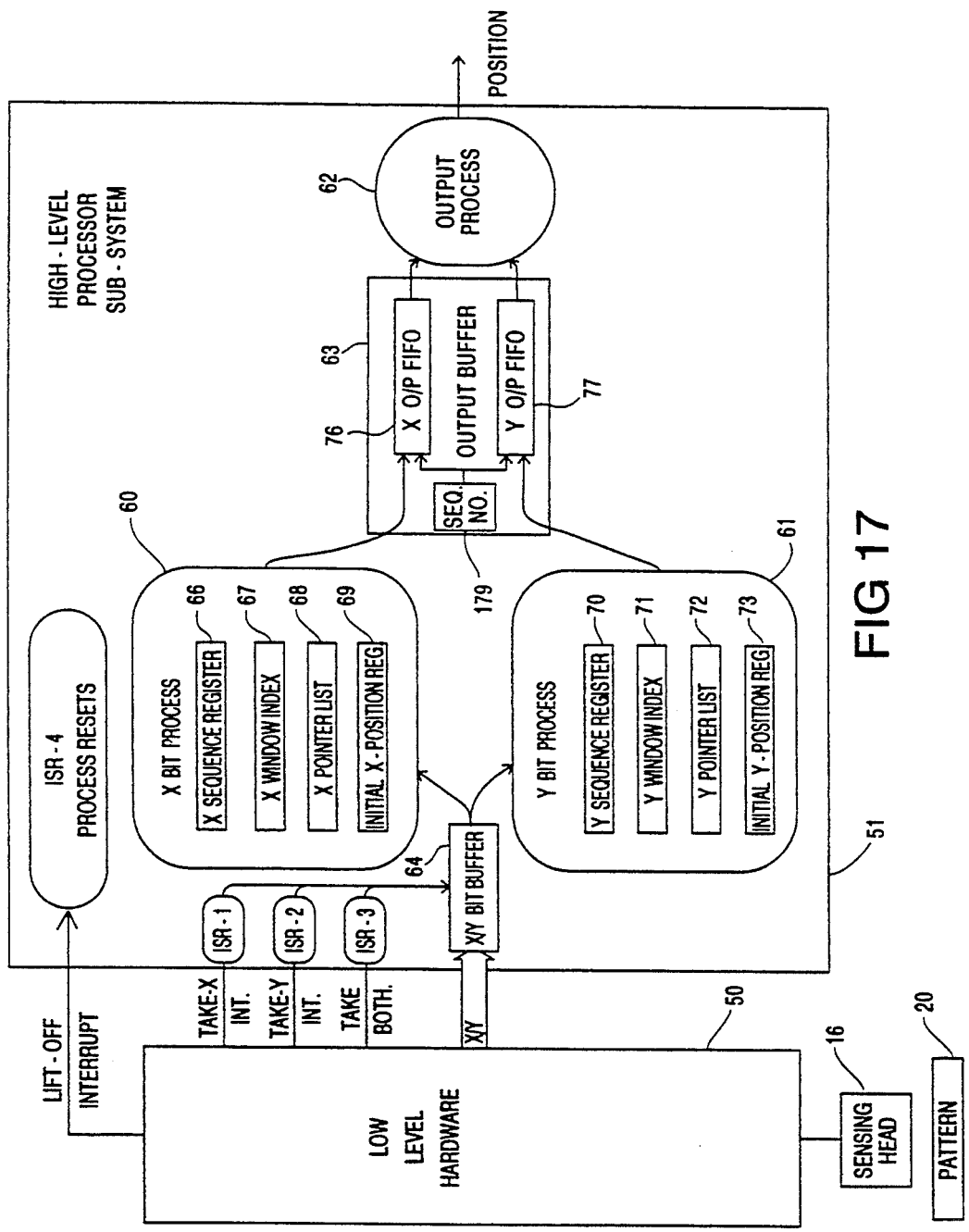
FIG. 17—is a diagram showing the main components of the position-sensing apparatus including a sensing head, low-level hardware, and a high-level processor sub-system.

The FIG. 17 apparatus comprises a pattern 20 (of the FIG. 12 or 15 form) a singlepixel sensing head 16, low-level hardware 50 for generating outputs indicative of the values of successively traversed X and Y bits, and a processor sub-system 51 for effecting high level processing of the outputs of the low level hardware 50 to track the movement of the sensor head 16 over the pattern 20.

Figure 18:
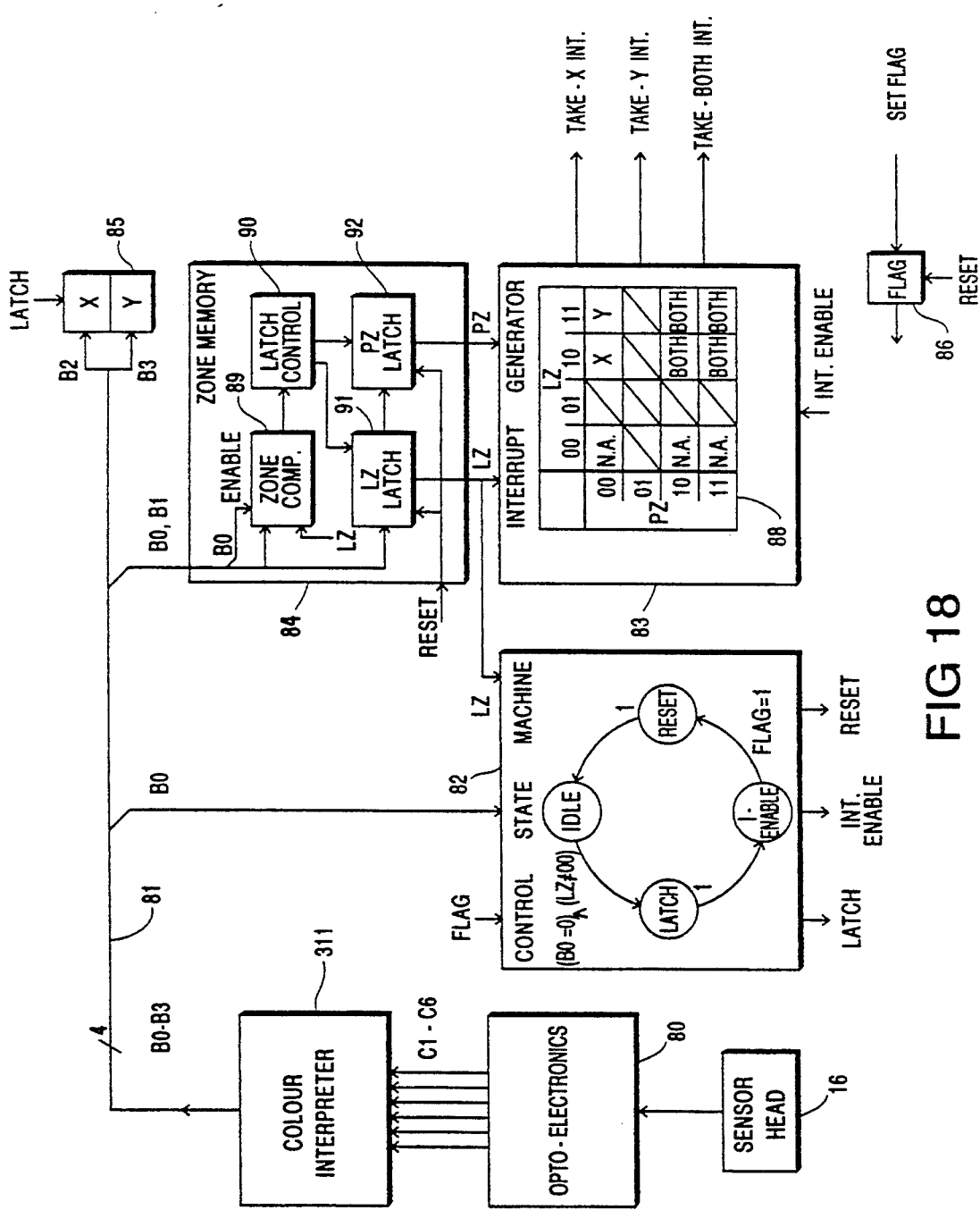
FIG. 18—is a diagram illustrating the operation of the low-level hardware of the FIG. 17 apparatus.

The low-level hardware 50 is illustrated in functional block diagram form in FIG. 18 and comprises opto-electronics block 80 operative to provide an output indicative of the colour sensed by the sensor head 16, a colour interpreter 311 outputting a four-bit code on bus 81 indicative of X and Y bit values and the presence of separating zones, a control state machine 82 controlling operation of the low-level hardware 50, a latch 85 for holding the X and Y bit values of a colour square 21 sensed by the head 16, a zone memory 84 for storing data on separating zones 26, 27 previously traversed by the head 16, an interrupt generator 83 for generating interrupts to cause the high level processor sub-system 51 to indicate to the low-level hardware 50 when it has finished servicing the last interrupt generated by the interrupt generator 83.

Figure 19:
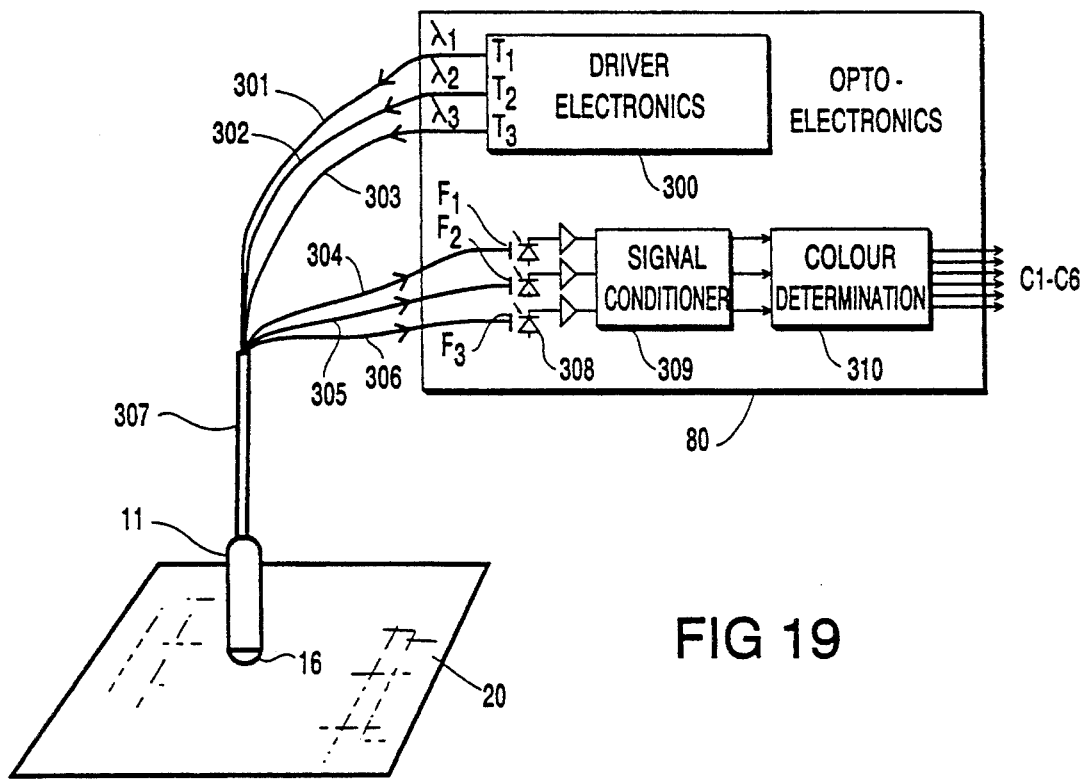
FIG. 19—is a diagram of the sensor head and optooelectronics of the FIG. 18 hardware.

The opto-electronics block 80 is shown in greater detail in FIG. 19. Both the FIG. 12 and FIG. 15 patterns use six colours (here referred to as C1 to C6) with four of these colours C1 to C4 being used for the colour squares 21 that represent X,Y value pairs, and two of the colours C5, C6 for the separating zones 26, 27 (separators) separating the squares. In this embodiment, the six different colours C1 to C6 to be detected in the pattern 20 are composed from three different monochromatic colour of wavelengths $x_1$, $x_2$ and $x_3$ respectively (it will be appreciated that these wavelengths will generally be in the visible or near-visible spectrum, including infra-red). More particularly, three of the pattern colours correspond to respective individual ones of the monochromatic colours whilst the other three pattern colours correspond to a respective monochromatic colour pairing that is ($x_1$, $x_2$), ($x_1$, $x_3$) and ($x_2$, $x_3$). Where a pattern element is represented in a particular colour, then this element is effective to reflect light incident on the element that is of a wavelength corresponding to the or each monochromatic component colour of the pattern colour concerned. To determine the colour of a pattern element, therefore simply requires the element to be illuminated by all three monochromatic colours and the reflected radiation analysed to determine which monochromatic colour or pair of colours has been substantially reflected from the pattern element.

Thus, in FIG. 19 three monochromatic light sources $T_1$, $T_2$, and $T_3$ powered by driver electronics 300 are arranged to launch optical signals of respective wavelengths $x_1$, $x_2$ and $x_3$ into respective optical fibres 301, 302 and 303 for the purpose of illuminating the pattern 20. The fibress 301, 302 and 303 together with reflected-radiation fibres 304, 305 and 306 are formed into a flexible bundle 307 that extends from the stationary opto-electronics block 80 to the probe 11. The fibres terminate juxtaposed a focusing lens and jointly constitute therewith the sensing head 16. The fibres may be-spliced together.

Figure 20:
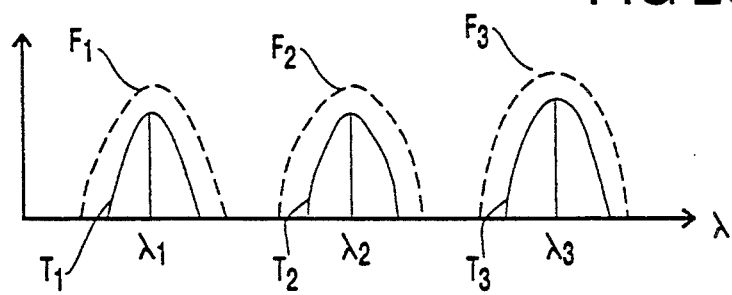
FIG. 20—is a graph illustrating the characteristics of the light sources and sensors used in the sensor head of FIG. 19.

The fibres 304, 305 and 306 pick up radiation reflected from the pattern and pass this radiation via respective filters $F_1$, $F_2$ and $F_3$ to respective photo-diodes 308 where the filtered radiation is detected. FIG. 20 shows the transmissivity of the filters $F_1$, $F_2$ and $F_3$ as a function of wavelength together with the envelope of the radiation transmitted by the light sources $T_1$, $T_2$ and $T_3$. As can be seen, filter $F_1$ passes light from the source T, filter $F_2$ passes light from the source $T_2$ and filter $F_3$ passes light from the source $T_3$.

The photo-diode signals are amplified and level detected in signal conditioning circuiting 309 to produce three monochromatic colour output signals indicative of the presence or absence of wavelength components $x_1$, $x_2$ and $x_3$ in the reflected radiation.

These output signals are passed to colour determining circuitry 310 which serves to translate the colour components into the corresponding one of the six colours C1 to C6 of the pattern 20 and to energize an appropriate one of six outputs of the circuitry 310; these outputs form the outputs of the opto-electronics circuitry 80 with the output representing the currently—sensed colour being at a logical "1" level and the other outputs being at a logical "0" level.

It will be appreciated that the opto-electronics 80 can be arranged in a variety of different ways to that described with reference to FIGS. 19 and 20. Thus, for example, the monochromatic light sources $T_1$, $T_2$ and $T_3$ could be pulsed to enable greater instantaneous power levels to be achieved and/or modulated and synchronously detected to improve noise immunity. Again, the three separate monochromatic sources $T_1$, $T_2$ and $T_3$ could be replaced by a broadband light source (a "white light" source). In this case, it would also be possible to represent the six pattern colours by respective, single wavelengths with the pattern colour then being detected directly by an arrangement of six filters and photo-detectors (care would, of course, need to be taken to ensure sufficient discrimination between adjacent colours). Furthermore, the light sources and detectors could all be packaged into the probe 11 and an appropriate cordless link (for example, a radio link) provided to pass detection signals to the remainder of the low-level hardware 50.

Returning now to a consideration of FIG. 18, the six colour outputs of the optoelectronic are fed to the colour interpreter 311 where a four-bit code is produced on line. Each bit B0 to B3 of the four-bit code output on line 81 has a particular significance. More particularly:

B0—indicates whether the head 16 is over a colour square 21 (in which case B0='0') or a separating zone 26, 27 (in which case B0='1');

B1—indicates the identity of the separating zone sensed by the head 16, having a value '0' when a zone 26 (traversed by the movement along the X-sequence) is encountered, and a value '1' when a zone 27 (traversed by movement along the Y-sequence) is encountered—it will be appreciated that the value of B1 is only valid when B0='1';

B2—indicates the X-sequence bit value '0' or '1' represented by a colour square 21, or transition to that square, as sensed by the head 16—the value of B2 is only valid when B0='0'; and B3—indicates the Y-sequence bit value ('0' or n '1') represented by a colour square, or transition to that square, as sensed by the head 16—the value of B3 is only valid when B0='0'.

The form of the colour interpreter 311 depends on whether the pattern 20 is of the FIG. 12 or FIG. 15 form. Where the pattern is of the FIG. 12 form in which the colours C1 to C4 each directly encode one X-bit and one Y-bit, the colour interpreter can take the form of a simple decoding matrix translating each colour C1 to C6 into a corresponding set of values for bits B0 to B3 in accordance with table 87 shown in FIG. 21. Where the pattern is of the FIG. 15 form in which the colours C1 to C4 are used to implement transitional encoding of the X- and Y-sequence elements values, then a suitable form for the colour interpreter 311 is as shown in FIG. 22.

Figures 21, 22:
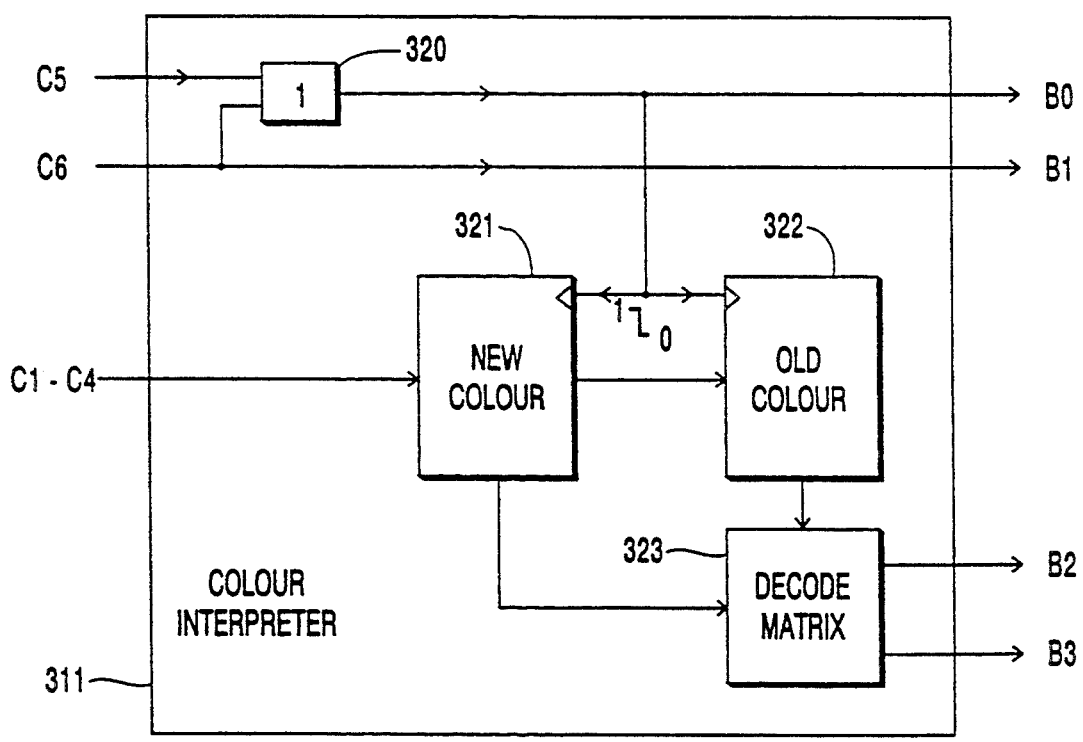
FIG. 21—is a table illustrating the encoding effected by the colour interpreter of the FIG. 18 hardware in response to the inputs received from the opto-electronics of that hardware.
FIG. 22—illustrates circuitry for implementing the FIG. 21 encoding table.

In the FIG. 22 form of the colour interpreter 311, the separating zone colours C5 to C6 are used to generate the output bits B0 and B1. More particularly, the colour signal lines for colours C5 and C6 are both fed to an OR gate 320 the output of which provides bit B0 (a logical "1" whenever the sensing head is over a separating zone, and otherwise "0"). The signal on the colour signal line for colour C6, directly provides bit B1. With regard to the colour-square colours C1 to C4, 'old' and 'new' indications of the colour sensed by the sensing head 16 before and after it transits across a separating zone (or zones) are held in respective stores 322 and 321. Both stores are clocked off a "1" to "0" transition of the bit B0 so that upon the sensing head moving to a position above a new colour square, the colour of that square is stored in store 321 whilst the colour previously held in that store is transferred to store 322. The colours held in stores 321 and 322 are then used to drive a decoding matrix 323 to provide bits B2 and B3. The decoding matrix 323 implements the "Diagonal" section of the decoding table of FIG. 15C. Whilst, of course, not all transitions made by the sensing head 16 are diagonal transitions, it is possible to use just the "Diagonal" section of the decoding table because the X-bit and Y-bit information contained in this section is consistent with the "Horizontal" and "Vertical" sections, and the selection of whether the X-bit, Y-bit, or both are to be taken can be made subsequently by reference to bits B0 and B1.

The zone-related bits B0, B1 of the code output by the colour interpreter 311 are fed via the bus 81 to the zone memory unit 84. This unit 84 is provided with two 2-bit memory latches 91 and 92 (respectively labelled 'LZ' and 'PZ' in FIG. 18) which are both reset to '00' in a manner to be described hereinafter, following each successive interrupt-initiated transfer of an X and/or Y bit value to the sub-system 51. Subsequent to each resetting, as the sensing head 167 is moved across the pattern 20 and encounters one or more zones 26, 27, the LZ latch 91 is used to store the identity of the last zone (hence 'LZ' latch) traversed by the sensing head 16 and the PZ latch 92 is used to store the identity of the last but one zone (that is, the penultimate zone and hence 'PZ' latch) traversed by the head 16. To this end, the unit 84 is further provided with a zone comparator 89 and a latch control unit 90. The zone comparator 89 is enabled when B0='1' (i.e when the head 16 is over a zone 26, 27) and in this state is operative to compare the current value of the pair of bits B0 and B1 as provided on bus 81, with the value stored in the LZ latch 91. If these values are the same, then the output of the comparator remains low (which is also its condition when the comparator is not enabled); if the compared values differ, the output of the comparator goes high and this transition causes the latch control unit 90 first to clock the contents of the LZ latch 91 into the PZ latch 92, and then to clock the current values of bits B0, B1 into the LZ latch 91.

The behaviour of the zone memory unit 84 following the resetting of the latches 91 and 92 is therefore as follows. Initially, the LZ and PZ latches 91 and 92 both hold '00'. This situation remains unaltered until the sensing head 16 traverses a separating zone 26, 27. At this point the comparator 89 is enabled and because the value of the bit pair B0, B1 inevitably differs from the contents of the LZ latch 91, the latch control unit 90 is triggered causing the current values of B0, B1 to be stored in the latch 91. The contents of the LZ and PZ latches thereafter remain unchanged unless and until latches 91, 92 are reset or the sensing head 16 traverses a zone having an identity (as indicated by bit B1) different from that of the zone in respect of which bits B0 and B1 were previously stored in LZ latch 91. In this latter case, the zone comparator 89 will trigger the latch control unit to store the contents of the LZ latch 91 into the PZ latch 92 and store the new current values of B0 and B1 into LZ latch 91.

It will be noted that the zone memory unit 84 does not register the second occurrence of a separating zone with the same identity as a previously stored zone. The reason for this is that such a second occurrence should not, in fact, occur in practice before the latches 91, 92 are reset so that any apparent second occurrence can generally be ignored.

The value of the B0, B1 bit pair stored in the LZ latch 91 is output as signal LZ and similarly, the value of the B0, B1 bit pair stored in the PZ latch 92 is output as signal PZ.

The control state machine 82 has four states (Idle, Latch, I-Enable, Reset) inter-related in the manner indicated by the state transition diagram shown within the box representing the state machine 82 in FIG. 18. The conditions causing transitions between the states are indicated on the arcs linking the states, these conditions and the actions associated with each state, are described below.

- Idle State—Entered from the Reset state one clock pulse after the latter has been entered (as indicated by '1' on the arc linking the Idle and Reset states). No action associated with this state.
- Latch State—Entered from the Idle state when B0='0' (i.e. the sensing head 16 is over a colour square 21) and, at the same time, the contents of the LZ latch is other than '00'. Upon entry into this state, a signal 'LATCH' is output from the state machine to latch the values of bits B2 and B3 into the two-cell latch 85 (bit B2 being the X bit value and bit B3 the Y bit value); latching actually occurs following a small delay sufficient to ensure B2 and B3 have settled.
- I-Enable State Entered from the Latch state one clock pulse after the latter has been entered. Upon entry into this state, a signal 'INT ENABLE' is output from the state machine 82 to enable the interrupt generator 83 to initiate transfer of one or both of the bit values held in latch 85 to the processor sub-system 51.
- Reset State—Entered from the I-Enable state when the value FLAG of the flag register 86 equals '1'

(that is, following completion of a bit-value transfer to the processor sub-system 51). Upon entry into this state, a signal 'RESET' is output from the state machine to reset the LZ and PZ latches 91, 92, the X/Y latch 85 and the flag register 86 ready for a new cycle of operation.

The state machine 82 thus effects one cycle of operation from the Idle state, via its Latch, I-Enable and Reset states and back to its Idle state, whenever the sensing head 16 encounters a colour square 21 after having crossed a separating zone 26, 27 subsequent to the last resetting of the LZ latch, that is, subsequent to the last cycle of operation of the state machine. During execution of a cycle of operation, the state machine 82 brings about the transfer of an X and/or Y sequence bit value to the processor sub-system 51 and then sets up the low-level hardware to recognize a new X and/or Y bit.

The interrupt generator 83 determines whether an X bit, a Y bit or both are to be transferred to the processor sub-system 51 and initiates this transfer, when enabled by the signal INT ENABLE from the state machine 82, by asserting an appropriate one of three interrupts. The interrupt generator 83 is built around decoding logic that determines whether an X and/or Y bit is to be transferred in dependence on the values of the signals LZ and PZ, this determination being in accordance with the truth table 88 shown within the box representing the interrupt generator 83 in FIG. 18. In this truth table 88, the values of LZ and PZ have been shown as ordered pairs of binary values, the first value corresponding to the stored value of B0, and the second to the stored value of B1. Because the signals LZ and PZ cannot take on the value '01', entries in the table 88 corresponding to this value have been struck through. Furthermore, entries corresponding to LZ='00' are given as 'N.A' ('no action') because no bit transfer can take place in such circumstances as the interrupt generator cannot be enabled by the state machine 82 to generate an interrupt, the latter being held in its Idle state until LZ changes from '00'. However, when PZ='00' and LZ equals '10', the X bit value (but not the Y bit value) held in latch 85 should be transferred; this is because the LZ and PZ signals show that the only separating zone traversed since the last transfer is one indicating that the head 16 has been moved along the X-sequence whereby a new X bit value (but not a new Y bit value) is available. Similarly, when PZ='00' and LZ equal '11' the Y bit value (but not the X bit value) held in latch 85 should be transferred (the LZ and PZ signals show that only a zone indicating traversal of the Y-sequence have been encountered since the last transfer). When both LZ and PZ have their B0 bit equal to '1' (implying that zones indicating movement along both the X and Y sequences have been encountered since the last transfer), then both the X and Y bits in latch 85 should be transferred.

Upon the interrupt generator 83 being enabled by the signal 'INT ENABLE' from the state machine 82, the generator 83 asserts one of three interrupts as indicated by the truth table 88. Thus, if only the X bit value is to be transferred from the latch 85, an interrupt 'Take-X' is asserted. If only the Y bit value is to be transferred from the latch 85, an interrupt 'Take-Y' is asserted. If both the X and Y values are to be transferred, an interrupt 'Take Both' is asserted.

Two examples of the overall behaviour of the low-level hardware 50 will now be given for the FIG. 12 pattern with reference to the two sensing-head movement tracks A and B shown in that Figure.

Consider, first, movement of the head 16 along track A from an initial square 21A having a colour representing X and Y sequence bit values of '1' and '0' respectively (see C3 in table 87 of FIG. 21). It will be seen that track A is parallel to the $A_p$ axis, that is, along the X sequence only. Assuming that the control state machine 84 has just completed a cycle of operation so that the latches 91, 92 and 85 and the flag register 86 are all in a reset state, then the code value '0010' output on bus 81 from the colour interpreter 311 causes no action, the state machine 82 being in its Idle state needing LZ to change from '00' and the zone memory being disabled awaiting the traversal of a separating zone. As the sensing head 16 moves along track A, it encounters an X-sequence separating zone 26A (colour C5) causing the colour interpreter 311 to output a code value '1000'. As a result, the zone memory 84 is activated and bits B0 and B1 of the code ('10') are latched into the LZ latch 91 (the PZ latch PZ continues to hold '00'); the state machine 82 remains in its Idle state. The sensing head 16 next encounters colour square 21B having a colour (colour C1) representing X and Y sequence bit values of '0' and '0' respectively. As a result, the colour interpreter 311 outputs a code value '0000' on bus 81. Because LZ now equals '10', when the code value '0000' is placed on bus 81, the state machine 82 is caused to transit from its Idle state first to its Latch state to latch in the X and Y bit values ('0' and '0') into the X/Y latch 85, and then to its I-Enable state in which it enables the interrupt generator 83. With LZ and PZ having values of '10' and '00' respectively, the interrupt generator 83 asserts the 'Take-X' interrupt to tell the processor sub-system that a new X bit value is available and should be fetched. After the sub-system 51 has fetched the X-bit value from latch 85, it sets FLAG='1' thereby causing the state machine 82 to transit to its Reset state, resetting elements 85, 86, 91 and 92 and then to its Idle state.

Considering, next, movement of the head 16 along track B from square 21A with the elements 95, 86, 91 and 92 having just been reset by the state machine 82 on its way to returning to its Idle state. Operation of the low level hardware proceeds as described above as the sensing head is moved from square 21A and across the X-sequence separating zone 26A; thus, the value '10' becomes stored in the LZ latch 91 whilst the PZ latch 92 retains '00' and the state machine remains in its Idle state. Next, however, the sensing head 16 as it moves along track B, instead of encountering a new colour square (which would have triggered a transfer operation as described above), encounters a Y-sequence separating zone 27A (colour C6). This causes the colour interpreter to output a code value '1100' on bus 81 which, in turn, causes the zone memory to transfer the contents ('10') of the LZ latch 91 to the PZ latch 92, and store the values of B0 and B1 on bus 81 ('11') into the LZ latch 91. In due course, the sensing head 16 is moved along track B to colour square 21C which has a colour (colour C2) representing X and Y sequence bit values of '0' and '1' respectively. The colour interpreter 311 outputs a code '0001' onto bus 81 which triggers the control state machine from its Idle state and results in the interrupt generator being enabled and asserting the 'Take Both' interrupt to indicate to the processor sub-system that both new X and new Y bit values are available. Upon the processor sub-system completing the transfer of the X and Y bit values, the low level hardware is reset and its cycle of operation re-initiated.

The operation of the low level hardware when following tracks similar to tracks A and B across a pattern of the FIG. 15 form is substantially the same as that described above except, of course, with regard to the operation of the colour interpreter 311.

The ability of the FIG. 18 hardware 50 to cope with tracks that cross two separating zones 26, 27 in succession without an intervening colour square 21, enables the hardware 50 to deal with most tracks across the pattern, particularly since the size of the colour squares shown in the FIG. 12 pattern can generally be increased relative to that of the zones 26, 27. However, if the sensing head 16 is moved along an abnormal track for which the low-level hardware is not designed, the apparatus as a whole would, in the worst case, simply have to re-initiate location acquisition which is not, in itself, a severe penalty.

The low-level hardware 50 is further operative to generate a lift-off interrupt signal when it detects that the sensing head 16 has been moved away from the pattern 20; this functionality has not been represented in FIG. 18 for reasons of clarity.

Circuitry for implementing the low level hardware will be apparent to persons skilled in the art and will therefore not be described in further detail herein.

Turning now to be a consideration of the high level processor sub-system 51, this sub-system is operative to run several processes concurrently, these being a process 60 (the XBIT process) for effecting position determination in the X co-ordinate direction on the basis of the X bit values supplied by the low-level hardware 50, a process 61 (the YBIT process) for effecting position determination in the Y co-ordinate direction on the basis of the Y bit values supplied by the hardware 50, and an output process 62 for outputting absolute position information on the basis of the X and Y positions determined by processes 60 and 61. The output process 62 interfaces with the XBIT and YBIT processes 60 and 61 through an output buffer 63 in the form of two first-in, first-out FIFOs 76,77 buffer operative to store a series of absolute X and Y positions respectively. Each entry in the FIFOs 76,77 comprises a new X or Y position as appropriate, a sequence number indicating the order of generation of the X and Y entries, and an associated flag bit (the X/Y flag) and each entry having a second associated flag (the Defer Flag) which, if set, indicates that the entry is only provisional and not yet to be output. The purpose of the Defer Flag will be explained more fully hereinafter.

It will be appreciated that the functionality provided by the sub-system 51 encompasses part of the functionality of the sub-pattern image processing unit 12 of FIG. 1 as well as all of the functionality of the position-determining unit 13. The sub-system 51 can be implemented using a suitable multi-tasking processor system as will be apparent to persons skilled in the art.

Considering the operation of the processor sub-system 51 in more detail, the sub-system 51 interfaces with the low-level hardware 50 through an X/Y bit input buffer 64 in the form of a first-in, first-out (FIFO) buffer. Upon the 'Take X' interrupt being asserted by the hardware 50 to indicate the availability of a new X-sequence bit value, the sub-system 51 executes an interrupt service routine ISR-1 that loads the X bit value in latch 85 into the buffer 64 together with an indication that it is an X bit value. Similarly, upon the 'Take-Y' interrupt being asserted to indicate the availability of a new Y-sequence bit value, the sub-system 51 executes an interrupt service routine ISR-2 that loads the Y bit value in latch 85 into the buffer 64, together with an indication that it is a Y bit value. When the 'Take Both' interrupt is asserted by the hardware 50, the sub-system 51 executes an interrupt service routine ISR-3 that loads the X and Y bit values in latch 85 into the buffer 64 in that order together with respective indications of the sequence with which each is associated.

The buffer 64 thus forms an input queue of X and Y bit values and the XBIT and YBIT processes 60 and 61 take bits from the head of this queue for processing, X bit values being taken only by the XBIT process 60 and Y bit values being taken only by the YBIT process 61.

Finally with regard to the interaction of the low-level hardware 50 with the sub-system 51, the lift off interrupt generated by the low-level hardware 50 causes the sub-system 51 to execute an interrupt service routine ISR-4 that resets all three main processes 60, 61, 62 and clears the buffers 63 and 64.

The XBIT process 60 will next be described, it being appreciated that the YBIT process 61 is essentially the same except that it operates on Y sequence bits rather than X sequence bits.

The XBIT process utilizes four main data structures, these being:
- an X-sequence register 66 storing the X-sequence bit pattern;
- an X-sequence window index 67 which for each possible window length sequence (N bits in length) present in the X-sequence (taking both directions of reading), provides a pointer into the X-sequence indicating the position of the last bit of the window-length sequence On terms of an offset from the start of the X-sequence) together with a direction flag indicating the direction of reading of the X-sequence;
- an X-pointer list 68 for holding one or more X-position pointers (and their associated direction flags) for indicating the current actual X position (during normal operation), or current candidate X positions (during a reversal recovery process to be described below);
- an initial X-position shift register 69 of length N used to assemble a window-length sequence of N bits from the sensed X-sequence bits during an initial absolute position determination phase of operation of the apparatus.

The YBIT process utilizes corresponding data structures, namely a Y-sequence register 70, a Y-sequence window index 71, a Y pointer list 72, and an initial Y-position register 73.

Figure 23:
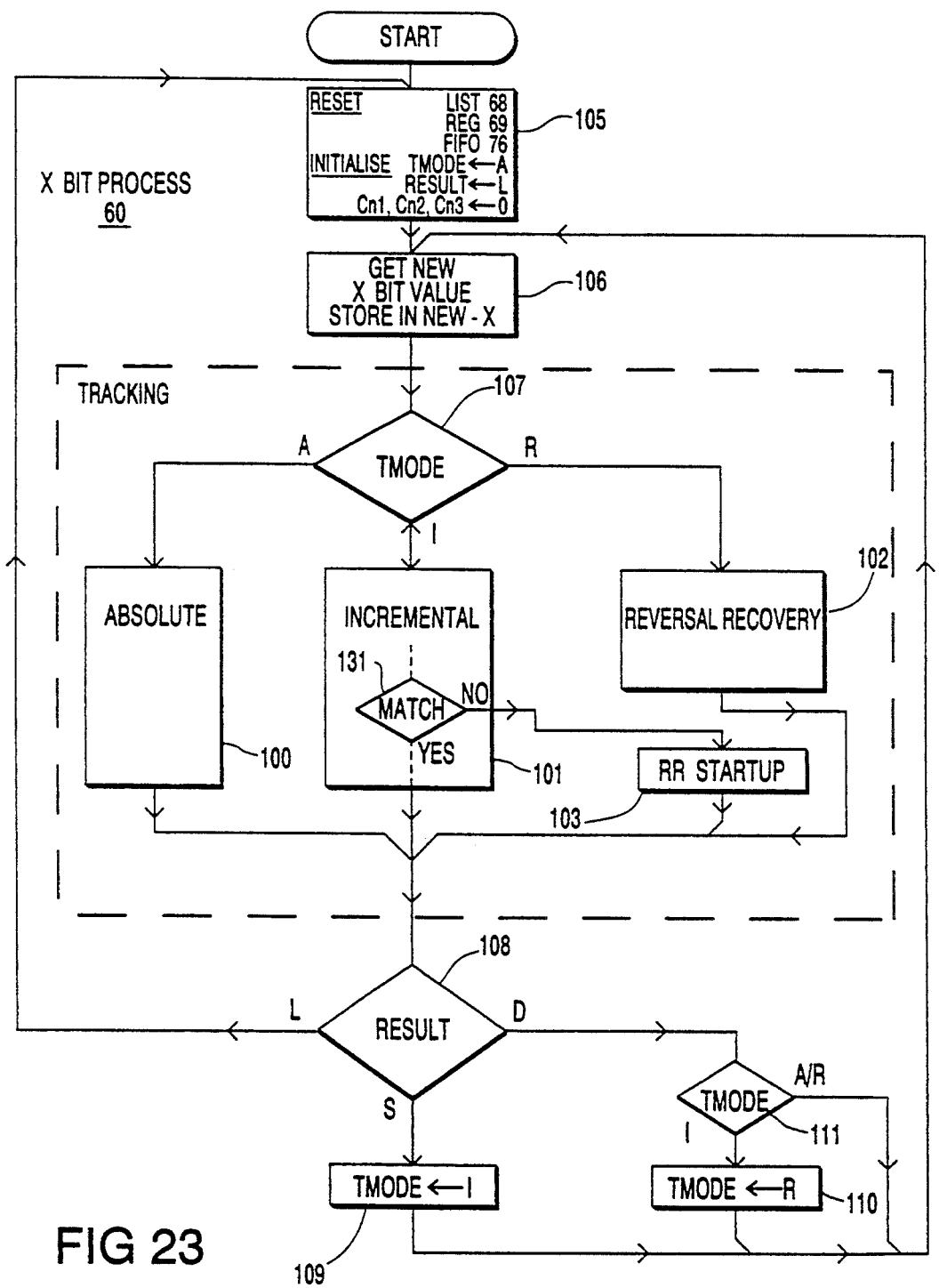
FIG. 23—is a flow-chart of an XBIT process run by the high-level processor sub-system of FIG. 17.

FIG. 23 illustrates the XBIT process 60 in the form of a flow chart. The XBIT process controls position tracking in the X co-ordinate direction with the actual tracking being effected by appropriate sub-routines. There are three basic tracking modes, these being:
- an "absolute" tracking mode in which absolute position determination is effected by building up a window length sequence of X bits in register and then using the window index 67 to identify an absolute position, this tracking mode being used initially to ascertain an initial absolute position;
- an "incremental" tracking mode in which each new X bit received is assumed to increment the current X position in the direction indicated by the direction flag associated with the current position pointer, this mode being used once an initial absolute position has been established and until the actual next X-bit sensed does not match the next X-sequence bit in the direction indicated by the direction flag (generally such a mismatch will have occurred due to a direction of movement reversal); and a "reversal recovery" tracking mode in which an attempt is made to recover from a mismatch occurring in the incremental tracking mode by assuming that a movement direction reversal has occurred and then seeking to identify at what position the reversal took place.

Tracking in the "absolute", "incremental" and "reversal recovery" tracking modes is effected by routines 100, 101, 102 respectively with a further routine 103 ("RR Start-up") being associated with the reversal recovery 102 as an initialization routine. A global variable TMODE serves to identify the currently operative tracking mode, this variable being assigned one of the values 'A', 'I', 'R' to indicate the "absolute", "incremental" or "reversal recovery" tracking mode respectively. A further global variable RESULT is used to indicate whether the tracking routines have been successful in their tasks, this variable having possible values 'S' to indicate success, 'D' to indicate that judgement needs to be deferred and 'L' to indicate that the routine has irrecoverably lost track of the current position. Three counts Cn1, Cn2 and Cn3 are also used in the operation of the XBIT process and its sub-routines as will become clear below.

Considering next the FIG. 23 flow chart in more detail, after start-up of the XBIT process, an initialization step 105 is instigated. During step 105 the X pointer list 68 is reset to empty, the initial X-position register 64 is reset to zero and the output FIFOs 76,77 are flushed. In addition, the value of "A" is assigned to the variable TMODE to start the tracking process in the absolute tracking mode, the value "L" is assigned to the variable RESULT to indicate that tracking is to be started from a completely lost condition, and the value '0' is assigned to the counts Cn1, Cn2 and Cn3.

Thereafter, the XBIT process 60 executes step 106 in which it examines the top entry in the X/Y bit buffer 64 and if this is an X bit value it removes the value from the buffer 64 and stores it in variable NEW-X. On the other hand, if the top entry in the buffer 64 is not an X bit value, then the step 106 is repeated at intervals until an X value appears at the head of buffer 64 (this reiteration is internal to step 106).

The XBIT process 60 now proceeds to select and execute the appropriate tracking routine, this selection being effected in decision step 107 in dependence on the current value of the variable TMODE. Immediately following start-up of the XB1T process 60, the absolute tracking routine 100 is selected and executed since, of course, the value "A" has been assigned to TMODE during step 105. However, as will be seen below, as tracking continues the values stored in TMODE may change to "I" or "R" in which case the decision step 107 will select the incremental tracking routine 101 or the reversal recovery routine 102 respectively.

Whichever tracking routine 100, 101 and 102 is executed, upon completion of the selected routine the XBIT process 60 proceeds to decision step 108 where it tests the value of the variable RESULT used to indicate the success or otherwise of the executed tracking routine. If the value "L" is returned in RESULT, then this is taken as indicating that position tracking has irrecoverably failed and must be started again from scratch by returning to the initialization step 105. If the value "S" is returned in RESULT, then this indicates that the current X position is known with certainty in which case the incremental tracking mode can be implemented (this being brought about in step 109 by the value "I" being assigned to the variable TMODE). If the value "D" is returned in RESULT, then this indicates that the current X position is not known for certain, but is in the process of being ascertained; this situation can occur either when the XBIT process is in its absolute tracking mode and insufficient bits have yet been accumulated to enable the absolute tracking routine 60 to effect an absolute determination of the current X position, or when the process 60 is in its reversal recovery tracking mode and the current X position has not been unambiguously determined. Generally, when RESULT is returned with "D", the tracking mode will not be changed so that the variable TMODE is unaltered. However, when reversal recovery is first initiated, this is effected by the incremental tracking routine 101 directly initiating the RR start-up routine 103 without the variable TMODE being set to "R"; in this circumstance the variable TMODE is set to the value "R" in step 110 when it is determined that RESULT has a value D and the previous value of TMODE was "I" (step 111).

When either the value "S" or "D" is returned in RESULT, then after any appropriate value assignment to variable TMODE, the XBIT process returns to step 106 to fetch a new X bit value.

The absolute incremental and reversal recovery tracking routines 100, 101 and 102 will now be described.

Figure 24:
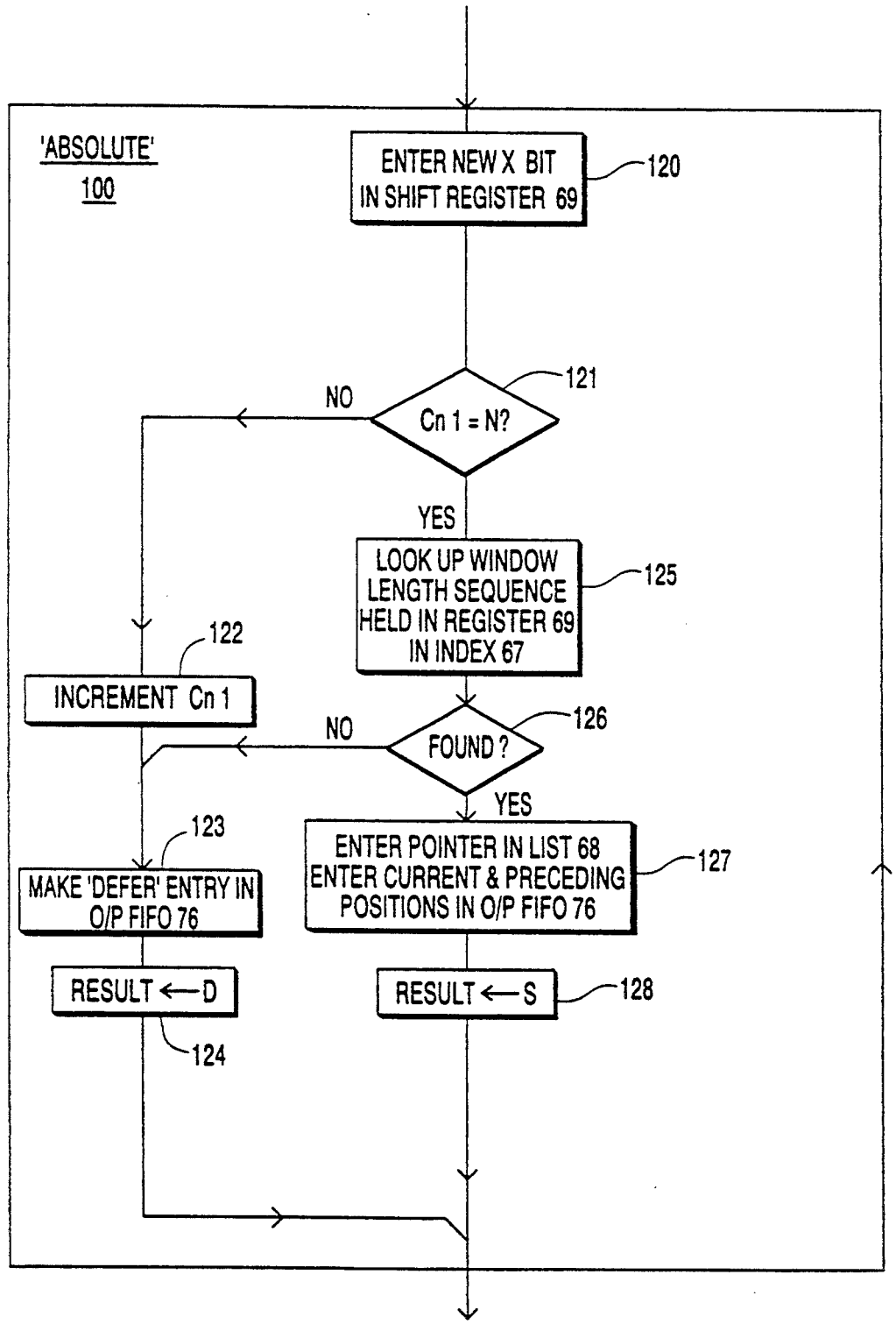
FIG. 24—is a flow chart of a tracking routine "ABSOLUTE" of the FIG. 23 process.

FIG. 24 is a flow chart of the absolute tracking routine 100. Upon entry into this routine, the new X bit value stored in NEW-X is entered into the initial X-position register 69 (step 120) to be accumulated with other X bit values to form a window length pattern for the X-sequence. The total number of XBIT values currently accumulated in the register 69 is held in count Cn1. Step 121 tests whether count Cn1 has yet reached the value N indicating that a window length sequence of X bits has been accumulated in the shift register 69. If count Cn1 is less than N, then the count is incremented (step 122) to take account of the newly added XBIT value, an X position entry is made in the output FIFO 76 with the associated Defer Flag set (step 123) for reasons which will become clear later, and the value "D" is assigned to RESULT (step 124) to indicate that a window length sequence is still being accumulated; thereafter the absolute tracking routine is exited.

If the test carded out in step 121 indicates from the value of count Cn1 that a window length sequence of N bits has been accumulated in the register 69, then the absolute tracking routine proceeds to step 125 where it looks up the value of the window length sequence stored in register 69 in the X-window index 67 with a view to ascertaining the current absolute X position. If the window length sequence is successfully found in the index 67, then a pointer to the corresponding position in the X-sequence is entered into the X-pointer list 68, together with a direction flag indicating the direction of reading of the X-sequence giving the window length sequence (step 127). An X position entry is also made in the output FIFO 76 with the associated Defer Flag not set, indicating that the entry is unconditional. Because the current position in the X-sequence is now known, it is possible to replace the last (N-1) X entries flagged as Defer entries in the output FIFO 76 with actual X-position values and this is also done in step 127. Since any X entries flagged as Defer, that are positioned ahead of the replaced X entries in FIFO 76 cannot be successively recovered, such entries must be deleted (again, this is carded out in step 127). In step 128, the value "S" is assigned to RESULT to indicate that the X-position has been successfully found and the incremental tracking mode may now be entered.

If the window length sequence accumulated in register 69 is not found in index 67 (steps 125 and 126) then this indicates that one or more of the accumulated bits are in error so that the accumulation process must be continued. In this case, steps 123 and 124 are next executed before the absolute tracking routine 100 is exited. Note that it is not necessary to increment the count C1 because N bits have ready been accumulated and further processing takes place on the basis of losing the oldest bit accumulated in the register 69 as each new X bit is added to the register (the register 69 being of window length N). In due course the errored bit or bits will become shifted out of the register 69 and the window length sequence remaining in the register will be successfully located in the index 67.

Figure 25:
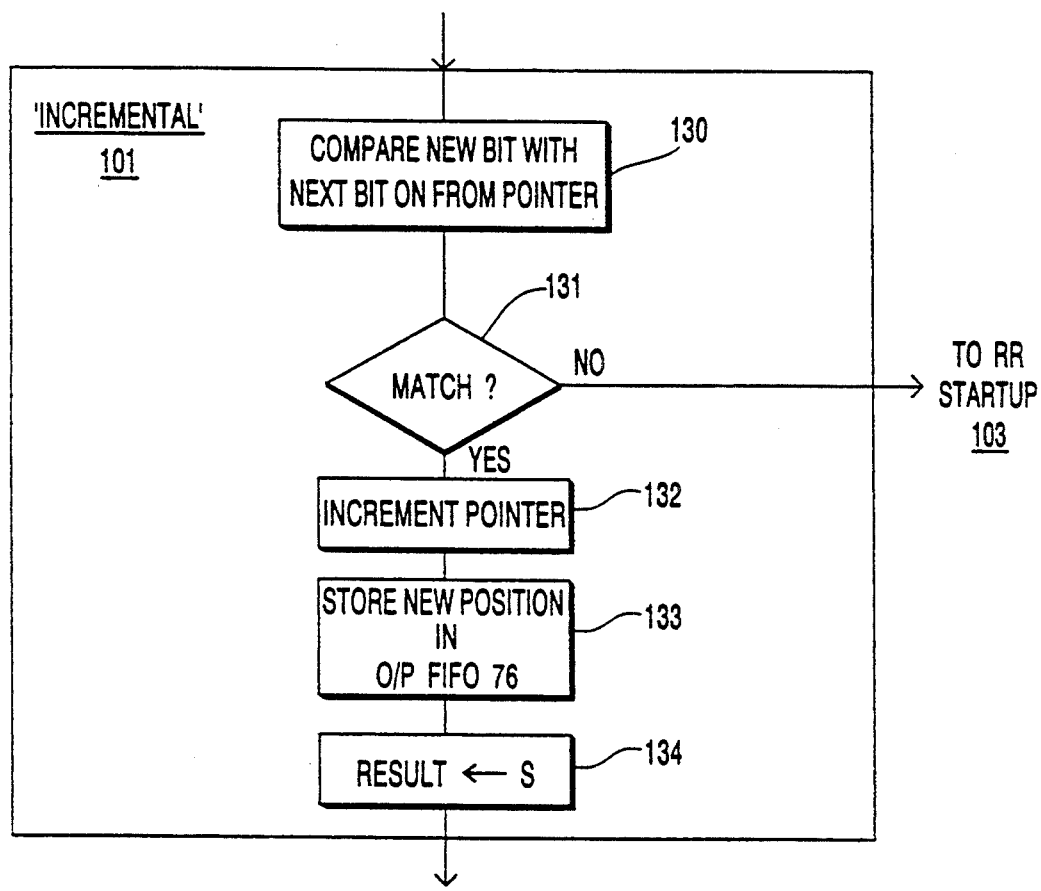
FIG. 25—is a flow chart of a tracking routine "INCREMENTAL" of the FIG. 23 process.

FIG. 25 is a flow chart of the incremental tracking routine 101. This tracking routine works on the basis that once the absolute X-position has been established, each new X bit can simply be used to increment the X-position by 1, the routine working on the assumption that the direction of X movement remains unaltered from that which was associated with the initial absolute position determination. However, in order to check the validity of this assumption, the value of each new bit as supplied from the low-level hardware 50 is compared with the value of the next X-sequence bit as predicted from the X-sequence stored in the register 66 given the current X-position and direction of movement (as indicated by the pointer in the pointer list 68). This check is carried out by step 130 in the FIG. 25 flow chart. If the actual and predicted values of the new X-sequence bit match (step 131) then the assumption about direction of movement is assumed valid and the X-position pointer held in the list 68 is incremented in the direction of movement indicated by the associated direction flag (step 132). Thereafter the new X-position is stored in the output FIFO 76 with the associated Defer Flag not set (step 133) and the value "S" is stored in RESULT (step 134). If, however, the value of the new X-position actually sensed differs from that predicted from the stored X-sequence, then a reversal of X-direction movement is assumed to have taken place and reversal recovery is initiated with the reversal recovery start-up routine (RR start-up 103) being called.

Figure 28:
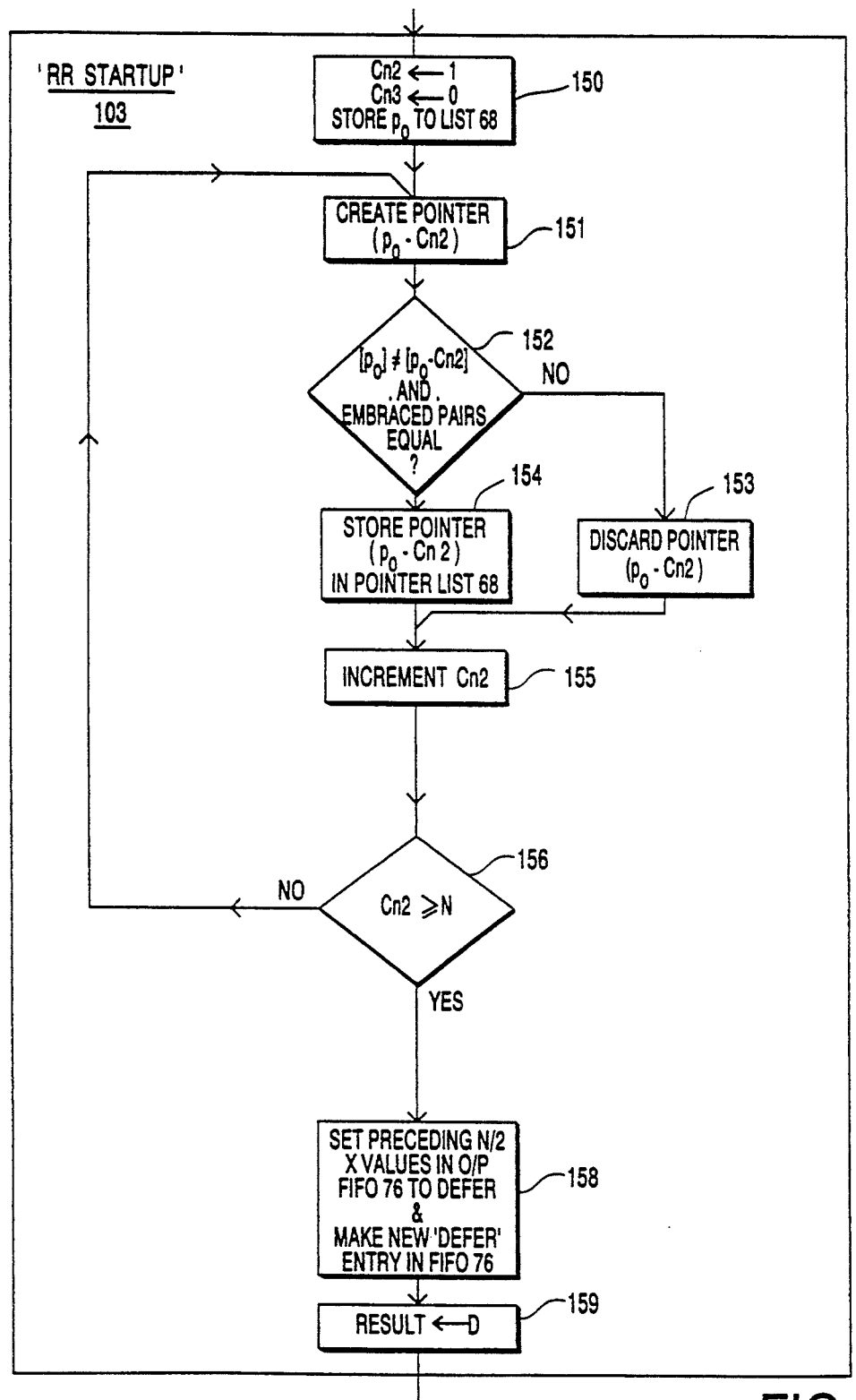
FIG. 28—is a flow chart of an initialisation routine "RRSTART-UP" for a reversal recovering routine of the FIG. 23 process.
Figure 29:
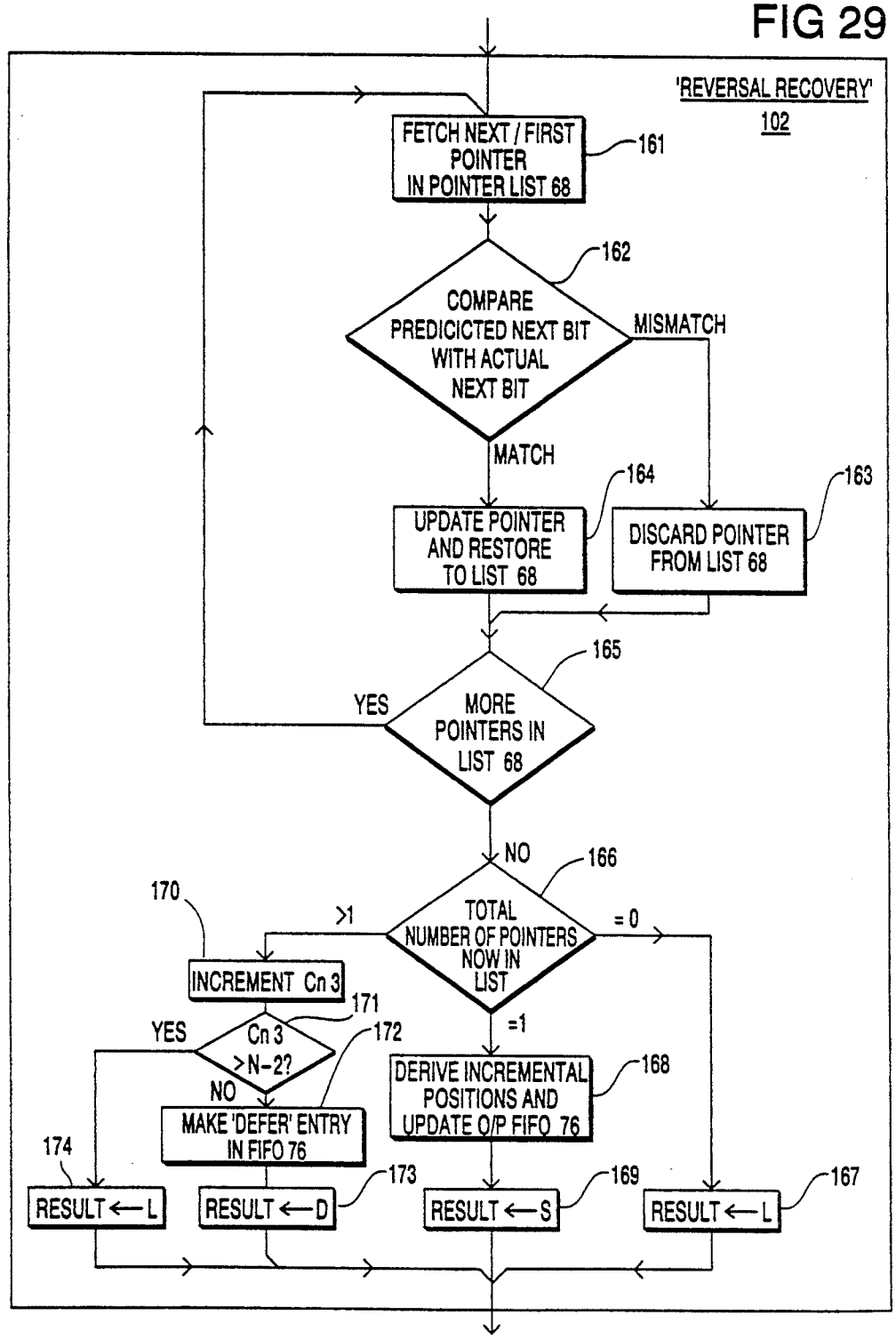
FIG. 29—is a flow chart of a tracking routine "REVERSAL RECOVERY" of the FIG. 23 process.

Before describing the RR start-up routine 103 and the main reversal recovery routine 102, with reference to the flow charts of these routines shown in FIGS. 28 and 29 respectively, a general description will first be given of the reversal recovery process.

Figure 26A:
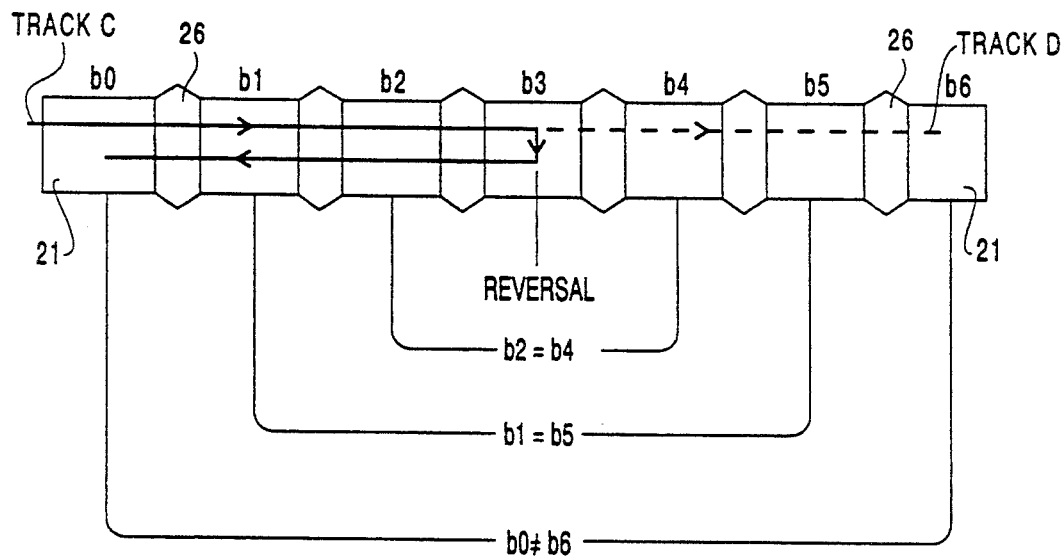
FIG. 26A—is a diagram illustrating detection of a reversal of direction of movement of the sensor of the FIG. 17 apparatus, in the case where reversal occurs over a colour square of a pattern of the FIG. 12 form.

Considering first the FIG. 12 pattern, FIG. 26A shows a series of seven colour squares 21 extending in the X-sequence direction, the squares representing X-sequence bits b0 to b7. The colour squares 21 are separated by separating zones 26. Track C shows the course of the sensing head 16 as it is moved over the squares representing bits b0, b1, b2 and b3 at which point the direction of movement of the sensing head is reversed and it returns over squares representing bits b2, b1 and b0. The dashed line marked track D is the track that the tracking process assumes the head 16 has followed from bit b3 until evidence is produced to the contrary.

With the tracking in its incremental mode, as the sensing head 16 moves along the initial portion of track C over the squares representing bits b0, b1, b2 and b3 each successive bit value sensed by the head 12 is matched with the corresponding bit predicted from the X-sequence held in register 66. When the direction of movement of the sensing head 16 is reversed over the square 21 representing bit b3, the next actual bit encountered is bit b2 whereas the next predicated bit is bit b4. In the current example, the X-sequence portion being traversed is such that the value of bit b2 equals that of bit b4. As a result, the bit value predicted by the incremental tracking routine matches that actually sensed so that the routine is not alerted to the fact that a reversal of direction took place over the square representing bit b3. The incremental tracking routine therefore assumes that the sensing head 16 is following track D. In due course the head 16 moves over the square representing bit b1 and the incremental tracking routine tests the value of the sensed bit with the value of the sequence bit b5 over which it believes the head 16 is now positioned. In the present example, the values of bits b1 and b5 are the same so that the incremental tracking routine again fails to detect the reversal of movement direction that occurred over the square representing bit b3. The sensing head 16 continues its movement along track C and reaches the square representing bit b0. In the present example the value of this bit b0 is different from that of b6 so that when the incremental tracking process tests the value of the next predicted bit along track D (this being bit b6), it discovers that the predicted bit value differs from the sensed bit value; at this time, therefore, the incremental tracking process detects that the sensing head 16 has reversed its direction of movement at some earlier stage. However, the tracking process has no means of directly ascertaining the point at which reversal took place.

Figure 26B:
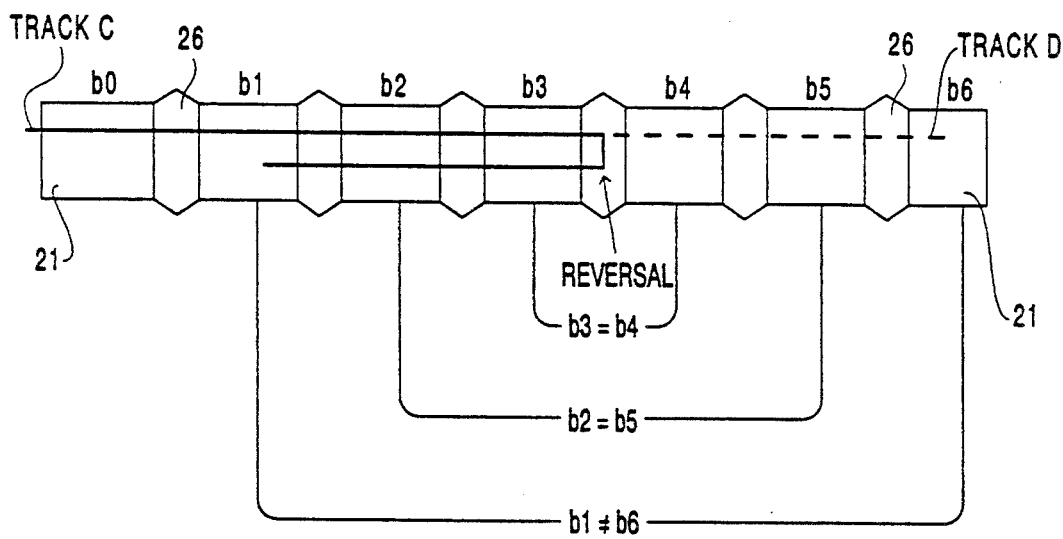
FIG. 26B—is a diagram illustrating detection of a reversal of direction of movement of the sensor head of the FIG. 17 apparatus in the case where reversal occurs over a separating zone between two colour squares of a pattern of the FIG. 12 form.

FIG. 26B is similar to FIG. 26A in that it shows the seven colour squares of the FIG. 12 pattern that represent bits b0 to b7, but in this case track C has been drawn to show direction reversal occurring over a separating zone 26 rather than over a colour square 21. In the illustrated example, direction reversal occurs over the zone 26 separating the squares representing bits b3 and b4. The first square encountered by the sensing head 16 after this reversal is the square representing bit b3 whereas the incremental tracking process assumes that the encountered square is that representing bit b4. In the present example, the value of bit b3 equals that of b4 so that the incremental tracking process does not detect the reversal when it compares the actual value of bit b3 with the predicted value. Similarly, the next subsequent square encountered by the head 16 is that representing bit b2 and in the present example this has a value corresponding to the bit b5 so that again, the tracking process does not detect the direction reversal. However, in due course the head 16 moves over the square representing bit b1 which the tracking process tries to match with the predicted value of bit b6; in the present example the value of bits b1 and b6 differ so that at this point the tracking process detects that a direction reversal has occurred.

Figure 26C:
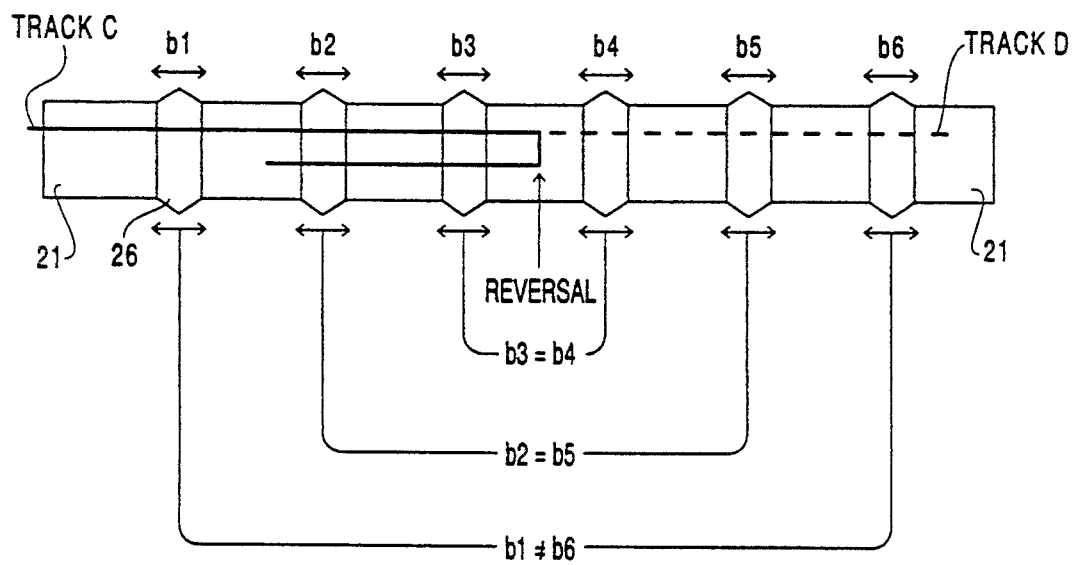
FIG. 26C—is a diagram illustrating detection of a reversal of direction of movement of the sensor of the FIG. 17 apparatus, in the case where reversal occurs over a coloured square of a pattern of FIG. 15 form.

Considering next the FIG. 15 pattern, FIG. 26C is generally similar to FIGS. 26A and B in that it shows a series of seven colour squares 21 extending in the X-sequence direction and separated by zones 26; now, however, it is the transitions between the squares that represent the X-sequence bits (here, b1 to b6). Track C shows the course of the sensing head 16 as it effects transitions representing bits b1, b2 and b3 at which point the direction of movement of the sensing head is reversed over a colour square and the sensing head, now moving in the opposite direction, effects transitions representing bits b3, b2 and b1. The dashed line marked track D is the track that the tracking process assumes the head 16 has followed from bit b3 until evidence is produced to the contrary.

With the tracking in its incremental mode, as the sensing head 16 moves along the initial portion of track C sensing bits b1, b2 and b3, each successive bit value sensed by the head 12 is matched with the corresponding bit predicted from the X-sequence held in register 66. When the direction of movement of the sensing head 16 is reversed, the next actual bit sensed is bit b3 whereas the next predicted bit is bit b4. In the current example, the X-sequence portion being traversed is such that the value of bit b2 equals that of bit b4. As a result, the bit value predicted by the incremental tracking routine matches that actually sensed so that the routine is not alerted to the fact that a reversal of direction took place over the square common to the transitions representing bits b3 and b4. The incremental tracking routine therefore assumes that the sensing head 16 is following track D. In due course the head 16 effects the transition representing bit b2 and the incremental tracking routine tests the value of the sensed bit with the value of the sequence bit b5 which it believes the head 16 has just sensed. In the present example, the values of bits b2 and b5 are the same so that the incremental tracking routine again fails to detect the reversal of movement direction that occurred over the square common to the transitions representing bits b3 and b4. The sensing head 16 continues its movement along track C and in due course senses bit b1. In the present example the value of this bit b1 is different from that of b6 so that when the incremental tracking process tests the value of the next predicted bit along track D (this being bit b6), it discovers that the predicted bit value differs from the sensed bit value; at this time, therefore, the incremental tracking process detects that the sensing head 16 has reversed its direction of movement at some earlier stage. However, the tracking process has no means of directly ascertaining the point at which reversal took place.

Figure 26D:
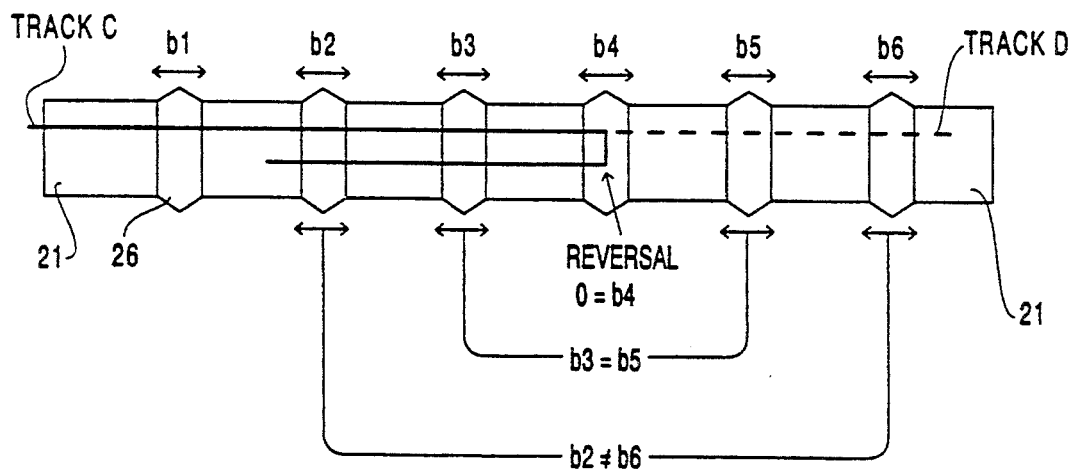
FIG. 26D—is a diagram illustrating detection of a reversal of direction of movement of the sensor head of the FIG. 17 apparatus in the case where reversal occurs over a separating zone between the two coloured squares of a pattern of the FIG. 15 form.

FIG. 26D is similar to FIG. 26C but in this case track C has been drawn to show direction reversal occurring over a separating zone 26 rather than over a colour square 21. In the illustrated example, direction reversal occurs over the zone 26 in the transition representing bit b4. The first square encountered by the sensing head 16 after this reversal is the square last encountered by the head 16 with the result that a bit of value "0" is decoded (see table in FIG. 15C), whereas the incremental tracking process assumes that the sensed bit is bit b4. In the present example, the value of bit b4 equals "0" so that the incremental tracking process does not detect the reversal when it compares the actual value of the sensed bit with the predicted value. Similarly, the next subsequent bit sensed by the head 16 is bit b3 and in the present example this has a value corresponding to the bit b5 so that again, the tracking process does not detect the direction reversal. However, in due course the head 16 senses bit b2 which the tracking process tries to match with the predicted value of bit b6; in the present example the value of bits b1 and b6 differ so that at this point the tracking process detects that a direction reversal has occurred.

For both the FIG. 12 and the FIG. 15 pattern examples of FIGS. 26A to D, all the tracking process is aware of is that at bit b6 a discrepancy has occurred between the sensed bit value and the predicted bit value. The tracking process does not know whether the assumed direction reversal has occurred over a colour square or a separating zone. The only limitation that can be assumed on where reversal occurred is that it must have taken place within N/2 bits of the bit b6 (where N is the window length of the X sequence) in a direction opposite to that previously assumed as the directional movement of the sensing head 16.

However, the actual sequence bit values over the preceding N bits, place certain constraints on where the reversal could have occurred because, of course, the succession of bit values that occur in the sequence from the reversal position but in the opposite direction to that assumed (i.e in the actual direction of movement) must be identical to the sequence of bits actually sensed. It is therefore possible to postulate a number of different reversal positions (with each of which there is an associated current actual position) and to carry out an initial elimination process by comparing the succession of bit values that would have been encountered from each reversal position (as predicted from the stored copy of the sequence) with the bit values actually sensed. In fact, in the present embodiment, rather than storing the values of the bits sensed for use in the aforesaid elimination process, use is made of the fact that, for each proposed reversal position, the relevant sensed bit values can be derived directly from the segment of the sequence extending from the proposed reversal position to the currently-predicted (but erroneous) position, the sensed bit values being:

(i) the same as the segment bit values from the proposed reversal position to the position immediately preceding the currently-predicted one (this is true since otherwise, a reversal would have been detected sooner);

(ii) for the current bit, the opposite value to that given by the sequence segment (this is so because at the current bit, a reversal was detected as a result of the predicted bit value differing from the sensed bit value).

Although the present embodiment carries out the elimination of proposed reversal positions by using the stored sequence as a means of deriving the bit values actually sensed, it will be appreciated that embodiments that directly store the last N bit values actually sensed are also possible.

The initial elimination process of potential reversal positions as carried out by the present embodiment, is illustrated in FIG. 23, the process itself being implemented by the RR Start-up routine 103.

Figure 27:
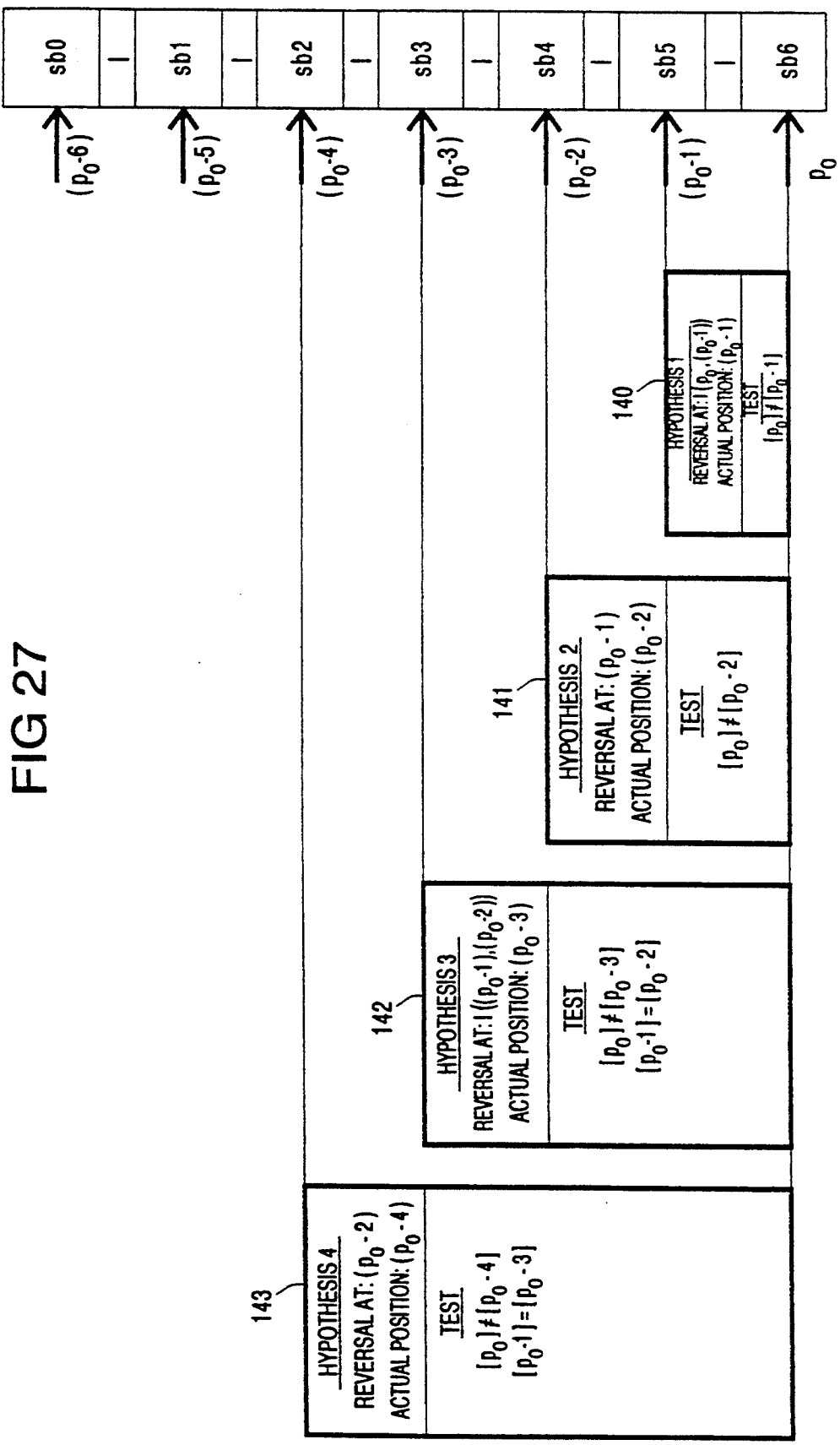
FIG. 27—is a diagram indicating how position recovering is achieved following a reversal of movement direction such as illustrated in any one of FIGS. 26A to 26D.

In order to eliminate certain reversal positions, a number of hypotheses are constructed each postulating that direction reversal took place at a sequence bit or between two such bits; the possible reversal positions are represented in FIG. 27 by the sequence structure abstraction shown on the right-hand side of that Figure and composed of sequence bit squares sb0 to sb6 (corresponding to bits b0 to b6) and intermediate zones I between the sequence bit squares, direction reversal being possible at both sequence bit squares and intermediate zones I. In terms of the FIG. 12 pattern (absolute value encoding) direction reversal at a sequence bit square or at an intermediate zone respectively corresponds to a reversal at a colour square or at a separating zone, whilst in terms of the FIG. 15 pattern (transitional encoding), direction reversal at a sequence bit square or at an intermediate zone respectively corresponds to reversal at a separating zone (in as much as a bit is represented by a transition across such a zone) or at a colour square. The sequence structure abstraction of FIG. 27 is thus applicable to both absolute-value encoding and transition encoding and as the RR Start-up routine 103 and Reversal Recovery routine 102 both operate to this abstraction, these routines are also applicable to both absolute-value encoding and to transitional encoding.

To construct and test the reversal-position hypotheses, pointers are generated for each of the possible current actual X-sequence positions. For the purposes of the present explanation, if $p_0$ represents the pointer pointing to the sequence bit square (Sb6 in the example) at which a reversal is detected, then the pointer pointing to the preceding sequence bit square (sb5 in the example) is referenced ($p_0$-1), the pointer pointing to the sequence bit square before that (sb4 in the example) is referenced ($p_0$-2) and so on. In practice, each pointer points to the sequence bit represented by the corresponding sequence bit square of the sequence structure abstraction and in the following description the sequence bits themselves are generally referred to rather than the corresponding sequence bit square abstraction.

Of all the possible hypotheses regarding reversal position, there is one that has a special character in that it can be discounted for the FIG. 12 pattern and is initially untestable for the FIG. 15 pattern; this hypothesis (hypothesis 0) is that direction reversal has occurred at the current bit position. It will be appreciated that this hypothesis does not have significance for the FIG. 12 pattern; however, for the FIG. 15 pattern, it corresponds to reversal occurring over a separating zone (as in FIG. 26D). Hypothesis 0 is not initially testable for the FIG. 15 pattern because there is no information on which to carry out any test. Hypothesis 0 must therefore be retained as possibly true in the case of the FIG. 15 pattern (and, in fact, can also be retained for the FIG. 12 pattern as subsequent tests will generally eliminate it). As hypothesis 0 is not initially tested, it has not been shown in FIG. 27.

The first testable hypothesis (hypothesis 1 shown in block 140, FIG. 23) is that reversal occurred at the intermediate zone I intermediate the sequence bits pointed to by the pointers $p_0$, ($p_0$-1), this zone being indicated by the expression "I ($p_0$, ($p_0$-1))" shown in FIG. 27. Further according to hypothesis 1, the current actual position of the sensing head along the X-sequence is at the position pointed to by pointer ($p_0$-1), that is, bit b5 in the example. This hypothesis can be immediately rejected if the value of the bit pointed to by the pointer ($p_0$-1) is the same as the value of the bit pointed to by the pointer $p_0$ (in the example if b5=b6) since it is known that the value of the corresponding sensed bit differs from that of the bit pointed to by the pointer $p_0$. It should be noted that in FIG. 27 the convention is used that where a pointer is enclosed in square brackets it is the value of the bit pointed to by that pointer that is being referenced.

If the test for hypothesis 1 to be true is passed, then the pointer ($p_0$-1) is retained as possibly pointing to the current actual position of the sensing head 16. However, if the test for hypothesis 1n is failed, then the pointer ($p_0$-1) is discarded because it is known that the current actual position of the head 16 cannot be at the bit pointed to by that pointer.

Having tested hypothesis 1, hypothesis 2 (shown in block 141 in FIG. 23) is next considered. Hypothesis 2 is that reversal took place at the bit pointed to by pointer ($p_0$-1) and that the current actual position of the sensing head is at the bit pointed to by the pointer ($p_0$-2). Again, the hypothesis is tested by comparing the value of the bit pointed to by pointer $p_0$ with that at the hypothesized actual position, that is, the position indicated by pointer ($p_0$-2). If the tested bit values are equal then hypothesis 2 can be rejected since it is known that the value of the corresponding sensed bit differs from that of the bit pointed to by $p_0$. Pointer ($p_0$-2) is, in this case, discarded. On the other hand if the tested bit values are different, then hypothesis 2 is not rejected and pointer ($p_0$-2) is retained as a possible indicator of the current actual position.

After hypothesis 2 has been tested, hypothesis 3 (block 142) is next considered. This hypothesis postulates that reversal occurred over the zone I separating the bits pointed to by pointer ($p_0$-1) and ($p_0$-2), the current actual position of the sensing head being at the bit pointed to by pointer ($p_0$-3). This time, the hypothesis can be subjected to two tests, the first test being one corresponding to the tests carded out for hypothesis 2 and 1 by which the value of the bit pointed to by pointer $p_0$ is compared with the value of the bit pointed to by the pointer that according to the hypothesis, indicates the current actual position; the hypothesis is discarded if these bit values are equal. The second test for hypothesis 3 is whether the values of the bits enclosed between the incorrectly assumed position and the hypothesised actual position are equal (the bit value on the side of the postulated reversal position nearest position $p_0$ being a true indicator of the value of the corresponding sensed bit). In other words, the value of the bit pointed to by pointer ($p_0$-1) is compared with the value of the bit pointed to by pointer ($p_0$-2) and the hypothesis 3 is rejected and pointer ($p_0$-3) is discarded as a potential actual position indicator if the compared bit values differ.

Next, hypothesis 4 (block 143 in FIG. 23) is constructed and tested, this hypothesis being that reversal occurred at the bit pointed to by pointer ($p_0$-2) and that the actual current position is indicated by the pointer ($p_0$-4). The testing of this hypothesis proceeds in essentially the same manner as for hypothesis 3 and will therefore not be described in detail. Similarly, further hypotheses are constructed and tested for reversal positions and actual current positions successively further away from the position pointed to by pointer $p_0$. It will be appreciated that for each hypothesised reversal position and corresponding hypothesised actual current position, there will be:

(i) in every case (except in respect of hypothesis 0), a first test involving the comparison of the bit values at the hypothesised actual current position ($p_0$-Cn2) and at the position pointed to by $p_0$ (the hypothesis being rejected if those values are the same as the corresponding sensed bit must have a value different to that of the bit pointed to by $p_0$);
  (ii) for cases where the hypothesised reversal position is spaced by at least one bit from the hypothesised current position, one or more second tests in which the bit values of the bits of the or each pair of bits symmetrically disposed about the hypothesised reversal position are compared (the hypothesis being rejected if these values differ as the bit of each pair which lies nearer $p_0$ has a value equal to the corresponding sensed bit).

Clearly the further away that the hypothesized actual position is from position $p_0$, the more opportunities there are to test the hypothesis concerned since the number of enclosed bit pairs which are subject to the second test, increases the greater the separation of the hypothesized actual position is from $p_0$.

In due course all relevant hypotheses will have been constructed and tested (a relevant hypothesis being one for which the hypothesized actual position lies within the window length range of position $p_0$). At the end of this process there will only be a few remaining valid hypotheses, these hypotheses being represented by the pointers to their hypothesized current actual position.

As already indicated the process generally described above with reference to FIG. 27 is implemented by the RR start-up routine 103 that is initiated by the incremental tracking routine 101 upon discovery of a mismatch between a sensed bit value and the predicted bit value. FIG. 28 shows a flow chart of the RR start-up routine 103. Upon entering into the routine, the value "1" is assigned to count Cn2, the value "0" is assigned to count Cn3, and the pointer $p_0$ is placed in the pointer list 68 (step 150). Next, a pointer ($p_0$-Cn2) is created, this being a pointer to a hypothesized current actual position (step 151). Thereafter, the tests possible for checking validity of the hypothesized current actual position are carried out (step 152), these being the first and second tests described above.

If one or more of the test or tests available for testing the currently hypothesized actual position is failed, then the corresponding pointer ($p_0$-Cn2) is discarded (step 153). On the other hand if all tests for the hypothesized current actual position are passed, then the hypothesized current actual position pointer is stored in the pointer list 68 (step 154) with its associated direction flag indicating a direction opposite to that associated with pointer $p_0$.

After storage or discardal of the pointer ($p_0$-Cn2), count Cn2 is incremented to keep track of however many pointers to hypothesized current actual positions have been created and tested (step 155). If the incremented value of count Cn2 exceeds the window length N of the X-sequence, then no further pointers to hypothesized current actual position are created (see step 156). At this stage, the pointer $p_0$ may be discarded from the pointer list 68 if the pattern 20 is of the FIG. 12 form. If the value of count Cn2 is less than N when tested in step 156, then the routine loops back to step 151 to cream another pointer to a new hypothesized current actual position, the process of steps 151 to 155 being repeated until pointers to all possible current actual positions have been created and tested.

Next, the Defer Flags of the preceding N/2 X position entries in the output FIFO 76 are set to indicate that one or more of these position values is incorrect and that updated values will be provided as soon as they are available (step 158). A new X-position entry with its Defer Flag set is also made in FIFO 76 in respect of the currently sensed bit on the basis of which reversal was detected. Thereafter, the value of "D" is assigned to RESULT (step 159) and the RR start-up routine 103 is exited.

Upon the RR start-up routine 103 being exited, the pointer list 68 contains a set of pointers to a number of hypothesized actual positions which have passed the initial validity tests.

As a consequence of the value "D" being assigned to RESULT on exiting of the RR start-up routine 103, the tracking mode is changed to reversal recovery so that upon the sensing head 16 sensing a new X-sequence bit, the reversal recovery routine 102 will be entered. The newly provided X-sequence bit enables further testing of the hypothesized actual current positions represented by the pointers stored in the pointer list 68 because the sensed bit value can be compared with the value predicted by taking each hypothesized current actual position in turn. Thus, referring to the flow chart of the reversal recovery routine shown in FIG. 29, in step 161 the first/next pointer in the pointer list 68 is taken and the value of the next bit predicted from this point is compared with the actual sensed bit value (step 162). If there is a mismatch between the predicted and sensed bit values, then the corresponding pointer is discarded from the pointer list 68 (step 163). On the other hand, if the predicted and sensed bit values correspond, then the relevant pointer is incremented and restored to the pointer list 68 (step 164). Thereafter a check is made to see if there are any further pointers to be processed in the pointer list 68 (step 165) and, if so, the routine loops back to the step 161.

Once all the pointers in the list 68 have been processed, the total number of pointers remaining in the list is examined (step 166). If no pointers remain in the list, then an irrecoverable situation has been encountered; this may have arisen either due to sensing errors or because the direction of movement has been reversed again during the lo reversal recovery process. In any case, the value "L" is assigned to RESULT (step 167) and the reversal recovery routine is exited.

However, if the number of pointers remaining in the pointer list 68 is only 1, then it is assumed that this pointer correctly points to the current actual position of the sensing head. Accordingly, the routine 102 proceeds to derive actual X-position values for all the X-entries that have had their Defer Flags set in the output FIFO 76, these new position values being entered into the FIFO 76 together with the current actual position (step 168). Thereafter the value "S" is assigned to RESULT and the reversal recovery routine is exited.

If there are still multiple entries in the pointer list 68 so that it is not yet possible to decide what the actual current X-position really is, then subject to certain criteria to be explained below, the reversal recovery routine makes a deferred entry into the output FIFO 76 by setting the defer flag of a new X entry (step 172) and assigns the value "D" to RESULT before exiting the reversal routine. Thereafter, the reversal recovery routine is executed as each new X bit value is read in until all pointers other than the correct one have been eliminated from the pointer list.

If only one reversal has occurred and there are no reading errors, then the elimination process should be successful within (N−2) iterations of the reversal recovery routine. Failure to isolate the correct pointer within (N−2) iterations indicates that the X-position has been irrecoverably lost. In order to detect this situation the count Cn3 is incremented each time the test (step 166) is exited on the branch corresponding to multiple pointer entries in the list 68, this incrementing being effected in step 170. Thereafter, the value of count Cn3 is compared to the value (N−2)(step 171) and only if Cn3 is less than or equal to (N−2) are steps 172 and 173 executed. If the value of count Cn3 is greater than (N−2) then the value "L" is assigned to RESULT (step 174) and the reversal recovery routine 180 is exited.

In summary, it can be seen that the XBIT process 60 after having established an initial position by execution of the absolute tracking routine 100, proceeds to keep track of the current X-position by the incremental process implemented by incremental tracking routine 101. If the incremental tracking routine detects a discrepancy between the actual sensed bit value and the value of the next predicted bit of the X-sequence, then a reversal is assumed to have occurred and the reversal recovery process is initiated by execution of the RR start-up routine 103 to establish a set of pointers to possible current actual X-positions and to carry out initial validity tests on these pointers. Thereafter, the reversal recovery 102 is executed as each new X bit value is read in and used to carry out further validity tests on the sets of possible pointers to the current actual X-position. In due course the current X-position will either be established by routine 102 or a decision is made that the X-position has been irrecoverably lost.

The YBIT process 61 operates in an analoguous manner for movement along the Y-sequence.

The outputs of the XBIT and YBIT processes 60 and 61 are fed to the output buffer 63 as a succession of X and Y position entries for storage in the output FIFOs 76 and 77 respectively. The order in which X and Y position entries are received by the buffer 63 is kept track of by means of a sequence number generator 179 that is incremental each time a new X or Y entry is received, each new entry being stamped with this sequence number Coy the number being stored together with the entry in the corresponding FIFO 76,77). As previously noted, each entry also has an associated Defer Flag which can be set to indicate that the entry is only a provisional one and should not be output from the processor sub-system 51. In fact, an entry flagged Defer may not initially have a corresponding position value, this value being supplied later (this is the case both when the absolute tracking routine 100 is building up a window sequence prior to establishing an initial absolute position, and when the reversal recovery routine 102 is still eliminating pointers from the set of possible pointers stored in the list 68).

The XBIT and YBIT processes 60 and 61 can independently write to their corresponding FIFOs though if they both do so within a short time interval of each other, then both entries (the X and Y entries) are given the same sequence number. The output process 62 is prevented from colliding with the processes 60 and 61 and vice versa by an appropriate system of semaphores.

The output process 62 will now be described with reference to the flow chart shown in FIG. 30. The basic operation of the output process is to take the head X and Y-position entries off the output FIFOs 76,77 and output them as the current coordinates of the sensing head 16. However, the process is complicated by the possibility of entries flagged Defer in the FIFOs 76,77. Not only is the output process 62 required to suspend output when a Defer entry is encountered, but the operation of the output process should preferably lag behind that of the XBIT and YBIT processes 60 and 61 so that a queue of entries builds up in the FIFOs 76,77 enabling the XBIT or YBIT process to set previously processed entries to Defer upon detection of reversal in either the X or Y coordinate direction. Nevertheless, where valid entries exist in the FIFOs 76,77 these should not be allowed to remain dormant forever. It will therefore be appreciated that the output process 62 needs to take account of a number of conflicting requirements and provide some satisfactory practical compromise in its operation.

Figure 30:
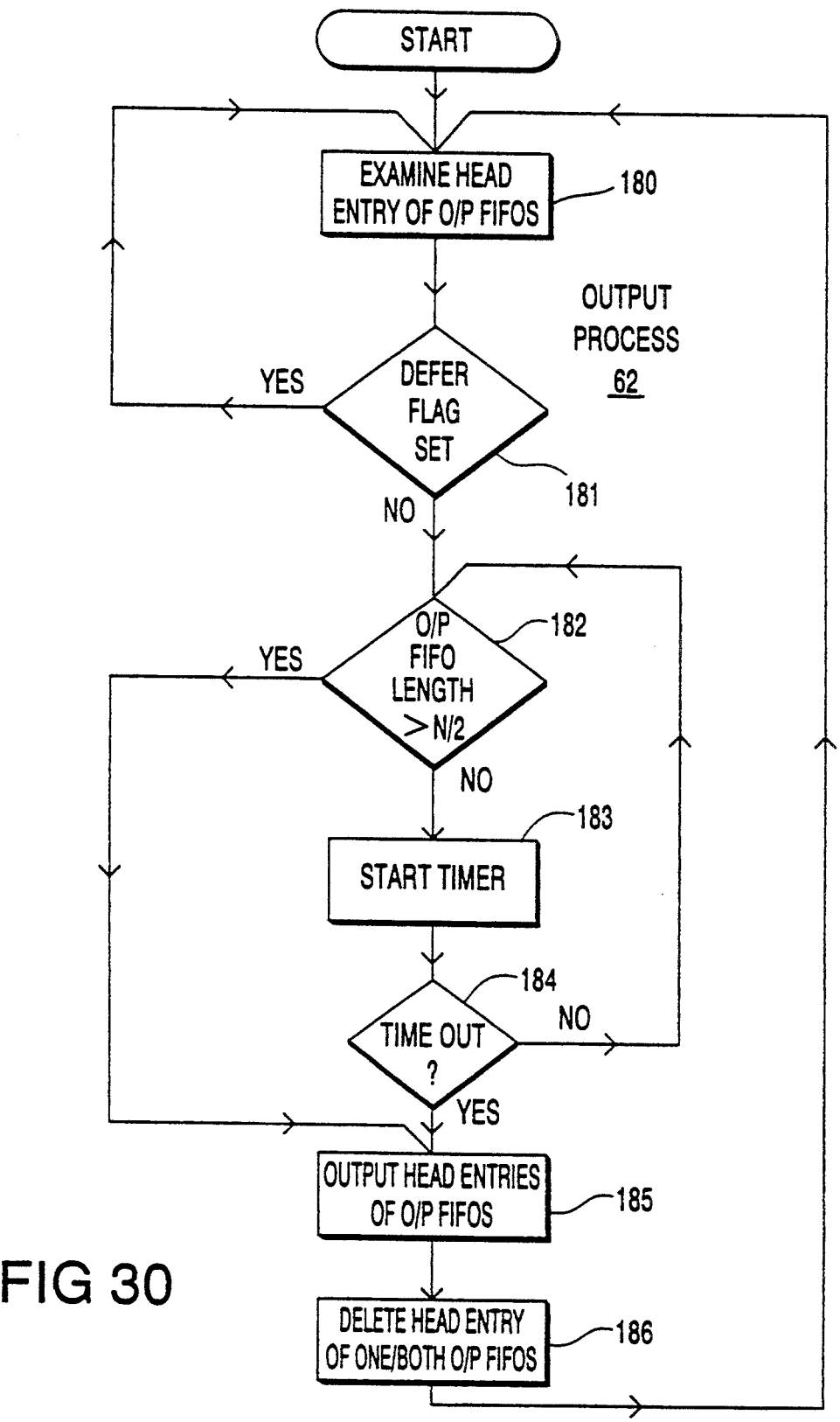
FIG. 30—is a flow chart of an output process of the FIG. 23 process.

Turning now to a consideration of FIG. 30, the first step executed by the output process is to examine the head entry of each of the output FIFOs 76,77 (step 180). If the Defer flag of the head entry is set (tested in step 181), then the output process loops back to step 180 and continues to check the head entry until the Defer flag is reset by the XBIT or YBIT process or until the entry is cancelled.

If neither head entry has its Defer Flag set, then the output process next goes on to check the number of entries in each FIFO (step 182). If there are more than N/2 entries, the output process outputs the head entry of the FIFOs 76,77 as an X/Y coordinate pair. Thereafter, one or both head entries are removed according to criteria described below (step 186) and the output process then loops back to step 180.

A typical output sequence of X/Y pairs and the process of removing entries from the head of the FIFOs 76,77 will next be described, by reference to the following two lists giving typical contents of the FIFOs 76,77.

| X O/P FIFO 76 | Y O/P FIFO 77 |
|---|---|
| $x_0$ | $y_0$ |
| $x_3$ | $y_1$ |
| $x_5$ | $y_2$ |
| $x_7$ | $y_4$ |
|  | $y_6$ |
|  | $y_7$ |

In these lists, the top entry corresponds to the head entry of each FIFO and the entry suffixes correspond to the sequence number assigned to the entries. Each time step 185 is executed, the head entries of the two FIFOs are output as an X/Y coordinate pair. Thereafter, in step 186, the head entry of each list is examined and is deleted if:

either the next entry in both lists are of equal age (as indicated by their suffixed sequence numbers), or the next entry in the list under examination is older (i.e has a lower sequence number) than the next entry in the older list.

The two lists are examined simultaneously in the sense that when considering whether to delete the head of one list, comparison is made with the other ist prior to any removal of the head entry of that other list. Furthermore, the head entry of a list is not removed if thsi would leave the list empty.

The foregoing deletion criteria has the effect of ensuring that every list entry is used and is used with the last value of the other list that was valid at the time it was taken. For the example lists given, the sequence of output of X/Y coordinate pairs would be as follows:

$X_0, Y_0$
$X_0, Y_1$
$X_0, Y_2$
$X_3, Y_2$
$X_3, Y_4$
$X_5, Y_4$

X₅, Y₆
X₇, Y₇

Returning now to a consideration of FIG. 30 if the check carried out in step 182 shows that the number of entries in the FIFO 63 is less than N/2, then a timer is started (step 183) and a time out tested for (step 184). If the timer is still timing then the process loops back to test 182. However, if the timer has timed out, the process proceeds to step 185 in which it processes the head entry of the FIFO.

Steps 182 to 184 seek to ensure that generally there are at least N/2 entries in each of the FIFOs 76,77 (this number of entries being referred to as the 'target queue' length) but that if the rate of input of entries becomes very low, the entries towards the head of the FIFOs do not lie dormant but are shifted through at some rate determined by the period timed by steps 183 and 184. The target FIFO queue length of N/2 is chosen on the basis that when a reversal is detected, the preceding N/2 entries for the X (or Y) position are, if possible, set to Defer. However, since when a reversal is detected, it will generally only be the more recent of the last N/2 entries that are in error, target queue lengths of less than N/2 may be acceptable depending on the perceived relative importance of the factors involved.

Finally with respect to the FIG. 17 apparatus, when the lift-off interrupt is asserted causing the interrupt service routine ISR-4 to be executed, the XBIT, YBIT and output processes 60, 61 and 62 are all re-initiated and the buffer 64 and output FIFOs 76,77 are flushed. The low-level hardware 50 is also reset in these circumstances.

Many variations are, of course, possible to the above-described arrangement. Generally, it may be noted that the complexity of the apparatus will depend on the form of the pattern being sensed and, in particular, how much information is directly supplied by the pattern and how much must be deduced.

Applications

The described pattern-sensing apparatus can be used in a number of different applications.

For example, the basic apparatus of FIG. 1 can be used as a graphics tablet. In such an application, if pattern features (cells) of 0.5 mm can be detected and the tablet has a surface of 500 mm by 1000 mm, then a binary sequence of 2000 elements can be used to construct a pattern of the type in which two binary sequences are arranged orthogonally (the same sequence can be used for both)

This implies a window-length of eleven or twelve elements, depending on whether a PRBS or a reversible sequence is used; the sub-pattern length will therefore be 5.5 or 6 mm in both directions. Where single pixel (pattern feature) sensing is employed, the position of the stylus can thus be determined with only a small movement of the stylus. Of course, where an area 6mm square is sensed at one time, then no stylus movement is required.

Figure 31:
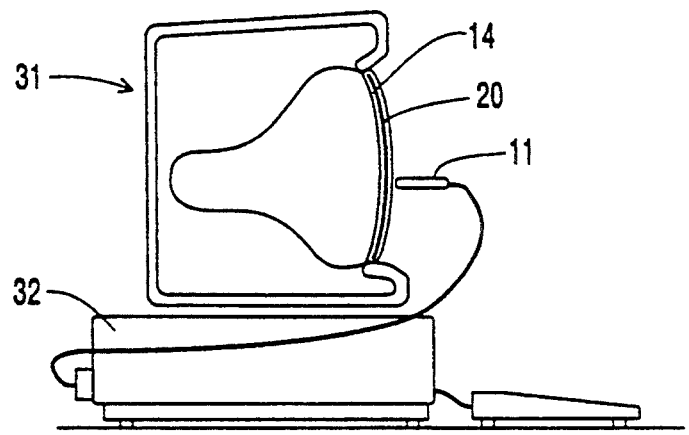
FIG. 31—is a diagram illustrating use of the position-sensing apparatus as an overlay for a screen of a workstation monitor.

FIG. 31 illustrates use of the position-sensing apparatus as an overlay for a screen 30 of a workstation monitor 31 (shown in section). The pattern-carrying member 14 is made of a material transparent to visible light and the pattern itself is printed on the member 14 in an infra-red reflective substance that is also transparent to visible light. As a result, the screen display can be viewed through the pattern 20 and member 14. To indicate a particular position on the screen (for example, for the purpose of selecting a particular function), the stylus 11 is used to point to the location. The sensing head 16 of the stylus is arranged to be sensitive to the infra-red reflectivity and can therefore read the pattern 20. The functions of the sub-pattern image processing unit 12 and the position determining unit 13 of FIG. 1, are carried out by the processing unit 32 of the workstation.

In a similar manner to FIG. 31, a transparent document overlay can be provided to permit a document to be traced into an electronic format.

Figure 32A:
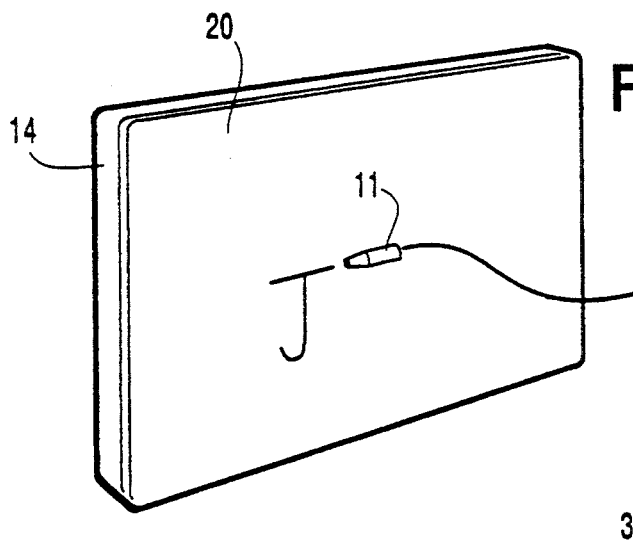
FIG. 32A—is a perspective view illustrating use of the position-sensing apparatus as an electronic whiteboard.
Figure 32B:
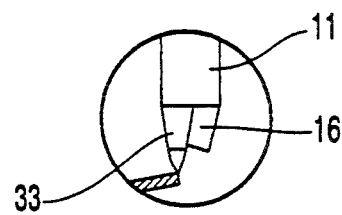
FIG. 32B—is an enlarged view of the stylus of the FIG. 32 position-sensing apparatus.

FIG. 32 illustrates use of the position-sensing apparatus as an electronic "whiteboard". In this application, the pattern-carrying member 14 is provided with an opaque white surface to which the pattern 20 is applied. The pattern takes the form of infra-red sensible markings which can either be transparent to visible light (to show the white background member 14) or white themselves (to blend in with the white background member 14). To write on the white board composed of the member 14 and the applied pattern 20, the head of stylus 11 is provided with a marking element 33 (see inset in FIG. 32) which is operative to deposit a marking substance on the white board. This marking substance is infra-red transparent but optically visible (in FIG. 32 the letter "J" has been shown written up on the white board). The sensing head 16 of the stylus 11 is arranged to sense the infra-red pattern markings which are not obscured by writing on the white board. In this manner, the position of the stylus over the white board can be sensed so that it becomes possible to build up an image of what has been written on the white board (for example, by an appropriately programmed work station 32).

Figure 33:
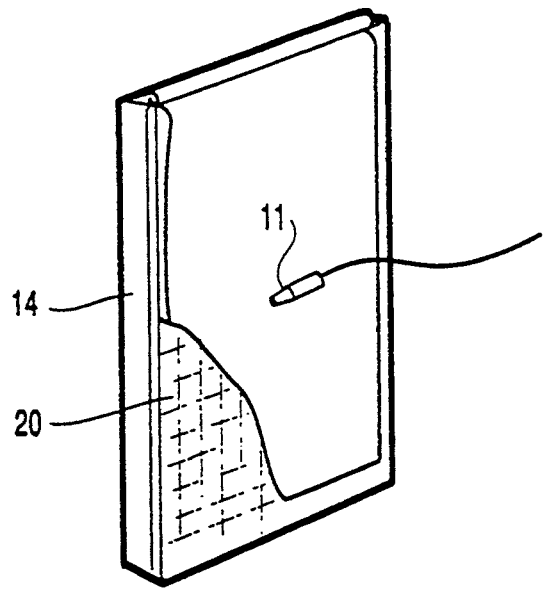
FIG. 33—is a perspective view illustrating use of the position-sensing apparatus as a flip-chart.

FIG. 33 illustrates use of the position-sensing apparatus as a "flip-chart". In this application, the pattern-carrying member 14 is marked with a pattern 20 which may be optically visible. A markable sheet 35 is then placed over the pattern 20. This sheet 35 provides at least a semi-opaque background upon which a person can write; however, the sheet 35 permits the sensing of the pattern 20 through it by a suitable sensing head 16 of the stylus 11. As with the FIG. 32 embodiment, the stylus has a marking element which is operative to deposit a marking substance on the sheet 35. This marking substance has the characteristic that it permits a sensing of the pattern 20 through it whilst at the same time still being optically visible against the background of the sheet 35.

An alternative implementation of the FIG. 33 flip-chart would be to place the pattern 20 on the reverse of each sheet 15 rather than on the member 14.

Variants

Many variations of the above-described position-sensing apparatus will be apparent to a person skilled in the art. For example, although the patterns and their underlying arrays have been described in terms of a rectangular arrangement of cells, this is not the only possible cell arrangement. Two other possible partitionings are those based on triangular and hexagonal grids formed by dividing a surface into congruent regular triangles and hexagons respectively. Both these grids have potential advantages in certain situations.

In a triangular grid, each cell has only three neighbours (together with three other cells which it touches in a point). In a rectangular grid each cell has four neighbour cells and four cells which it touches in a point. Given an encoding scheme in which each cell transition must involve a colour change and in which each neighbour of a given cell must have a difference 'colour' i.e. as illustrated in FIG. 6, a triangular grid offers the potential to derive patterns with fewer colours. This could reduce the cost and complexity of the sensing head 16.

In a hexagonal grid, each cell has six neighbours (and no cells which it touches in only a point). In certain 'single pixel' sensing environments, the possibility of the sensing head moving directly from one cell to another cell which it touches only in a point cannot be ruled out. In these circumstances, the hexagonal grid again offers the possibility of encoding schemes with fewer colours (and/or shades of grey).

Figure 34:
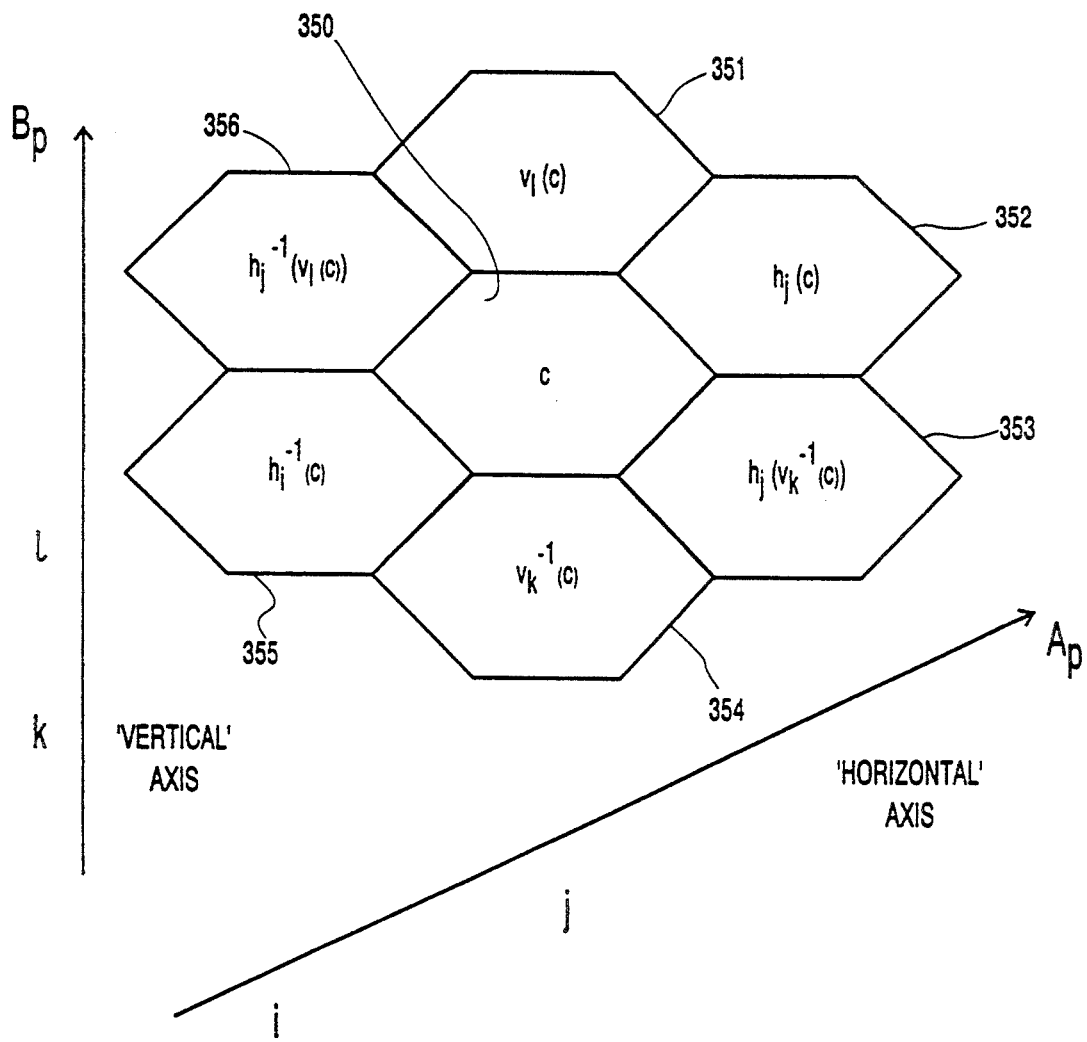
FIG. 34—is a diagram illustrating the encoding of an hexagonal grid of cells.

By way of example, FIG. 34 illustrates a portion of a hexagonal grid with a central hexagonal cell 350 and the six hexagonal cells 351 to 356 that surround it. A "horizontal" axis $A_p$ and a "vertical" axis $B_p$ are defined and the hexagonal cells run in rows parallel to these axes. The cells are to be coloured to represent the element values of two binary sequences extending parallel to the axes $A_p$, $B_p$ respectively; element values "i" and "j" for the horizontally-extending sequence and "k" and "l" for the vertically-extending sequence, are shown in FIG. 34. For implementing a transitional encoding scheme, four encoding functions $h_0$, $h_1$, $v_0$, $v_1$, are defined in a manner similar to the rectangular pattern case described above in detail. If the central hexagonal cell 350 is coloured "c" then the colours of the surrounding cells are as given in FIG. 34 where, for example, $v_k^{-1}(c)$ means the colour "y" which has the property that $v_k(y)=c$. Note that a single function application is needed to determine the colour of the cells adjacent cell 350 along the horizontal and vertical axes, but that a double function application is needed to determine the colour of the cells 356 and 353. These latter cells are effectively in the same relation to the cell 350 as diagonal cells in the rectangular pattern case.

If the four encoding functions have the following form:

$h_0(c) = c+1$ (mod 9)
$h_1(c) = c-1$ (mod 9)
$v_0(c) = c+3$ (mod 9)
$v_1(c) = c-3$ (mod 9)

then the other transitions from a cell, effectively along its diagonal are $c+2$, $c-2$, $c+4$, $c-2$.

In fact, hexagonal cells are like square cells where it is only permissible to go on one diagonal (for example, diagonally up and left or down and right but not up and right or down and left). Thus, any encoding scheme that works for a rectangular grid (no separators) where diagonal movements are allowed, will also work for hexagonal grids.

It will be appreciated that for a pattern based on a hexagonal arrangement of cells, a sub-pattern can be lined up with the pattern in six different orientations, rather than the four orientations possible for a rectangular pattern. Account must, of course, be taken of this when determining what orientation information needs to be provided. Where two orientable sequences are encoded in the hexagonal pattern as in the example given above, then the sub-pattern must be detected in one of the two orientations out of the possible six, and orientation information enabling this must be provided by any of the three methods 200, 201, 203 described above with reference to FIG. 5.

As has already been noted, the physical parameter used to encode pattern features need not be optical/infra-red but could be surface roughness, magnetic permeability, or any one or more of a whole range of other possible physical characteristics.

The means used to sense the pattern 20 need not be integral with the element used to point to a particular position on the pattern whose location is to be found. For example, a fixed (or pivotly mounted) sensor could be used whilst the pointing element could be a pair of cross wires (either real or constituted by an electronic image moved across an image of the pattern 20).

It will be appreciated that the orientable and complement orientable binary sequences described above can also be used where linear position sensing is required rather than position sensing over an area.

Appendices

The following four Appendices are included as an integral part of this description:

Appendix A—A method of constructing binary arrays with the windowing property
Appendix B—Derivation of orientable and complement orientable sequences
Appendix C—Finding the position of a sequence
Appendix D—Position finding in a pseudo-random array

APPENDIX A

A method of constructing binary arrays with the windowing property

1 Introduction

We want to construct binary arrays with the property that each $k_1 \times k_2$ subarray appears at most once in the array. It is easy to construct binary sequences of length $2^k - 1$ such that every subsequence of length k appears at most once, and such sequences are called m-sequences. We shall use a pair of m-sequences to construct an array with the windowing property. It is of interest to be able to find the position of a subarray within the array, and we shall give a procedure for this. A harder problem is to do the same when the orientation of the array is unknown. We shall also give a method for constructing arrays where, given a $k_1 \times k_2$ subarray, it is possible to determine not only the position in the array, but also the orientation of the array. This construction will require a sequence in which each subsequence of length k appears at most once, and if such a sequence occurs, then its reversal does not. These sequences are called orientable m-sequences.

2 Construction

Let $\underline{s} = (s_0, s_1, \ldots, s_{2^{k_1}-2})$ and $\underline{t} = (t_0, t_1, \ldots, t_{2^{k_2-1}-2})$ be binary m-sequences. We construct a $(2^{k_1}-1) \times 2^{k_2}-1$ array as follows. The first column of the array is just the sequence $\underline{s}$. To form the second and subsequent columns, we look at the sequence $\underline{t}$. If $t_0 = 0$, then the second column is just $\underline{s}$ again, while if $t_0 = 1$, then the second column is $\underline{s}$ circularly shifted down by one place, that is $(s_{2^{k_1}-2}, s_0, \ldots, s_{2^{k_1}-3})$. The remaining columns are constructed is a similar way: if $t_{i-1} = 0$, then the (i+1)th column is the ith column again, while if $t_{i-1} = 1$, then the (i+1)th column is the ith column circularly shifted down by one place.

3 Finding the position

We now give a procedure for determining the position of a given $K_1 \times k_2$ subarray, assuming that we have a method for finding the positions of subsequences of $\underline{s}$ of length $k_1$, and of subsequences of $\underline{t}$ of length $k_2 - 1$. Suppose that our subarray has columns $u_0, u_1, \ldots$ ,$u_{k_2-1}$. Then $u_0$ is a subsequence of s of length $k_1$, and so we can find its position r say. We now look at the other columns of our subarray, and determine their relative shifts. This is straightforward because, for each i, either $u_i = u_{i+1}$, in which case the shift is zero, or $u_i \neq u_{i+1}$, in which case the shift is one. We are thus able to construct a subsequence of $\underline{t}$ of length $k_2 - 1$, and so we can find its position w, say. Then the horizontal position of our subarray is just w. If we keep a table of cumulative shifts (calculated by adding successive elements of $\underline{t}$), we can look up the shift of the wth column, and add it to r modulo $2^{k_1} - 1$ to obtain the vertical position of our subarray.

4 Example

Suppose that $k_1 = k_2 = 3$. We choose $\underline{s} = (0,0,1,0,1,1,1)$, and $\underline{t} = (0,1,1)$. Then the array is

| | | | |
|---|---|---|---|
| 0 | 0 | 1 | 1 |
| 0 | 0 | 0 | 1 |
| 1 | 1 | 0 | 0 |
| 0 | 0 | 1 | 0 |
| 1 | 1 | 0 | 1 |
| 1 | 1 | 1 | 0 |
| 1 | 1 | 1 | 1 |

Suppose that we want to find the position of the subarray

| | | |
|---|---|---|
| 1 | 0 | 0 |
| 0 | 1 | 0 |
| 1 | 0 | 1 |

The first column is (1,0,1), which appears at position 2 in $\underline{s}$. The pattern of shifts is (1,1), which appears at position 1 in $\underline{t}$. The table of cumulative shifts is (0,0,1,2), and so the vertical position of the subarray is $2+0=2$. The position of the subarray is then (1,2), which may easily be checked to be correct.

5 Orientable arrays

It is possible to construct orientable m-sequences. These will allow us to construct arrays in which it is possible not only to determine the position of a subarray, but also to tell whether it is upside down or not.

If we perform the construction described above with $\underline{t}$ an orientable m-sequence, then the orientation of the subsequence of t tells us which way up the subarray is. Alternatively, if $\underline{s}$ is an orientable m-sequence, then the orientation of the first column as a subsequence of $\underline{s}$ also gives us this information.

It would also be useful to be able to tell if the subarray has been rotated through 90°. In this case, the columns will no longer be subsequences of $\underline{s}$, so we cannot use the above methods. This situation should be reasonably easy to identify, however, once $k_1$ and $k_2$ are of reasonable size. This is because the chance of subsequent rows in the original subarray all being either equal or shifted by one is extremely remote.

APPENDIX B

Derivation of Orientable and Complement-Orientable Sequences

We shall express the task of finding orientable and complement-orientable sequences in terms of finding a path through a directed graph; this is standard practice in the area of deBruijn sequences. If we are looking for sequences with window length m, we construct a directed graph, usually called the deBruijn graph, whose vertices are labelled with the sequences of length (m−1) and whose edges are labelled with the sequences of length m, as follows. An edge is drawn from a vertex labelled with $(a_0, a_1, \ldots, a_{m-2})$ to a different vertex labelled with $(b_0, b_1, \ldots, b_{m-2})$ if and only if:

$$a_1 = b_0, a_2 = b_1, \ldots, a_{m-2} = b_{m-3}.$$

If this condition is satisfied, then the edge is labelled with $$(a_0, a_1, \ldots, a_{m-2}, b_{m-2}) = (a_0, b_0, \ldots, b_{m-3}, b_{m-2}).$$

We see, therefore that a path through the graph can be thought of as a sequence where successive windows of the sequence correspond to the successive edge labels. All sequences of length m except the all zero and the all one sequence occur as edge labels. These do not occur because they would link a vertex to itself, which is not allowed.

Orientable Sequences

We can obtain a crude upper bound on the length of an orientable sequence of window length m. The total number of windows of length m is $2^m$. If m is even, then the number of palindromes of length m is equal to $2^{m/2}$, whereas if m is odd, then the number of palindromes is $2^{(m+1)/2}$. The remainder of the windows may be grouped into pairs, each one with its reverse. The maximum length of an orientable sequence is then $$M = \begin{cases} 2^{m-1} - 2^{(m-2)/2} + m - 1 & \text{if } m \text{ is even.} \\ 2^{m-1} - 2^{(m-1)/2} + m - 1 & \text{if } m \text{ is odd.} \end{cases}$$

It seems, however, that this upper bound is never attained.

An orientable sequence can be thought of as a path through the deBruijn graph which has the property that if an edge occurs in the path, then the edge with the reverse label does not occur. In particular, no edge with a palindrome label may occur. Our task involves finding Eulerian paths (that is paths which use each edge exactly once) in a directed graph. It is generally straightforward to find an Eulerian path in a graph and several algorithms exist (see, for example, Frank Harary. Graph Theory. Addison-Wesley, Reading, Mass., 1972.)

A directed graph has a Eulerian path if it is connected, and each vertex (except possibly the start and end vertices) has the same number of edges coming into it as going out from it. This is indeed the case for the deBruijn graph. We know that we are not allowed to use edges with palindrome labels, so we must remove them. In order to preserve the Euler property, we must actually remove complete cycles containing palindromes. This is the first step, therefore, to construct and remove cycles containing palindromes. The second stage is to find a path through the remaining graph. A standard method is first to construct a spanning tree, mark all edges in this tree, and then trace a path backwards through the graph, always choosing an unmarked edge if possible.

We can also construct orientable sequences of window length $2m+1$ recursively from orientable sequences of window length 2 m, using the Lempel homomorphism. This maps binary sequences of length t to binary sequences of length t−1 and is defined by:

$$(x_0, \ldots, x_{t-1}) \rightarrow (x_0 \ominus x_1, \ldots, x_{t-2} \ominus x_{t-1}).$$

The inverse image of $(y_0, \ldots, y_{t-2})$ is the set $\{(u_0, \ldots, u_{t-1}), (v_0, \ldots, v_{t-1})\}$ where $u_0=0$, $v_0=1$ and $$u_{i+1} = \begin{cases} u_i \text{ if } y_i = 0 \\ - \\ \overline{u_i} \text{ if } y_i = 1 \end{cases}$$

and $$v_{i+1} = \begin{cases} v_i \text{ if } y_i = 0 \\ - \\ \overline{v_i} \text{ if } y_i = 1 \end{cases}$$

If we have an orientable sequence of length M and window length 2 m which starts with 2 m−1 zeros and ends with 2 m−1 ones, and look at its inverse image under the Lempel homomorphism, we obtain two sequences, one starting with 2 m zeros and finishing with a string of 2 m alternating zeros and ones, and the other equal to the complement of this. If we reverse the second sequence, and glue the two sequences together, amalgamating the string of alternating zeros and ones, to obtain a sequence of length 2M+2−2 m which is orientable with window length 2 m+1.

An example orientable sequence of window length 10 is given below:

```
10000000100001010001000001010010000001100010000110
01000001100110100000111000100010010010101000011010
00100110100100011010011000101001100111000010011100
01100111100000110101000010111000011011001001011001
01001011010010011010010100011101010101010011110000011
11010101101100010110110111000111101110001111001000
11111101001101110100111001111011101011001110101111
01111100110111110101101111111100010110111011001001100
```

Complement-orientable Sequences

In this case, we are able to construct maximal length sequences when the window length is odd, but are not able to do any better than in the orientable case if the window length is even. If the window length m is odd, then a sequence of length m may be arranged in pairs by associating each sequence with the reverse of its complement, and any complement-orientable sequence may contain at most one of each pair as a subsequence. The number of these pairs is clearly $2^{m-1}$. A sequence of length n contains n−m+1 subsequences of length m, so if n is the length of a complementorientable sequence with window length m, then we may deduce that:

$$n - m + 1 <= 2^{m-1}$$

and so $$n <= 2^{m-1} + m - 1.$$

If we could construct a windowing sequence whose subsequences each contain more zeros than ones, then it would automatically be complement-orientable, since the reverse of the complement of any subsequence would have more ones than zeros, and so not be a subsequence itself. We shall do this by looking at a subgraph of the deBruijn graph. This subgraph consists of all vertices and edges whose labels have at most (m−1)/2 ones. Then any Eulerian path through this directed graph yields a maximal length complement-orientable sequence. The following algorithm constructs a maximal length complement-orientable sequence. The successive windows of the sequence are given by $\underline{w}$.

Set $\underline{w} = (w(0), w(1), \ldots, w(m-1))$ to be $(0, \ldots, 0)$.
If $(w(1), \ldots, w(m-1))$ contains fewer than $(m-1)/2$ ones then
  if we haven't already seen $(w(1), \ldots, w(m-1), 1)$ then
    set $\underline{w} = (w(1), \ldots, w(m-1), 1)$
  else if we haven't already seen $(w(1), \ldots, w(m-1), 0)$ then
    set $\underline{w} = (w(1), \ldots, w(m-1), 0)$
  else
    stop
else
  else if we haven't already seen $(w(1), \ldots, w(m-1), 0)$ then
    set $\underline{w}$ $(w(1), \ldots, w(m-1), 0)$
  else
    stop.

In other words, we add 1 to the sequence whenever we can and add 0 otherwise.

If the window length is even, then we could simply look at the subgraph of the deBruijn graph where each label has at most $(m-2)/2$ ones, which would guarantee complement-orientableness. This, however, does not yield long sequences, because of all the sequences with m/2 ones which are not complement-palindromes, but have been excluded from consideration by this method.

APPENDIX C

Finding the position of a sequence

1 Introduction

This Appendix describes the computations necessary to determine the position of a sequence in the output of a Linear feedback shift register. A similar approach is disclosed in: "Equivalence of Nonlinear Shift-Registers" by J. L. Massey and R. W. Liu; IEEE transactions on Information Theory Vol IT-10, Number 4, October 1964, pages 378-379.

2 Notation

Suppose that we have a linear feedback shift register with coefficients $c_0, c_1, c_2, \ldots, c_{k-1}$. Let C be the matrix $$\begin{pmatrix} 0 & 1 & 0 & \ldots & 0 & 0 & 0 \\ 0 & 0 & 1 & \ldots & 0 & 0 & 0 \\ . & . & . & & . & . & . \\ . & . & . & & . & . & . \\ . & . & . & & . & . & . \\ 0 & 0 & 0 & \ldots & 0 & 0 & 1 \\ c_0 & c_1 & c_2 & \ldots & c_{k-3} & c_{k-2} & c_{k-1} \end{pmatrix}$$

Let the states of the shift register be $s_0, \ldots, s_{n-1}$, and for each r, let $S_r$ be the matrix obtained by writing each of $s_r, \ldots, s_{r+k-1}$ as a column and putting them together to form a k by k binary matrix.

3 $GF(2^k)$

The field $GF(2^k)$ consists of all polynomials of degree less than k with binary coefficients. So an element of $GF(2^k)$ looks like $$a_0 + a_1\alpha + \ldots + a_{k-1}\alpha^{k-1}$$

where each of the $a_i$ is equal to zero or one. Of course, they can be thought of as binary strings of length k. Addition is performed componentwise, so it looks like bitwise exclusive or. Multiplication is harder—elements are multiplied as polynomials in $\alpha$, and then higher powers of $\alpha$ are reduced using a primitive polynomial $$f(\alpha)=c_0+c_1\alpha+\ldots+c_{k-1}\alpha^{k-1}+\alpha^k=0.$$

Let P be the k by k matrix with entries in $GF(2^k)$ $$\begin{pmatrix} 1 & 1 & 1 & \ldots & 1 \\ \alpha & \alpha^2 & \alpha^4 & \ldots & \alpha^{2k-1} \\ \alpha^2 & \alpha^4 & \alpha^8 & \ldots & \alpha^{2k} \\ \alpha^3 & \alpha^6 & \alpha^{12} & \ldots & \alpha^3 \times 2^{k-1} \\ \cdot & \cdot & \cdot & & \cdot \\ \cdot & \cdot & \cdot & & \cdot \\ \cdot & \cdot & \cdot & & \cdot \\ \alpha^{k-1} & \alpha^{2(k-1)} & \alpha^{4(k-1)} & \ldots & \alpha^{2k-1(k-1)} \end{pmatrix}$$

then P has the property that $P^{-1}CP$ is diagonal.

4 The algorithm

The algorithm is in two parts: the first reduces the problem to that of discrete logarithms in $GF(2^k)$, and the second calculates the discrete logarithm. Both parts of the algorithm consist of a precomputation phase and a phase which must be done each time. There are several different ways of calculating discrete logs, and it is not clear which would be the best in this case. The Coppersmith algorithm is efficient for large fields, but is fairly complicated, and involves factorising polynomials. The Pohlig-Silver-Hellman algorithm is much simpler, and it is described below.

4.1 First part 4.1.1 Precomputation $S_0$ and its inverse must be calculated. $S_0$ is calculated by running the shift register until the first k states are obtained. It is a binary k by k matrix, so finding the inverse should be straightforward.

4.1.2 Remainder of computation

From the current state $s_r$, the matrix $S_r$ must be calculated by running the shift register until the next (k−1) states are obtained. This matrix must be multiplied by the matrix $S_0^{-1}$ to obtain $X = S_r S_0^{-1}$. These are both k by k binary matrices. The next item to be calculated is x, the element in the first row and first column of $P^{-1}XP$. In order to do this, the first column of XP must be calculated. Now X is a binary k by k matrix, and P is a k by k matrix with entries in $GF(2^k)$, so this should take at most $k^2$ additions in $GF(2^k)$. To calculate x then requires k multiplications and k additions in $GF(2^k)$.

This element x is now given to the second part of the algorithm.

4.2 Second part (due to Pohlig, Silver and Hellman)

For ease of notation, write Q for $2^k-1$. Q can be written as the product of its prime factors $$Q = \prod p_i^{n_i}.$$

The aim of this part of the algorithm is to find r such that $x = \alpha^r$.

4.2.1 Precomputation

For each of the $p_i$, a table of $p_i$th roots of unity must be calculated. This consists of the elements $$\alpha^{t\left(\frac{Q}{p_i}\right)}$$

for $t = 0, 1, \ldots, (p_i-1)$.

4.2.2 Remainder of computation

The idea here is to compute r modulo each of the $p_i^{n_i}$ in turn, and then use the Chinese Remainder Theorem to combine the results to obtain r.

Let $p = p_i$, and suppose that $n_i = 1$. Then the quantity $y = x^{Q/P}$ must be calculated. This can be done in the usual way by repeated squaring and multiplication. Now y is a pth root of unity, so it can be looked up in the precalculated table. If $y = \alpha^{t(Q/P)}$, then $r \equiv t \pmod{p}$.

If $n_i > 1$, then the above process is performed $n_i$ times, as follows. First $y_0 = x^{Q/P}$ is calculated and looked up in the table. Say that $y_0 = \alpha^{t0(Q/P)}$. Then $$y_1 = (x\alpha^{-t0})^{\frac{Q}{P^2}}$$

is calculated and looked up in the table. Say $y_1 = \alpha^{t1(Q/P)}$. This process is continued, and finally $$r = t_0 + t_1 p + \ldots + t_{n_i-1} p^{n_i-1} \pmod{p^{n_i}}.$$

There is a way of decreasing the number of comparisons needed to look y up in the tables, at the expense of performing more multiplications, but it is probably not sensible for the size of fields here.

The result of the above calculations is a set of numbers $u_i$, say, such that $r \equiv u_i \pmod{p_i^{n_i}}$ for each i. It is now simply a matter of applying the Chinese Remainder Theorem to obtain the value of r. Let $$M_i = \frac{Q}{p_i^{n_i}},$$

and let $N_i$ be such that $M_i N_i \equiv 1 \pmod{p_i^{n_i}}$. These can of course all be precomputed. Then $r \equiv \Sigma u_i M_i N_i \pmod{Q}$.

APPENDIX D

Position finding in a pseudo-random array

1 Introduction

This Appendix describes a generalisation to two dimensions of the position finding computation for a sequence described in Appendix C.

2 Notation

Given a pseudorandom array A of size $n_1 = 2^k - 1$ by $n_2 = (2^{k_1 k_2} - 1)/n_1$, there exist a pair of recurrences which generate A, one for moving vertically, and one for moving horizontally. If we write a $k_1$ by $k_2$ subarray of A as a vector of length $k_1 k_2$ by writing each of the columns out in turn so that $$\begin{pmatrix} a_{i,j} & a_{i,j+1} & \ldots & a_{i,j+k_2-1} \\ a_{i+1,j} & a_{i+1,j+1} & \ldots & a_{i+1,j+k_2-1} \\ \cdot & \cdot & & \cdot \\ \cdot & \cdot & & \cdot \\ \cdot & \cdot & & \cdot \\ a_{i+k_1-1,j} & a_{i+k_1-1,j+1} & \ldots & a_{i+k_1-1,j+k_2-1} \end{pmatrix}$$

is written as $$\begin{pmatrix} a_{i,j} \\ a_{i+1,j} \\ \vdots \\ a_{i+k_1-1,j} \\ a_{i,j+1} \\ a_{i+1,j+1} \\ \vdots \\ a_{ik_1-1,j+1} \\ \vdots \\ a_{i,j+k_2-1} \\ a_{i+1,j+k_2-1} \\ \vdots \\ a_{i+k_1-1,j+k_2-1} \end{pmatrix}$$

Then each of the two recurrences can be written as a $k_1k_2$ by $k_1k_2$ matrix which acts on these vectors. Let the matrix for the vertical recurrence be C and the one for the horizontal recurrence be D. Since the columns are copies of a pseudorandom sequence, C in fact consists of $k_2$ copies of a $k_1$ by $k_1$ matrix $C_0$ arranged along the diagonal:

$$C = \begin{pmatrix} C_0 & 0 & \cdots & 0 \\ 0 & C_0 & \cdots & 0 \\ \vdots & \vdots & & \vdots \\ 0 & 0 & \cdots & C_0 \end{pmatrix}$$

Now if we denote by $\underline{s}_{r,t}$ the vector corresponding to the subarray with top left hand corner at (r,t), we have $$\underline{s}_{r,t} = C^r D^t \underline{s}_{0,0}.$$

3 The algorithm

We find a matrix P such that $P^{-1}DP$ is diagonal, and then $P^{-1}CP$ is also diagonal. So $$P^{-1}C^rD^tP = (P^{-1}C^rP)(P^{-1}D^tP) = (P^{-1}CP)^r(P^{-1}DP)^t$$

is also diagonal.

Playing the same game as in the one-dimensional case, we may obtain $C^rD^t$ from $\underline{s}_{r,t}$ and $\underline{s}_{0,0}$ by constructing matrices $S_{0,0}$ and $S^{r,t}$. In the one-dimensional case, we simply moved along the sequence to construct these matrices; in the two dimensional case, we may of course move vertically, horizontally, or a combination of the two, provided that the resulting matrices are non-singular.

We may then diagonalize $C^rD^t$ using the precomputed matrix P, and look at the first eigenvalue. If the first eigenvalue of C is $\alpha$, and the first eigenvalue of D is $\beta$, then the first eigenvalue x of $C^rD^t$ is equal to $\alpha^r\beta^t$.

We know that $C^{n_1} = D^{n_2} = I$, the identity matrix. If $n_1$ and $n_2$ are coprime, then we can calculate $x^{n_1} = \beta^{tn_1}$ and $x^{n_2} = \alpha^{rn_2}$, and perform discrete logarithm calculations on these two elements in the appropriate fields to find t and r respectively.

4 Example

We shall use the 3×5 pseudo-random array from [1]. This array is $$\begin{pmatrix} 0 & 1 & 1 & 1 & 1 \\ 0 & 0 & 1 & 1 & 0 \\ 0 & 1 & 0 & 0 & 1 \end{pmatrix}$$

The matrices for moving in the horizontal and vertical directions respectively are as follows.

$$C = \begin{pmatrix} 0 & 1 & 0 & 0 \\ 1 & 1 & 0 & 0 \\ 0 & 0 & 0 & 1 \\ 0 & 0 & 1 & 1 \end{pmatrix}$$

and $$D = \begin{pmatrix} 0 & 0 & 1 & 0 \\ 0 & 0 & 0 & 1 \\ 1 & 0 & 1 & 1 \\ 0 & 1 & 1 & 0 \end{pmatrix}$$

We first calculate P such that $P^{-1}DP$ is diagonal. The eigenvalues of D satisfy the equation $x^4+x^3+x^2+x+1=0$. If we denote one of the roots of this equation by $\beta$, then the other roots are $\beta^2$, $\beta^3$ and $\beta^4 = \beta^3+\beta^2+\beta+1$. The matrix P is then equal to $$\begin{pmatrix} 1 & 1 & 1 & 1 \\ \beta^2+\beta^3 & \beta+\beta^4 & \beta+\beta^4 & \beta^2+\beta^3 \\ \beta & \beta^2 & \beta^3 & \beta^4 \\ 1+\beta+\beta^2 & \beta+\beta^3 & 1+\beta+\beta^3 & \beta+\beta^2 \end{pmatrix}$$

and from this, we calculate $P^{-1}$ to be $$\begin{pmatrix} \beta^4 & \beta+\beta^2 & 1 & \beta^2+\beta^3 \\ \beta^3 & \beta^3+\beta+1 & 1 & \beta+\beta^4 \\ \beta^2 & \beta^3+\beta & 1 & \beta^4+\beta \\ \beta & \beta+\beta+1 & 1 & \beta^3+\beta^2 \end{pmatrix}$$

We now calculate $P^{-1}CP$, and may check that it is indeed diagonal.

$$P^{-1}CP = \begin{pmatrix} \beta^2+\beta^3 & 0 & 0 & 0 \\ 0 & \beta+\beta^4 & 0 & 0 \\ 0 & 0 & \beta^2+\beta^3 & 0 \\ 0 & 0 & 0 & \beta+\beta^4 \end{pmatrix}$$

Hence we see that $\alpha$, the first eigenvalue of C, is equal to $\beta^2+\beta^3$.

Suppose that the initial state of the pseudo-random array is the vector (0010), and that the state whose position we are trying to find is (1001). We must now construct the matrices $S_{0,0}$ and $S_{r,t}$. In this small case, we must in fact move horizontally, because moving vertically gives us a singular matrix. This is because we need 4×4 array, but we have only three rows in our pseudo-random array. Moving horizontally, however, does indeed give us non-singular matrices.

$$S_{0,0} = \begin{pmatrix} 0 & 1 & 1 & 1 \\ 0 & 0 & 1 & 1 \\ 1 & 1 & 1 & 1 \\ 0 & 1 & 1 & 0 \end{pmatrix}$$

and $$S_{r,t} = \begin{pmatrix} 1 & 0 & 0 & 0 \\ 0 & 1 & 0 & 1 \\ 0 & 0 & 0 & 1 \\ 1 & 0 & 1 & 0 \end{pmatrix}$$

So we have $$X = S_{r,t}S_{0,0}^{-1} = \begin{pmatrix} 1 & 0 & 1 & 0 \\ 0 & 1 & 0 & 1 \\ 1 & 0 & 0 & 1 \\ 0 & 1 & 1 & 1 \end{pmatrix}$$

The first column of XP is therefore $$\begin{pmatrix} \beta + 1 \\ \beta^3 + \beta + 1 \\ \beta^2 + \beta \\ \beta^3 + 1 \end{pmatrix}$$

which means that the first element x of $P^{-1}XP$ is equal to $$\beta^4(\beta+1)+(\beta+\beta^2)(\beta^3+\beta+1)+1.(\beta^2+\beta)+(\beta^2+\beta^3)(\beta^3+1)=1+\beta.$$

We must therefore find r and t such that $\alpha^r\beta^t = x = 1+\beta$. Note that in this small example, both the fields in which we are computing discrete logarithms have prime order, and so we shall not be able to use the Silver-Pohlig-Hellman algorithm. Since the fields are so small, however, we can simply calculate the logarithms directly. In a larger case, however, the Silver-Pohlig-Hellman algorithm would be used.

We first compute $y=x^3$ to obtain t. Now $x^3=(1+\beta)^3=1+\beta+\beta^2+^3=\beta^4$, so we deduce that $3t \equiv 4 \pmod 5$, or that $t=3$. Similarly, we compute $z=x^5=(1+\beta^5)=1+\beta^2+\beta^3=1+\alpha=\alpha^2$, and so $5r \equiv 2 \pmod 3$, or $r=1$. We have therefore found the position of the vector (1001) to be (3,1), which may be checked by reference to the array.

References

[1] F. J. MacWilliams and N. J. A. Sloane. Pseudo-Random Sequences and Arrays. Proceedings of the IEEE, 64 No. 12:1715-1728, 1976.

We claim:

1. Position sensing apparatus comprising:
a pattern element with an arrangement of indicia that together present a two-dimensional windowing pattern, said two-dimensional windowing pattern having windowing property characteristics such any portion of said two-dimensional windowing pattern of predetermined minimum extent forms a corresponding unique sub-pattern is that is locatable within said two-dimensional windowing pattern for at least one orientation of said unique sub-pattern relative to said two-dimensional windowing pattern;
an indicator element moveable relative to said pattern element across said arrangement of indicia;
sub-pattern detector means including sensor means for sensing said indicia, such that for any one position of the indicator element the sensing means is operative to sense a portion of said two-dimensional windowing pattern which lies in the locality of said indicator element and is smaller in extent than said unique sub-pattern, the detector means being operative to process the output of the sensor means such that as the indicator element is moved over the two-dimensional windowing pattern, the sub-pattern detector means derives sub-pattern data representative of a said unique sub-pattern in proximity to said indicator element in a said at least one orientation of the unique sub-pattern relative to said two-dimensional windowing pattern; and
position-determining means including a memory for holding pattern data representative of said two-dimensional windowing pattern, the position-determining means being responsive to the sub-pattern data derived by said sub-pattern detector means to determine, by reference to said pattern data, a position of said indicator element relative to said pattern element.

2. Position-sensing apparatus according to claim 1, wherein:
(a) said two-dimensional windowing pattern includes a regular arrangement of said indicia such that any given sub-pattern of said two-dimensional windowing pattern may be in any of M possible orientations relative to the two-dimensional windowing pattern where M is a positive integer greater then zero;
(b) said two-dimensional windowing pattern includes a regular arrangement of said indicia such that any given sub-pattern can be correctly located in the two dimensional windowing pattern for N of said M possible orientations where N is a positive integer in the range of $0 < N \leq M$; and
(c) said sub-pattern detector means is responsive to said regular arrangement of said indicia to identify said unique sub-pattern in the locality of said indicator element, and to provide said sub-pattern data to said position-determining means which is representative of the said unique sub-pattern in one of said N of said M possible orientations relative to the two-dimensional windowing pattern in which it can be correctly located.

3. Position-sensing apparatus according to claim 2 wherein said indicia are discernibly arranged in rows and columns extending parallel to respective first and second coordinate axes, said indicia being presented in a cell that has line contact with a plurality of neighbouring cells.

4. Position-sensing apparatus according to claim 3, wherein each said cell has line contact with four neighbouring cells, M has a value 4, and N has one of the values 1,2 and 4.

5. Position-sensing apparatus according to claim 3 wherein said indicia serve to encode at least part of a two-dimensional windowing array having rows and columns of elements extending parallel to said first and second coordinate axes respectively.

6. Position-sensing apparatus according to claim 5, wherein said array is a pseudo-random binary array.

7. Position-sensing apparatus according to claims 5, wherein said array is formed from first and second binary sequences of length m and n respectively, where m and n are positive integers greater than zero, by forming a first column of the array from said first sequence, and forming each subsequent (i)th column, where "i" is an integer in the range from 2 to $2^{n+1}$, by considering the value of the (i−1)th element of the second sequence, and if the (i−1)th element has a first binary value, forming the said (i)th column from said first sequence unshifted relative to the (i−1)th column, if the (i−1)th element has a second binary value, forming the said (i)th column from said first sequence circularly shifted by one position relative to the (i−1)th column.

8. Position-sensing apparatus according to claim 7, wherein said first and second binary sequences are respective orientable binary sequences each with the property that if a window-length subsequence appears in the sequence then a reverse of said subsequence is absent.

9. Position-sensing apparatus according to claim 5, wherein said array is formed by combining together two windowing sequences that extend parallel to respective ones of said first and second coordinate axes, each element of said array representing a particular combination of values of corresponding elements of said sequences.

10. Position-sensing apparatus according to claim 9, wherein said sequences are selected from the group of sequences comprising:
(a) de Bruijn sequences;
(b) pseudo-random binary sequences;
(c) orientable binary sequences each having the property that if a window-length subsequence appears in the sequence, then its reversal does not; and
(d) complement-orientable binary sequences each having the property that if a window-length subsequence appears in the sequence, then the reverse of the bitwise complement of the subsequence does not.

11. Position-sensing apparatus according to claim 5, wherein the value of each element of said array is encoded to correspond to settings of particular physical attributes.

12. Position-sensing apparatus according to claim 3, wherein said indicia serve to encode a first linear windowing sequence of elements extending parallel to said first coordinate axis and a second linear windowing sequence of elements extending parallel to said second coordinate axis.

13. Position-sensing apparatus according to claim 12, wherein said sequences are selected from the group of sequences comprising:
(a) de Bruijn sequences;
(b) pseudo-random binary sequences;
(c) orientable binary sequences each having the property that if a window-length subsequence appears in the sequence, then its reversal does not; and
(d) complement-orientable binary sequences each having the property that if a window-length subsequence appears in the sequence, then the reverse of the bitwise complement of the subsequence does not.

14. Position-sensing apparatus according to claim 12, wherein the value of each element of each said first linear windowing sequence and said second linear windowing sequence is encoded as a corresponding change in indicia value when moving between neighbouring cells in a direction parallel to the direction of the corresponding first linear windowing sequence or second linear windowing sequence.

15. Position-sensing apparatus according to claim 14, wherein the encoding of said element values is such as to ensure that each said indicia is distinguished by its value from at least one specific neighbour with which it has line contact.

16. Position-sensing apparatus according to claim 15, wherein said encoding is such as to distinguish each indicia by value from all its neighbours with which it makes line contact.

17. Position-sensing apparatus according to claim 16, wherein the encoding of said element values is such as to ensure that each said indicia is also distinguished by its value from its neighbours with which it has point contact.

18. Position-sensing apparatus according to claim 11, wherein each said indicia is separated from at least one neighbouring indicia with which it has line contact by a corresponding separator zone that is detectable as such by said sub-pattern detector means.

19. Position-sensing apparatus according to claim 1, wherein said sensor means is movable with said indicator element and is operative to sense a portion of said two-dimensional windowing pattern which is smaller in extent than said unique sub-pattern but which includes a plurality of indicia, said sub-pattern detector means being operative to build up said sub-pattern data relating to said sub-pattern as the sensor means is moved over the two-dimensional windowing pattern by taking account the continuity of indicia sensed during said movement.

20. Position-sensing apparatus according to claim 5, wherein said sensor means is movable with said indicator element and is operative to sense a portion of said two-dimensional windowing pattern corresponding to a single said indicia, said apparatus including spatial-information means for providing said sub-pattern detector means with spatial information regarding the relative disposition of adjacent element-value encoding indicia, and said sub-pattern detector means being operative to use said spatial information to build up said sub-pattern data relating to said unique sub-pattern as the sensor means is moved over the two-dimensional windowing pattern.

21. Position-sensing apparatus according to claim 20, wherein said spatial-information means comprises indicia of said two-dimensional windowing pattern sensed by said sensor means as it is moved between said element-value encoding indicia.

22. Position-sensing apparatus according to claim 21, wherein said spatial-information is encoded into the values represented by said element-value encoding indicia.

23. Position-sensing apparatus according to claim 20, wherein said spatial-information means comprises means, separate from said sensor means, deriving information regarding movement of said sensor including at least information on changes in direction of said sensor means.

24. Position-sensing apparatus according to claim 20, wherein the spatial-information provided to said sub-pattern detector means is only partial and said detector means is operative to assume an unchanging direction of movement of said sensor means across said two-dimensional windowing pattern unless and until, following initial position determination, an inconsistency is determined between said pattern data and sub-pattern data.

25. Position-sensing apparatus to claim 1, wherein the relative orientation of the sensor means to said arrangement of indicia, about an axis orthogonal to said arrangement, is fixed thereby facilitating derivation by said sub-pattern detector means of said sub-pattern data representative of a sub-pattern orientated in a said at least one orientation.

26. Position-sensing apparatus to claim 5, wherein the relative orientation of the sensor means to said arrangement of indicia, about an axis orthogonal to said arrangement, is variable; said apparatus including orientation-information means for providing said sub-pattern detector means with orientation information about said relative orientation, the sub-pattern detector means utilizing this information in deriving said sub-pattern data representative of said unique sub-pattern oriented in said at least one orientation.

27. Position-sensing apparatus according to claim 26, wherein said orientation-information means comprises indicia of said two-dimensional windowing pattern sensed by said sensor means as it is moved between said element-value encoding indicia.

28. Position-sensing apparatus according to claim 27, wherein said orientation information is encoded into the values represented by said element-value encoding indicia.

29. Position-sensing apparatus according to claim 1, wherein said position-determining means determines the location of said unique sub-pattern in the two-dimensional windowing pattern by comparing indicia of the unique sub-pattern with indicia of the two-dimensional windowing pattern.

30. Position-sensing apparatus according to claim 1, wherein said position-determining means determines a location of said unique sub-pattern in the two-dimensional windowing pattern by using an index addressable in terms of data contained in said sub-pattern data with each addressable index entry holding sub-pattern location data corresponding to a position of the unique sub-pattern giving rise to addressing of said index entry.

31. Position-sensing apparatus according to claim 1, wherein following an initial determination of a location of said indicator element, any incremental change in a pattern portion sensed by said sensing means, is used by said position-determining means to provide an updated location based on the incremental change in location of the indicator element indicated by said change in the sensed pattern portion.

32. Position-sensing apparatus according to claim 31, wherein:
said two dimensional windowing pattern is an encoding of two windowing sequences of elements extending along respective first and second coordinate axes, and
said position-determining means:
being operative to update the location of said indicator element along said first and second coordinate axes separately, based on any incremental change in location along the corresponding coordinate axis indicated by a change in the element or elements of the corresponding sequence represented by said sensed pattern portion;
(b) in incrementing the location of said indicator element along at least one said coordinate axis, assuming an unchanged direction of movement therealong unless and until the said element or elements of the sequence extending along said one coordinate axis that are represented by said sensed pattern portion, differ from that predicated from the stored pattern data relating to that sequence having regard to the current location in the sequence as previously determined by said position-determining means, and
(c) upon detecting a difference between the sensed and predicted sequence elements, being further operative to enter a recovery process to recover its location along said one coordinate axis, said recovery process involving deriving at least one candidate location for the indicator element on the basis that the direction of movement of the indicator element has been reversed, and directly or indirectly comparing the element or elements sensed along the track of the indicator element with those predicted to lie along the indicator element track in reaching each said candidate location.

33. Position-sensing apparatus according to claim 32, wherein the position-sensing apparatus is operative to store an identity of the sequence elements sensed along the track of the indicator element, the validity of each said candidate location being tested during the recovery process by predicting, on the basis that a reversal of movement occurred at a location midway between the candidate location and the currently-determined one, the sequence element or elements sensed during movement between said midway and candidate locations, comparing them with the corresponding stored sensed sequence elements, and rejecting the candidate location if said comparison results in a mismatch.

34. Position-sensing apparatus to claim 32, wherein said recovery process involves testing the validity of the or each candidate location by:
(i) predicting the sequence element or elements sensible thereat, comparing them with the sequence element or elements predicted for the currently-determined, but incorrect, location and rejecting the candidate location if this comparison results in a match, and/or
(ii) on the assumption that a reversal of movement occurred at a location midway between said candidate location and the currently determined location, predicting the sequence element or elements sensible during movement between said midway and candidate locations, but not including the latter location, comparing them with the corresponding sequence elements predicted for movement to the currently-determined, but incorrect location and rejecting the candidate location if this comparison results in a mismatch.

35. Position-sensing apparatus according to claims 32, wherein a plurality of candidate locations are derived and remain unrejected following the testing of their validity, said recovery process further involving detecting further incremental changes in said sensed sequence elements and comparing each new incrementally-changed sensed sequence element or elements with predictions based in each remaining candidate location, a said remaining candidate location being rejected where this comparison results in a mismatch.

36. Position-sensing apparatus claim 1 wherein said indicator element is a hand-holdable stylus carrying said sensor means.

37. Position-sensing apparatus according to claim 1, wherein said pattern element is a planar member carrying said indicia, both the planar member and said indicia being transparent to visible light whereby to permit viewing of items through the pattern element.

38. Position-sensing apparatus according to claim 36, wherein said pattern element is a planar member carrying said indicia, said indicia being transparent to visible light and said stylus being a marking stylus capable of depositing a marking substance on a surface of said planar member at which said indicia can be sensed by said sensor means, said working substance being optically visible but permitting the sensing of said indicia therethrough.

39. Position-sensing apparatus according to claim 36, wherein said pattern element is a planar member carrying said indicia, said apparatus further comprising a markable sheet positioned over said planar member, said sheet being at least partially opaque and permitting said indicia to be sensed therethrough by said sensor means, and said stylus being a marking stylus capable of depositing a marking substance on said sheet which substance is optically discernible against said sheet but permits the sensing of said indicia therethrough.

40. A pattern element according to claim 1 including a two-dimensional pattern having pattern cells arranged in rows and columns extending parallel to respective first and second coordinate axes with each cell having a plurality of neighbouring cells across respective boundaries and having a property set at one of a plurality of possible values, said cells serving to encode first and second sequences of binary elements parallel to said first and second axes respectively with each sequence element having its value encoded as a corresponding change in cell property value when moving across a said boundary, said change being in accordance with the following four encoding functions that give the property value of said cell when moving thereto from another said cell having a property value c, wherein:

$h_0(c)$ specifies the property value of a cell when the binary element to be encoded is 0 and movement is parallel to the first axis;

$h_1(c)$ specifies the property value of a cell when the binary element to be encoded is 1 and movement is parallel to the first axis $v_0(c)$ specifies the property value of a cell when the binary element to be encoded is 0 and movement is parallel to the second axis, and $v_1(c)$ specifies the property value of a cell when the binary element to be encoded is 1 and movement is parallel to the second axis, said encoding being such that:

$h_0(c) \neq h_1(c)$ and $v_0(c) \neq v_1(c)$ $h_i(v_j(c)) = v_j(h_i(c))$ where "i" and "j" are members of binary value set (0,1), each said cell bring distinguishable from its neighbours and movements parallel to said first and second axes being respectively identifiable.

41. A pattern element according to claim 40, wherein each said cell is distinguishable from its neighbours and movements parallel to said first and second axes are respectively identifiable, by virtue of said encoding functions being so chosen that any given cell and all its neighbouring cells in both directions of said first and second axes have different values of the property c.

42. A pattern element according to claim 40, wherein each said cell is distinguishable from its neighbours and movements parallel to said first and second axes are respectively identifiable, by virtue of said encoding functions being so chosen that any given cell and its neighbouring cells in both directions of one of said first and second axes have different values of the property c, and further by virtue of the provision of identifiable separators between neighbouring cells in both directions of the other of said first and second axes.

43. A pattern element according to claim 40, wherein each said cell is distinguishable from its neighbours and movements parallel to said first and second axes are respectively identifiable, by virtue of the provision of identifiable separators between neighbouring cells in both directions of both said first and second axes with the separators relevant to movement in both directions of one said axis being distinguished from the separators relevant to movement in both directions of the other said axis.

44. A pattern element according to claim 40, wherein said encoding functions are such that any given cell and all the cells to which it is diagonally adjacent have the value of their property c so inter-related as to enable identification of at least the fact that a diagonal transition has been made when moving from said given cell to one of its diagonally adjacent cells.

45. A pattern element according to claim 40, wherein said encoding functions are of the form:

$h_0(c) = c + a$ (Modulo N)
$h_1(c) = c - a$ (Modulo N)
$v_0(c) = c + b$ (Modulo N)
$v_1(c) = c - b$ (Modulo N)

where a is not equal to b.

46. A pattern element according to claim 40, wherein said encoding functions are of the form:

$h_0(c) = c.XOR.a$
$h_1(c) = c.XOR.b$
$v_0(c) = c.XOR.d$
$v_1(c) = c.XOR.e$ where XOR represents the bitwise exclusive OR function; a,b,d,e are non zero; a and b are different and d and e are different.

47. A pattern element according to claim 40, wherein said sequences are windowing sequences having windowing property characteristics.

48. A pattern element according to claim 47, wherein said sequences are orientable sequences, and wherein:

$h_0(c) = h_0^{-1}(c); h_1(c) = h_1^{-1}(c)$
$v_0(c) = v_0^{-1}(c); v_1(c) = v_1^{-1}(c)$.

49. A pattern element according to claim 47, wherein said sequences are compliment-orientable sequences, and wherein:

$h_0 = h_1^{-1}(c)$
$v_0 = v_1^{-1}(c)$.

50. Displacement-sensing apparatus comprising a pattern element according to claim 40, a member movable over said element, sensing means coupled to said member for sensing at one time the value of the property c of a single cell of said pattern or where provided, the identity of a said separator, and processor means responsive to the output of said sensor means to determine the relative displacement of said member across the pattern element.

51. A method of determining the location of an indicator along a predetermined sequence of pattern features relative to which the indicator is movable, said method involving determining an initial location for said indicator along said sequence and thereafter incrementally updating the determined location by:

A. sensing a portion of said sequence of pattern features in the locality of said indicator and monitoring the sensed sequence portion to detect an incremental change therein, B. upon detecting an incremental change in said sensed portion, comparing the sensed sequence portion with that predicted as present in said locality, this prediction using a stored representation of said predetermined sequence and being effected on the basis of an incremental change having occurred in the currently determined location in an assumed direction of movement, and C. acting on the result of said comparison as follows:
  (i) where said comparison produces a match between the sensed and predicted sequence portions, updating the determined location of the indicator by an incremental change in said assumed direction of movement,
  (ii) where said comparison produces a mismatch between the sensed and predicted sequence portions, carrying out a recovery process to recover the location of the indicator along said sequence, said recovery process involving deriving at least one candidate location for the indicator on the basis that the direction of movement of the indicator has been reversed, and directly or indirectly comparing the sequence portions sensed along the track of the indicator with those predicted to lie along the indicator's track in reaching the or each said candidate location whereby to test the validity of the or each such location.

52. A method according to claim 51, including the step of storing the sequence portions sensed along the track of the indicator, the validity of the or each said candidate location being tested during the recovery process by predicting, on the basis that a reversal of movement occurred at a location midway between the candidate location and the currently-determined one, the sequence portions sensible during movement between said midway and candidate locations, comparing them with the corresponding stored sequence portions, and rejecting the candidate location if this comparison results in a mismatch.

53. A method according to claim 51, wherein said recovery process involves testing the validity of the candidate location by:

(i) predicting the sequence portion sensible thereat, comparing it with the said sequence portion predicted for the currently-determined location, and rejecting the candidate location if this comparison results in a match, and/or (ii) on the assumption that a reversal of movement occurred at a location midway between said candidate location and the currently-determined location, predicting the sequence portions sensible during movement between said midway and candidate locations, but not including the latter location, comparing them with the corresponding sequence portions predicted for movement to the currently-determined location, and rejecting the candidate location if this comparison results in a mismatch.

54. A method according to claim 51 wherein a plurality of candidate locations are derived and remain unrejected following the testing of their validity, said recovery process further involving detecting further incremental changes in said sensed sequence portion and comparing each new incrementally-changed sensed sequence portion with predictions based on each remaining candidate location, a said remaining candidate location being rejected where this comparison results in a mismatch.

55. Position-sensing apparatus according to claim 14, wherein each said indicia is separated from at least one neighboring indicia with which it has line contact by a corresponding separator zone that is detectable as such by said sub-pattern detector means.

56. Position-sensing apparatus according to claim 12, wherein said sensor means is movable with said indicator element and is operative to sense a portion of said two-dimensional windowing pattern corresponding to a single said indicia, said apparatus including spatial-information means for providing said sub-pattern detector means with spatial information regarding the relative disposition of adjacent element-value encoding indicia, and said sub-pattern detector means being operative to use said spatial information to build up said sub-pattern data relating to said unique sub-pattern as the sensor means is moved over the two-dimensional windowing pattern.

57. Position-sensing apparatus according to claim 12, wherein the relative orientation of the sensor means to said arrangement of indicia, about an axis orthogonal to said arrangement, is variable; said apparatus including orientation-information means for providing said sub-pattern detector means with orientation information about said relative orientation, the sub-pattern detector means utilizing this information in deriving said sub-pattern data representative of a sub-pattern orientated in a said at least one orientation.

* * * * *

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 2, line 62, change "army" to --array--.

Column 3, line 13, change "Advantageoulsy" to --Advantageously--.

Column 4, lines 43 and 49, undo bold formatting.

Column 6, line 69, change "sensing" to Sensing.

Column 7, line 18, change "characterisitcs" to --characteristics--.

Column 9, line 68, change "FS" to --F5--.

Column 10, line 2, change "As" to --$A_s$--.

Column 10, lines 40 and 43, change "1,2" to --1, 2--.

Column 10, line 58, change "aging" to --arranging--.

Column 11, line 57, delete "orientable" (2nd occur.).

Column 11, line 62, change "sequeunces" to --sequences--.

Column 13, line 31, change "fall" to --fail--.

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 13, line 62, change "201,202" to-- 201, 202--.

Column 15, line 28, change "7,8" to--7, 8--.

Column 15, line 65, change "23,24" to--23, 24--.

Column 16, line 4, change "using" to--Using--.

Column 19, line 24, change "$h_0v_j(c)))$" to--$h_0v_j(c))$--.

Column 19, line 28, change "if" to--is--.

Column 19, line 29, change "r) the" to--r). The--.

Column 19, line 38 and 47, change "=O" to--=$\emptyset$--.

Column 21, line 58, change "(untilled" to--(unfilled--.

Column 23, line 10, change "singlepixel" to single-pixel--.

Column 24, line 51, change optoelectronic to --opto-electronic--.

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 25, line 1 delete "n".

Column 26, line 48, change "are" to--arc--.

Column 30, line 36, change "On" to--(in--.

Column 31, line 56, change "XB1T" to--XBIT--.

Column 32, line 54, change "carded" to--carried--.

Column 33, line 8, change "carded" to--carried--.

Column 38, line 1, change "1n" to --1--.

Column 40, line 35, delete "lo".

Column 41, line 26, change "analoguous" to--analogous--.

Column 41, line 36, change "Coy" to--(by--.

Column 42, line 53, change "ist" to--list--.

Column 42, line 55, change "thsi" to--this--.

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 43, after "both)" add --.--.

Column 44, line 19, change "white board" to --whiteboard--.

Column 45, line 2, change "difference" to --different--.

Column 45, line 24, change ""i"" to --"I"--.

Column 46, line 30, after "property" add --.--.

Column 46, line 61, change "ith" to --*ith*--.

Column 46, line 67, change "t" to --t--.

Column 46, line 68, change "u" to --u-- (both occur.).

Column 47, line 1, change "u" to --u-- (both occur.).

Column 47, line 1, change "s" to --s--.

Column 47, line 5, change "u" to --u-- (fourth occur.).

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 47, line 11, change "wth" to --with--.

Column 47, line 39, change "arrays" to --Arrays--.

Column 48, line 24, change "m" to --m--.

Column 49, line 50, change "complementorientable" to --complement-orientable--.

Column 50, line 38, change "Linear" to --linear--.

Column 51, line 32, change "dear" to --clear--.

Column 51, line 62, after "=" add --$\prod$--.

Column 52, line 23, change "$y_1$." to --$y_1$--.

Column 53, line 56, change "Search Report,t" to --Search Report$_{,t}$--.

Column 55, line 3, after "need" add --a--.

Column 55, line 52, change "ß2+3" to --ß2+ß3--.
Column 55,
    Claim 1, line 1, change "Position sensing" to --Position-sensing--.

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Col. 55,
Claim 1, line 5, after "such" add --that--.

Col. 56,
Claim 1, line 8, delete "is".

Col. 56,
Claim 2, line 8, change "then" to --than--.

Claim 4, line 4, change "1,2" to --1, 2--.

Column 57,
Claim 7, line 1, change "claims" to --claim--.

Col. 59,
Claim 26, line 1, after "apparatus" add --according--.

Claim 32, line 8, before "being" add --(a) --.

Column 60,
Claim 34, line 1, after "apparatus" add --according--.

Claim 34, line 4, change "(i)" to --(a)--.

Claim 34, line 10, change "(ii)" to --(b)--.

Column 61,
Claim 36, line 1, after "apparatus" add --according--.

UNITED STATES PATENT AND TRADEMARK OFFICE
CERTIFICATE OF CORRECTION

PATENT NO. : 5,442,147
DATED : August 15, 1995
INVENTOR(S) : John Burns and Sleelagh A. Lloyd It is certified that error appears in the above-indentified patent and that said Letters Patent is hereby corrected as shown below:

Column 61,
Claim 40, lines 20 and 23, change "axis" to--axis;--.

Claim 40, line 30, change "bring" to--being;--.
Column 62,
Claim 46, line 8, change "a,b,d,e" to--a, b, d, e--.
Column 63,
Claim 51, line 7, change "A" to--(a)--.

Claim 51, line 10, change "therein" to--therein;--.

Claim 51, line 12, change "B" to--(b)--.

Claim 51, line 19, change "movement" to--movement;--.

Claim 51, line 20, change "C" to--(c)--.

Signed and Sealed this

Tenth Day of September, 1996

Attest:

BRUCE LEHMAN

*Attesting Officer*  *Commissioner of Patents and Trademarks*